United States Patent
Kim et al.

(10) Patent No.: US 11,256,347 B2
(45) Date of Patent: Feb. 22, 2022

(54) ELECTRONIC DEVICE EQUIPPED WITH PRESSURE SENSORS

(71) Applicant: Samsung Electronics Co., Ltd., Gyeonggi-do (KR)

(72) Inventors: Byeong-Cheol Kim, Gyeonggi-do (KR); Han-Vit Kang, Gyeonggi-do (KR); Jungwon Kim, Gyeonggi-do (KR); Hyungsup Byeon, Gyeonggi-do (KR); Ho-Kyung Kang, Daegu (KR); Jeongsik Jeong, Gyeonggi-do (KR); Kwang-Tai Kim, Gyeonggi-do (KR); Hyunju Hong, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 440 days.

(21) Appl. No.: 16/319,752

(22) PCT Filed: Jul. 21, 2017

(86) PCT No.: PCT/KR2017/007868
§ 371 (c)(1),
(2) Date: Jan. 22, 2019

(87) PCT Pub. No.: WO2018/016906
PCT Pub. Date: Jan. 25, 2018

(65) Prior Publication Data
US 2021/0294443 A1 Sep. 23, 2021

(30) Foreign Application Priority Data
Jul. 21, 2016 (KR) .................. 10-2016-0092756
Jul. 21, 2016 (KR) .................. 10-2017-0024702

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0412* (2013.01); *G06F 3/0445* (2019.05); *G06F 3/0447* (2019.05); *G06F 2203/04105* (2013.01)

(58) Field of Classification Search
CPC ..... G06F 3/04105; G06F 3/0412; G06F 3/044
See application file for complete search history.

(56) References Cited

U.S. PATENT DOCUMENTS

| 7,123,549 B2 | 10/2006 | Robert et al. |
| 2009/0059730 A1 | 3/2009 | Lyons et al. |

(Continued)

FOREIGN PATENT DOCUMENTS

| KR | 20140131051 | 11/2014 |
| KR | 20150043999 | 4/2015 |
| KR | 20150092524 | 8/2015 |
| KR | 101583221 | 1/2016 |

OTHER PUBLICATIONS

PCT/ISA/210 Search Report issued on PCT/KR2017/007868 (pp. 5).
PCT/ISA/237 Written Opinion issued on PCT/KR2017/007868 (pp. 27).

*Primary Examiner* — Ryan A Lubit
(74) *Attorney, Agent, or Firm* — The Farrell Law Firm, P.C.

(57) ABSTRACT

The present disclosure provides an electronic device equipped with a pressure sensor according to various embodiments. The electronic device may include: a housing including a first face facing a first direction and a second face facing a second direction opposite to the first direction, and including a conductive material provided on at least a portion of the second face; a touch screen display disposed between the first face and second face of the housing and exposed through the first face; a first pressure sensor disposed between the touch screen display and the second face of the housing and configured to sense pressure of an (Continued)

external object for the touch screen display; a second pressure sensor coupled to the second face of the housing and configured to sense pressure of an external object for the second face of the housing; and a support member spaced apart from the second face of the housing in the second direction. The second pressure sensor may include: a conductive pattern disposed between the support member and the conductive material; and a dielectric layer disposed between the conductive pattern and the conductive material. The second pressure sensor may be configured to generate an output on the basis of a change in capacitance associated with the conductive pattern, the conductive material, and the dielectric layer. Various embodiments may be possible for the pressure sensor.

13 Claims, 60 Drawing Sheets

(56) References Cited

U.S. PATENT DOCUMENTS

| | | |
|---|---|---|
| 2015/0101412 A1 | 4/2015 | Poli |
| 2016/0058375 A1 | 3/2016 | Rothkoph |
| 2016/0062500 A1 | 3/2016 | Kessler et al. |
| 2016/0370908 A1 | 12/2016 | Kim et al. |
| 2017/0024047 A1* | 1/2017 | Kung .................... G06F 3/0447 |
| 2017/0357362 A1* | 12/2017 | Shim .................... G06F 3/0488 |
| 2018/0328799 A1* | 11/2018 | Park .................... G06F 3/04144 |

* cited by examiner

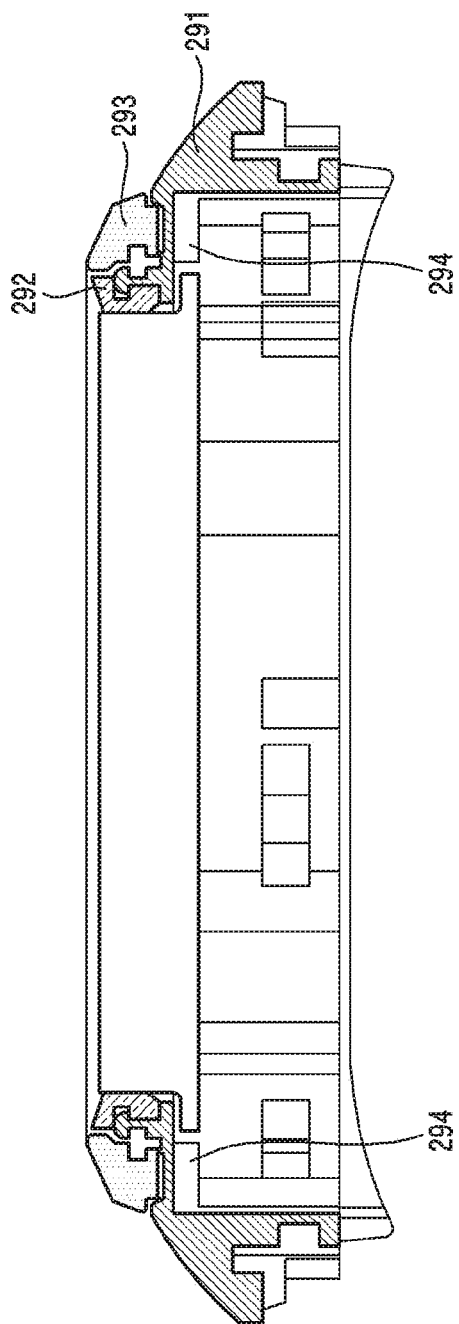

ELECTRONIC DEVICE EQUIPPED WITH PRESSURE SENSORS

PRIORITY

This application is a National Phase Entry of International Application No. PCT/KR2017/007868, which was filed on Jul. 21, 2017, and claims priority to Korean Patent Application Nos. 10-2016-0092756 and 10-2017-0024702, each of which were filed on Jul. 21, 2016, the contents of each of which are incorporated herein by reference.

TECHNICAL FIELD

Various embodiments of the present disclosure relate to an electronic device equipped with a pressure sensor.

BACKGROUND ART

An electronic device mounts at least one sensor on a housing to utilize the sensor for various purposes. For example, the sensor mounted on the housing may include a touch sensor, a pressure sensor, an illumination sensor, a proximity sensor, an image sensor, or the like.

The electronic device mounts the touch sensor to utilize it as an input device, and mounts the pressure sensor for sensing pressure strength to utilize it as an input device.

DISCLOSURE OF INVENTION

Technical Problem

Various embodiments of the present disclosure may provide an electronic device which mounts at least one pressure sensor on a rear face and/or side face of the electronic device to utilize the pressure sensor as an input device.

Various embodiments of the present disclosure may provide an electronic device with a structure in which at least one pressure sensor and at least one antenna are mounted on a rear face and/or a side face of the electronic device.

Solution to Problem

Various embodiments of the present disclosure may include an electronic device including: a housing including a first face facing a first direction and a second face facing a second direction opposite to the first direction, and including a conductive material provided on at least a portion of the second face; a touch screen display disposed between the first face and second face of the housing and exposed through the first face; a first pressure sensor disposed between the touch screen display and the second face of the housing and configured to sense pressure of an external object for the touch screen display; a second pressure sensor coupled to the second face of the housing and configured to sense pressure of an external object for the second face of the housing; and a support member spaced apart from the second face of the housing in the second direction. The second pressure sensor may include: a conductive pattern disposed between the support member and the conductive material; and a dielectric layer disposed between the conductive pattern and the conductive material. The second pressure sensor may be configured to generate an output on the basis of a change in capacitance associated with the conductive pattern, the conductive material, and the dielectric layer.

Various embodiments of the present disclosure may include an electronic device including: a housing including a first face facing a first direction and a second face facing a second direction opposite to the first direction, and including a conductive material on at least a portion of the second face; a support member spaced apart from the second face of the housing in the second direction; and a pressure sensor coupled to the second face of the housing and configured to sense pressure of an external object for the second face of the housing. The pressure sensor may include: conductive patterns disposed on the support member; and a dielectric layer disposed between the conductive patterns and the conductive material. The pressure sensor may be configured to generate an output on the basis of a change in capacitance associated with a change in a distance between the conductive pattern and the conductive material.

Various embodiments of the present disclosure may include an electronic device including: a housing including a first face facing a first direction and a second face facing a second direction opposite to the first direction, and including a conductive material on at least a portion of the second face; a support member spaced apart from the second face of the housing in the first direction; and a pressure sensor coupled to the second face of the housing and configured to sense pressure of an external object for the second face of the housing. The pressure sensor may include: a conductive pattern disposed between the support member and the conductive material; and a dielectric layer disposed between the conductive pattern and the conductive material. The pressure sensor may be configured to generate an output on the basis of a change in capacitance associated with a change in a distance between the conductive pattern and the conductive material.

Various embodiments of the present disclosure may include an electronic device including: a housing including a first face facing a first direction, a second face facing a second direction opposite to the first direction, and a third face facing a third direction perpendicular to the first and second directions and covering a space between the first and second faces, and including a conductive material provided on at least a portion of the third face; a support member spaced apart from the third face of the housing in a fourth direction opposite to the third direction; and a first pressure sensor coupled to the third face of the housing and configured to sense pressure of an external object for the third face of the housing. The first pressure sensor may include: a conductive pattern disposed between the support member and the conductive material; and a dielectric layer disposed between the conductive pattern and the conductive material. The first pressure sensor may be configured to generate an output on the basis of a change in capacitance associated with the conductive pattern, the conductive material, and the dielectric layer.

Advantageous Effects of Invention

According to various embodiments of the present disclosure, at least one pressure sensor can be mounted on a rear face and/or side face of an electronic device to utilize the pressure sensor as an input device.

BRIEF DESCRIPTION OF DRAWINGS

FIG. 29B is a side cross-sectional view illustrating a wearable device equipped with a pressure sensor according to various embodiments of the present disclosure;

BEST MODE FOR CARRYING OUT THE INVENTION

Figure 1A:
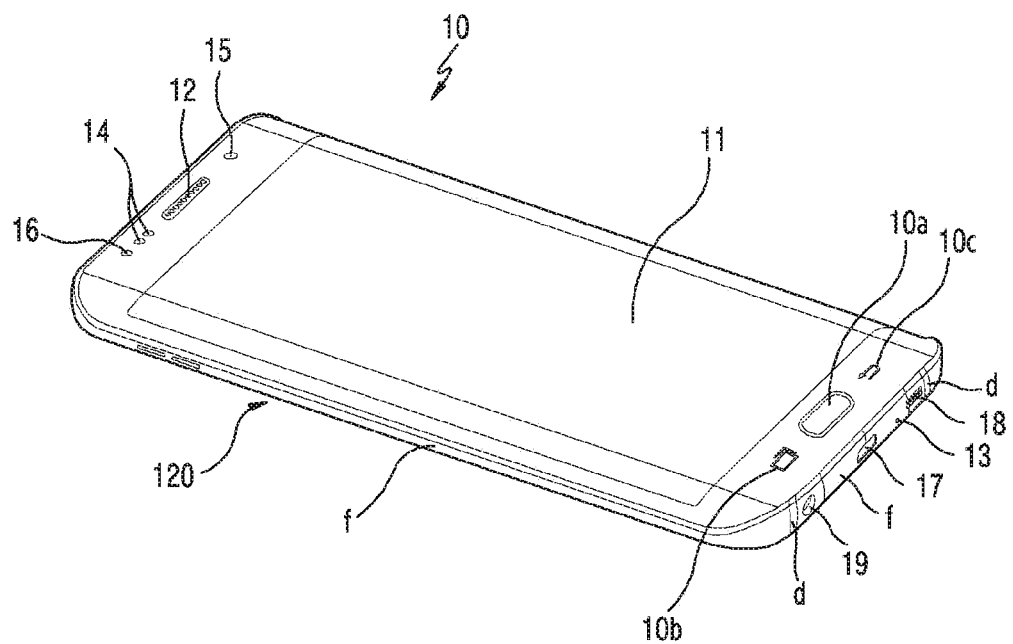
FIG. 1A is a perspective view illustrating a front face of an electronic device according to various embodiments.

Hereinafter, various embodiments of the present invention will be described with reference to accompanying drawings. However, various embodiments of the present invention are not limited to specific embodiments, and it should be understood that modification, equivalent, and/or alternative on the various embodiments described herein can be variously made. With regard to description of drawings, similar components may be marked by similar reference numerals.

In the disclosure disclosed herein, the expressions "have," "may have," "include" and "comprise," or "nay include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B." or "at least one of A or B" may refer to all of the case (1) where at least one A is included, the case (2) where at least one B is included, or the case (3) where both of at least one A and at least one B are included.

The terms, such as "first," "second," and the like used herein, may refer to various elements of various embodiments of the present invention, but do not limit the elements. For example, such terms do not limit the order and/or priority of the elements. Furthermore, such terms may be used to distinguish one element from another element. For example, "a first user device" and "a second user device" indicate different user devices regardless of the order or priority, for example, without departing from the scope of the present invention, a first element may be referred to as the second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present invention are used to describe specified embodiments of the present invention and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present invention. In some cases, even if terms are terms which are defined in the specification, they may not be interpreted to exclude embodiments of the present invention.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (for example, smart glasses, head-mounted-devices (l-MDs), electronic apparels, electronic bracelets, electronic necklaces, electronic appcessory, electronic tattoos, smart mirrors, or smart watches).

According to certain embodiments, the electronic devices may be smart home appliances. The smart home appliances may include at least one of, for example, televisions (TVs), digital video disk (DVD) players, audios, refrigerators, air conditioners, cleaners, ovens, microwave ovens, washing machines, air cleaners, set-top boxes, home automation control panels, security control panels, TV boxes (for example, Samsung HomeSync™, Apple TV™, or Google TV™), game consoles (for example, Xbox™ and PlayStation™) electronic dictionaries, electronic keys, camcorders, electronic picture frames, and the like.

According, to another embodiment, the electronic devices may include at least one of medical devices (for example, various portable medical measurement devices (for example, a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation electronic devices, global positioning system receivers (GPSs), event data recorders (EDRs), flight data recorders (FDRs), vehicle infotainment devices, electronic equipment for vessels (for example, navigation systems and gyrocompasses), avionics, security devices, head units for vehicles, industrial or home robots, automatic teller's machines (ATMs) of financial institutions, points of sales (POSs) of stores, or internet of things (for example, light bulbs, various sensors, electric or gas meters, sprinkler devices, fire alarms, thermostats, street lamps, toasters, exercise equipment, hot water tanks, heaters, boilers, and the like).

According to a certain embodiment, the electronic devices may include at least one of a part of furniture or buildings/structures, electronic boards, electronic signature receiving devices, projectors, or various measuring instruments (for example, water meters, electricity meters, gas meters, or wave meters, and the like). The electronic devices according to various embodiments may be one or more combinations of the above-mentioned devices. According to a certain embodiment, an electronic device may be a flexible electronic device. Also, electronic devices according to various embodiments of the present disclosure are not limited to the above-mentioned devices, and may include new electronic devices according to technology development.

Figure 1B:
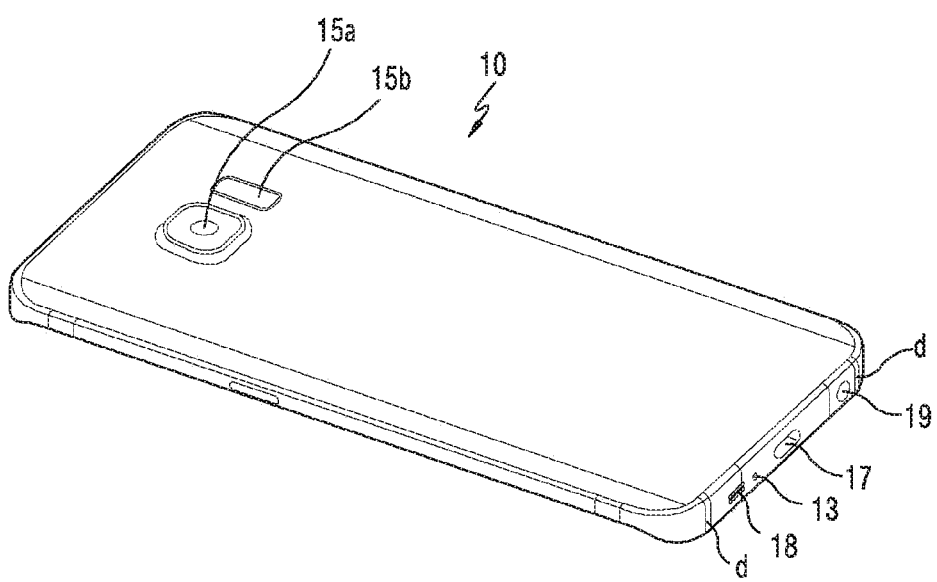
FIG. 1B is a perspective view illustrating a rear face of the electronic device according to various embodiments.

FIG. 1A is a perspective view illustrating a front face of an electronic device according to various embodiments, and FIG. 1B is a perspective view illustrating a rear face of the electronic device according to various embodiments.

Referring to FIG. 1A and FIG. 1B, an electronic device 10 according to various embodiments may have a display 11 (alternatively, referred to as a touch screen) installed on a front face. A receiver 12 for receiving a voice of a peer user may be disposed to an upper portion of the display 11. A microphone 13 for transmitting a voice of a user of the electronic device to the peer user may be disposed to a lower portion of the display 11.

The electronic device 10 according to various embodiments may have components disposed to perform various functions of the electronic device 10 in a surrounding area where the receiver 12 is installed. The components may include at least one sensor module 14. The sensor module 14 may include, for example, at least one of an illumination sensor (e.g., a light sensor), a proximity sensor (e.g., a light sensor), an infrared sensor, and an ultrasonic sensor. According to an embodiment, the component may include a front camera 15. According to an embodiment, the component may include an indicator 16 for informing the user of status information of the electronic device 10.

The display 11 according to various embodiments may be constructed as a large screen to occupy most of the front face of the electronic device 10. A main home screen is a first screen displayed on the display 11 when the electronic device 10 is powered on. In addition, if the electronic device 10 has different home screens of several pages, the main home screen may be a first home screen among the home screens of several pages. Shortcut icons for executing frequently used applications, a main menu switching key, time, weather, and the like may be displayed on the home screen. The main menu switching key may display a menu screen on the display 11. In addition, a status bar may be located in an upper end of the display 11 to indicate a status of the device 10 such as a battery charging status, received signal strength, and a current time. A home key 10a, a menu key 10b, and a back key 10c may be located in a lower portion of the display 11.

The home key 10a according to various embodiments may display the main home screen on the display 11. For example, when the home key 10a is touched in a state where a home screen different from the main home screen is displayed or, alternatively, the menu screen is displayed on the display 11, the main home screen may be displayed on the display 11. Further, when the home key 10a is touched while applications are running on the display 11, the main home screen may be displayed on the display 11. In addition, the home key 10a may be used to display recently used applications on the display 11, or to display a task manager. The home key 10a may be deleted from a front portion of the electronic device 10. A fingerprint recognition sensor device may be disposed to an upper face of the home key 10a. The home key may contribute to a first function (a home screen return function, a wake-up/sleep function, etc.) performed by a physically pushing operation and a second function (e.g., a fingerprint recognition function, etc.) performed by an operation of swiping the upper face of the home key.

The menu key 10b according to various embodiments may provide a link menu which can be used on the display 11. For example, the link menu may include a widget add menu, a background change menu, a search menu, an edit menu, an environment setup menu, or the like. The back key 10c according to various embodiments may display a screen executed immediately before the currently running screen, or may finish a most recently used application.

The electronic device 10 according to various embodiments may include a metal frame 'f' as a metal housing. The metal frame 'f' may be disposed along a boundary of the electronic device 10, and may be displayed by being extended up to at least part of the rear face of the electronic device 10 extended from the boundary. The metal frame 'f' may be at least part of a thickness of the electronic device 10 along the boundary of the electronic device, and may be constructed in a segmental structure.

The metal frame 'f' according to various embodiments may be disposed only to at least part of the boundary of the electronic device 10. When the metal frame 'f' is a portion of the housing of the electronic device 10, the remaining portions of the housing may be replaced by a non-metallic member. In this case, the housing may be constructed in such a manner that the non-metallic member is insert-injected to the metal frame 'f'. The metal frame 'f' may include at least one segment portion 'd' so that a unit metal frame separated by the segment portion d is utilized as an antenna radiator. An upper frame may be a unit frame separated by a pair of segment portions (not shown) disposed with a specific interval. A lower frame may be a unit frame separated by a pair of segment portions 'd' disposed with a specific interval. The segment portions 'd' may be disposed together when the non-metal member is insert-injected to the metal member.

Various electronic components may be disposed to the metal frame 'f' according to various embodiments. A speaker 18 may be disposed to one side of the microphone 13. An interface connector 17 may be disposed to the other side of the microphone 13 to charge the electronic device 10 by using a data transmission/reception function provided by an external device or by receiving external power. An ear jack hole 19 may be disposed to one side of the interface connector 17. The aforementioned microphone 13, speaker 18, interface connector 17, and ear jack hole 19 may be disposed within a region of a unit frame separated by the pair of segment portions 'd' disposed to the lower metal frame 'f'. However, the present disclosure is not limited thereto, and thus at least one of the aforementioned electronic components may be disposed to a region including the segment portion 'd', or may be disposed outside the unit frame.

At least one side key button may be disposed to the left metal frame 'f' according to various embodiments. The at least one side key button may be disposed to the left metal frame 'f' in such a manner that one portion thereof protrudes in pair to perform a volume up/down function, a scroll function, or the like. At least one different side key button may be disposed to the right metal frame 'f' according to various embodiments. A second side key button 112 may perform a power on/off function, a wake-up/sleep function of the electronic device, or the like.

A rear camera 15a may be disposed to a rear face of the electronic device 10 according to various embodiments, and at least one electronic component 15b may be disposed to one side of the rear camera 15a. For example, the electronic component 15b may include at least one of an illumination sensor (e.g., a light sensor), a proximity sensor (e.g., a light sensor), an infrared sensor, an ultrasonic sensor, a heart rate sensor, and a flash device.

According to various embodiments, the display 11 disposed to the front face may include a left curved portion and right curved portion which are disposed respectively on left and right sides. The front face of the electronic device 10 may include a display region and other regions by using one window. The left and right curved portions may be disposed by being extended from a planar portion in an X-axis direction of the electronic device 10. The left and right curved portions may be side faces of the electronic device 10. In this case, the left and right curved portions and the left and right frames of the metal frame 'f' may be side faces of the electronic device 10 together. However, the present disclosure is not limited thereto, and thus the front face including the display 11 may include only at least one of the left and right curved portions. The front face 101 may include only the left curved portion 1012 along the planar portion 1011, or may include only the right curved portion along the planar portion.

The electronic device 10 according to various embodiments may control a display module so that information is selectively displayed. The electronic device 10 may control the display module to configure a screen only on the planar portion. The electronic device 10 may control the display module to configure the screen by including any one of the left and right curved portions together with the planar portion. The electronic device 10 may control the display module to configure the screen by using only at least one curved portion of the left and right curved portions except for the planar portion.

The rear face of the electronic device 10 according to various embodiments may be constructed generally by means of at least one rear exterior surface mounting member. The rear face may include a planar portion disposed substantially around a center, and additionally may include, or not include, a left curved portion and a right curved portion at both left/right sides of the planar portion.

Figure 2:
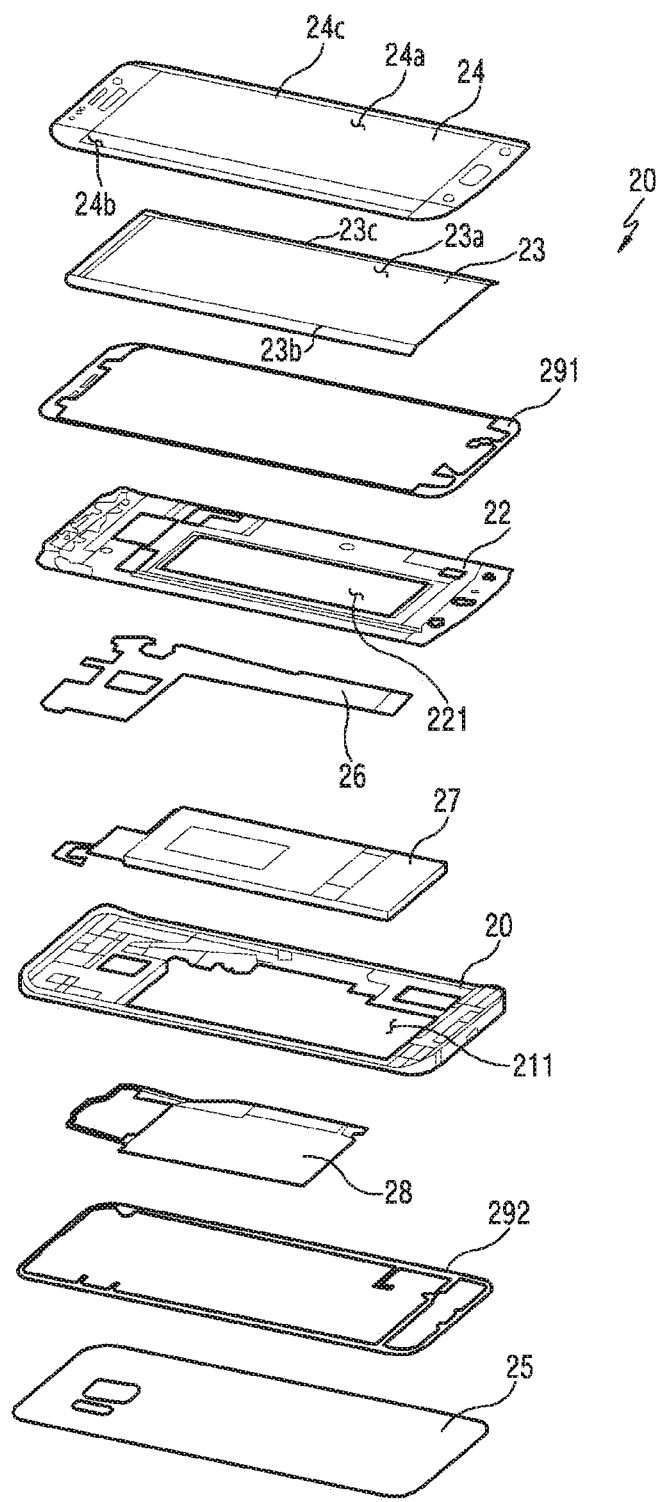
FIG. 2 is an exploded perspective view illustrating an inner configuration of an electronic device according to various embodiments.

FIG. 2 is an exploded perspective view illustrating a configuration of an electronic device according to various embodiments. An electronic device 20 according to various embodiments may be the same as or partially the same as the aforementioned electronic device 10.

Referring to FIG. 2, the electronic device 20 according to various embodiments may be disposed in such a manner that a Printed Circuit Board (PCB) 26, an inner support structure 22, a display module 23, and a front window 24 (which may be referred to as a first plate facing substantially a first direction) are sequentially laminated above a housing 21.

The electronic device 20 according to various embodiments may be disposed in such a manner that a wireless power transmitting/receiving member 28 (which may include a flexible printed circuit board having an antenna pattern) and a rear window 25 (which may be referred to as a second plate facing substantially a second direction opposite to the first direction) are sequentially laminated below the housing 21.

A battery pack 27 according to various embodiments may be accommodated in an accommodation space of the battery pack 27 disposed to the housing 21 and may be disposed by avoiding the PCB 26. According to an embodiment, the battery pack 27 and the PCB 26 may be disposed in parallel without overlapping with each other.

The display module 23 according to various embodiments may be fixed to the inner support structure 22, and the front window 24 may be fixed in such a manner that it is attached to the inner support structure 22 by means of a first adhesive member 291. The rear window 25 according to various embodiments may be fixed in such a manner that it is attached to the housing 21 by means of a second adhesive member 292. The electronic device according to various embodiments may include a side member which at least partially surrounds a space between the first plate and the second plate.

The front window 24 according to various embodiments may include a planar portion 24a and a left bending portion 24b and right bending portion 24c which are bent in both directions at the planar portion 24a. For example, the front window 24 located in an upper portion of the electronic device 20 may constitute a front face and display a screen displayed on the display module 23 by using a transparent material, and may provide an input/output window of various sensors. According to an embodiment, although it is illustrated such that the left and right bending portions 24b and 24c have a shape of a 3D-type, it is also possible to apply a shape of not only left and right but also up and down single-refraction type or, alternatively, a shape of up, down, left, and right double-refraction type. According to an embodiment, a touch panel may be further disposed to a rear face of the front window 24, and thus a touch input signal may be received from the outside.

The display module 23 according to various embodiments may have a shape corresponding to the front window 24 (a shape having a corresponding curvature). According to an embodiment, the display module 23 may include left and right bending portions around a planar portion. The display module 23 according to an embodiment may be a flexible display module. According to an embodiment, if the rear face of the front window 24 has a window shape of a planar type (hereinafter, referred to as a 2D type or, alternatively, 2.5D type), since the rear face of the front window 24 is a plane, a normal Liquid Crystal Display (LCD) or, alternatively, an On-Cell Tsp AMOLED (OCTA) may also be applied.

The first adhesive member 291 according to various embodiments is a component for fixing the front window 24 to the inner support structure (e.g., bracket) 22 disposed inside the electronic device, and may be a kind of a tape such as a double-sided tape and a liquid adhesive layer such as a bond. For example, when the double-sided tape is applied as the first adhesive member 291, an internal material may be a general PolyEthylene Terephthalate (PET) material, and a functional material may also be applied. For example, a foam tape or, alternatively, a material using an impact-resistant fabric may be used to strengthen impact resistance, thereby preventing the front window from being damaged by an external impact.

The inner support structure 22 according to various embodiments may be disposed inside the electronic device 20 and used as a component for strengthen overall rigidity of the electronic device. For example, at least one of metallic materials, i.e., Al, Mg, and STS, may be used for the inner support structure 22. According to an embodiment, the inner support structure 22 may be constructed by using highly rigid plastic containing glass fiber, or a may be constructed by using metal and plastic together. According to an embodiment, as a material of the inner support structure 22, when a metal member and a non-metal member are used together, the inner support structure 22 may be constructed in such a manner that the non-metal member is insert-injected to the metal member. The inner support structure 22 may be disposed to a rear face of the display module 23, may have a shape (curvature) similar to that of the rear face of the display module 23, and may support the display module 23. According to an embodiment, an elastic member such as a sponge or a rubber or an adhesive layer such as a double-sided tape or, alternatively, a kind of sheet such as a single-sided tape may be further disposed between the inner support structure 22 and the display module 23 to protect the display module 23.

The electronic device 20 according to various embodiments may be constructed optionally by adding a plate-shaped metallic material or, alternatively, a composite material to a hole region to reinforce internal rigidity, or may further include an auxiliary device to improve a thermal characteristic, an antenna characteristic, or the like.

The inner support structure 22 according to various embodiments may be joined to the housing (e.g., rear case) 21 to provide an inner space in which at least one electronic component can be disposed. The electronic component may include the Printed Circuit Board (PCB) 26. However, the present disclosure is not limited thereto, and thus, in addition to the PCB 26, may include an antenna device, a sound device, a power supply device, a sensor device, or the like.

The battery pack 27 according to various embodiments may supply power to the electronic device 20. According to an embodiment, one face of the battery pack 27 is adjacent to the display module 23 and the other face thereof is adjacent to the rear window 25, which may cause deformation and breakage of a counterpart object when the battery pack 27 is swollen at the time of charging. In order to prevent this, a swelling gap may be provided between the battery pack 27 and the counterpart object. According to an embodiment, the battery pack 27 may be disposed integrally with respect to the electronic device 20. However, the present disclosure is not limited thereto, and thus when the rear window 25 is implemented in a detachable manner in the electronic device 20, the battery pack 27 may be implemented in a detachable manner.

The housing 21 according to various embodiments may construct an outer portion (e.g., a side face including a metal bezel) of the electronic device 20, and may be combined with the inner support structure 22 to provide an inner space. According to an embodiment, the front window 24 may be disposed to the front face of the housing 21, and the rear window 25 may be disposed to the rear face thereof. However, the present disclosure is not limited thereto, and thus the rear face may be implemented in various ways such as injection using synthetic resin, metal, composite of metal and synthetic resin, or the like. According to an embodiment, a gap between the housing 21 and an internal structure constructed by the rear window 25 may prevent breakage of the rear window 25 against a secondary blow caused by the internal structure when an external impact such as a drop of the electronic device occurs.

The wireless power transmitting/receiving member 28 according to various embodiments may be disposed to the rear face of the housing 21. According to an embodiment, the wireless power transmitting/receiving member 28 constructed of a thin film in general is disposed in such a manner that it is attached to one side of an internal mounting component or, alternatively, a region of an internal side face of the housing 21, in particular, a region mostly adjacent to the rear window 25 in general, and includes a structure which constructs a contact point with the internal PCB 26. According to an embodiment, the wireless power transmitting/receiving member 28 may be embedded or, alternatively, attached as a component such as the battery pack 27 or the like or, alternatively, as a portion of the housing 21, and may be provided in such a manner that it is attached simultaneously to the component and the housing 21.

The second adhesive member 292 according to various embodiments may be applied in a similar manner to the aforementioned first adhesive member 291 as a component for fixing the rear window 25 to the housing 21.

According to various embodiments, the rear window 25 may be applied in a similar manner to the aforementioned front window 24. According to an embodiment, the front face (a face exposed to the outside) of the rear window 25 may have a curvature inclined toward both left and right ends. The rear face of the rear window 25 according to an embodiment may be constructed as a plane and may be bonded to the housing 21 by means of the second adhesive member 292.

Figure 3:
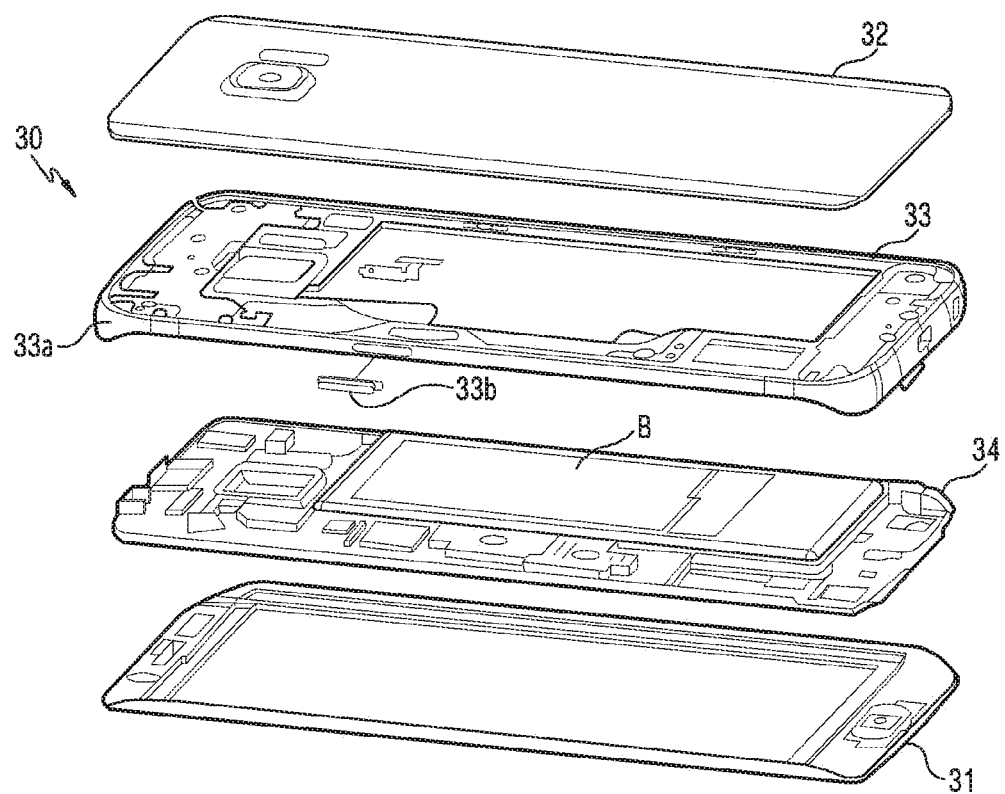
FIG. 3 is an exploded perspective view illustrating an electronic device according to various embodiments.

FIG. 3 is an exploded perspective view illustrating a main configuration of an electronic device according to various embodiments.

Referring to FIG. 3, an electronic device 30 according to various embodiments may be the same electronic device as the electronic device 20 of FIG. 2 or may be at least part of the electronic device.

The electronic device 30 according to various embodiments may have at least one member related to an exterior and disposed to an outer surface. For example, an exterior member such as a case 33 or the like including a front cover 31, a rear cover 32, and a sidewall 33a located at side faces may be disposed to most of the exterior of the electronic device 30. As another example, the exterior of the electronic device 30 may have a home key, a receiver, or the like disposed to a front face, may have a member such as a rear camera or flash, or, alternatively, a speaker disposed to a rear face, and may have a plurality of physical keys, a connector, or, alternatively, a microphone hole, or the like disposed to the sidewall 33a.

The electronic device 30 according to various embodiments may require a configuration for preventing an external environment, for example, a foreign material such as water, from penetrating into members disposed to the exterior. The electronic device 30 according to various embodiments may include the front cover 31, the rear cover 32, the case 33, a structure 34, and a waterproof structure.

The front cover 31 according to various embodiments may construct the front face of the electronic device 30, and may serve as a front exterior. The front cover of the electronic device 30 according to various embodiments may be constructed of a transparent member. For example, the transparent member may include transparent synthetic resin or glass. A display supported by the structure may include a screen region exposed through the front cover.

The rear cover 32 according to various embodiments may constitute a rear face of the electronic device 30, and may serve as a rear exterior. The rear cover 32 of the electronic device 30 according to various embodiments may be constructed of a transparent or, alternatively, opaque member. For example, the transparent member may include transparent synthetic resin or glass, and the opaque member may be constructed of a material such as translucent/opaque synthetic resin or metal.

The sidewall 33a of the case 33 according to various embodiments may constitute a side face of a boundary of the electronic device 30, and may serve as a side exterior. The sidewall 33a of the electronic device according to various embodiments may be constructed of a conductive material, that is, a conductive sidewall. For example, the sidewall may be constructed of a metallic material, and may operate as an antenna radiator. The sidewall 33a according to various embodiments may at least partially surround a circumference of a space provided by the front cover 31 and the rear cover 32. The sidewall 33a according to various embodiments may be constructed integrally with respect to a conductive structure or a non-conductive structure.

The inner support structures 34 according to various embodiments may be plural in number. A first structure may be constructed to support a display, a substrate, or the like, and a second structure may be constructed to support an exterior member. For example, a structure capable of supporting and protecting other components such as a battery B may be constructed. The inner support structure 34 according to various embodiments may be constructed of synthetic resin, metal, or, alternatively, a combination thereof, and may be constructed of a metal alloy which contains magnesium. A reference numeral 33b indicates a side key.

Hereinafter, a configuration of a pressure sensor mounted to an electronic device will be described with reference to the accompanying drawings.

Figure 4A:
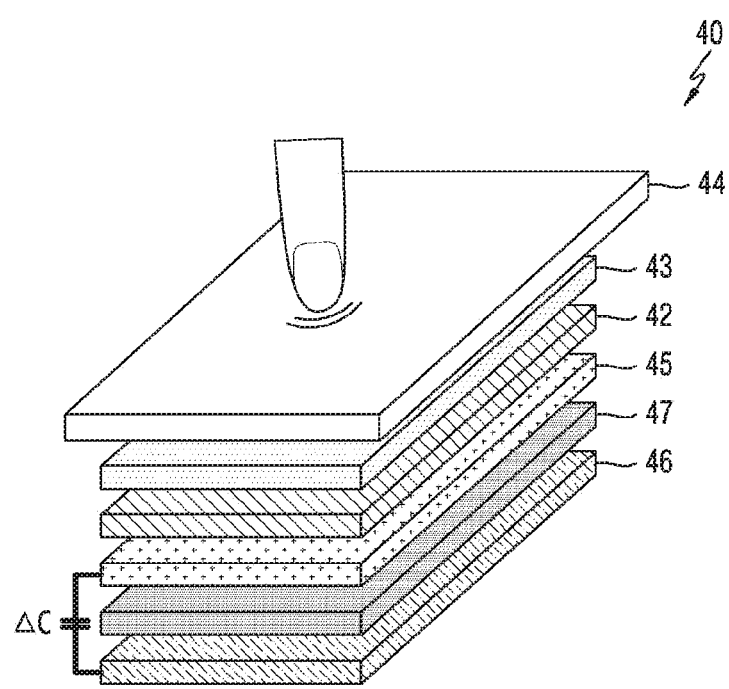
FIG. 4A is a perspective view illustrating a configuration of a pressure sensor according to various embodiments.
Figure 4B:
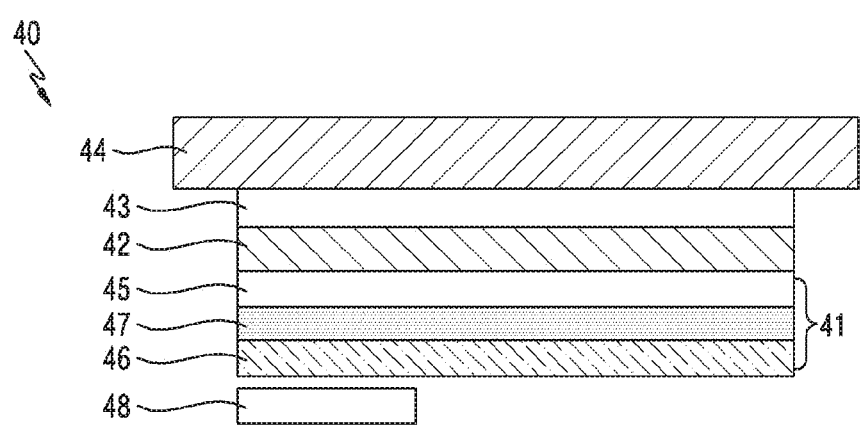
FIG. 4B is a cross-sectional view illustrating a configuration of a pressure sensor according to various embodiments.

FIG. 4A is a perspective view illustrating a configuration of a pressure sensor according to various embodiments. FIG. 4B is a cross-sectional view illustrating a configuration of a pressure sensor according to various embodiments.

Referring to FIG. 4A and FIG. 4B, an electronic device 40 according to various embodiments may include a display 42, a touch sensor 43, a pressure sensor 41, and a transparent plate 44. The display 42 according to various embodiments may include the touch sensor 43 disposed to a first face facing a first direction, a pressure sensor disposed to a second face facing a second direction opposite to the first direction, and the transparent plate 44 disposed to a face facing the first direction of the touch sensor 43. The transparent plate 44 may be a cover window.

For example, as a protective member served as a transparent cover or a transparent window, the transparent plate 44 may be constructed of a material having an excellent property in terms of light transmission, heat resistance, chemical resistance, mechanical strength, or the like. The transparent cover 44 may be a glass substrate or a transparent film constructed of, for example, polymer or the like.

For example, the transparent cover 44 may include any one, or a combination of two, selected from Acrylonitrile Butadiene Styrene (ABS), acrylic, PolyCarbonate (PC), PolyMethyl MethAcrylate (PMMA), PolyImide (PI), PolyEthylene Terephthalate (PET), PolyPropylene Terephthalate (PPT), Amorphous PolyEthylene Terephthalate (APET), Polyethylene Naphthalate Terephthalate (PEN), PolyEthylene Terephthalate Glycol (PETG), Tri-Acetyl-Cellulose (TAC), Cyclic Olefin Polymer (COP), Cyclic Olefin Copolymer (COC), poly-DicyCloPentaDiene (DCPD), CycloPentDienyl anions (CPD), PolyARylate (PAR), PolyEtherSulfone (PES), Poly Ether Imide (PEI), a modified epoxy resin, and an acrylic resin. Alternatively, the transparent plate 44 may be a variety of high hardness films. When the transparent plate 44 is the high hardness film, coating of a surface treatment portion may be hard coating.

The pressure sensor 41 according to various embodiments may include a first electrode 45, a second electrode 46, and a dielectric layer 47 disposed between the first and second electrodes 45 and 46. The pressure sensor 41 may sense a capacitance value based on a change in a distance between the first electrode 45 and the second electrode 46 to output the value to a processor. The dielectric layer 47 may be constructed of a material of which a thickness varies depending on pressure externally applied. For example, the dielectric layer 47 may have elasticity force and restoration force. Accordingly, the dielectric layer 47 may have a thickness which varies depending on an input of an external object.

For example, the dielectric layer 47 may include any one, or a combination of two, selected from silicon, air, membrane, double-sided adhesive film, Pressure Sensitive Adhesive (PSA), Optically Clear Adhesive (OCA), Optical Clear Resin (OCR), sponge, rubber, ink, Acrylonitrile Butadiene Styrene (ABS), acrylic, PolyCarbonate (PC), PolyMethyl MethAcrylate (PMMA), PolyImide (PI), PolyEthylene Terephthalate (PET), PolyPropylene Terephthalate (PPT), Amorphous PolyEthylene Terephthalate (APET), Polyethylene Naphthalate Terephthalate (PEN), PolyEthylene Terephthalate Glycol (PETG), Tri-Acetyl-Cellulose (TAC), Cyclic Olefin Polymer (COP), Cyclic Olefin Copolymer (COC), poly-DicyCloPentaDiene (DCPD), CycloPentDienyl anions (CPD), PolyARylate (PAR), PolyEtherSulfone (PES), Poly Ether Imide (PEI), a modified epoxy resin, and an acrylic resin.

For example, a transparent electrode of the pressure sensor 41 may include ITO, IZO, PEDOT, Ag nanowire, metal mesh, transparent polymer conductors, graphene, or the like. An opaque electrode of the pressure sensor may include Ag, Cu, Mg, Ti, Al, graphene, or the like.

A haptic actuator 48 may be disposed to a place spaced apart from the display 42. The haptic actuator 48 may provide a vibration or haptic effect according to pressure of an external object. The haptic actuator 48 may provide the vibration or haptic effect differently according to a magnitude of the pressure. For example, the greater the pressure of the external object, the greater the vibration or haptic effective provided by the haptic actuator 48.

An electrode pattern of a pressure sensor will be described according to various embodiments with reference to FIG. 5A and FIG. 5B.

Figure 5A:
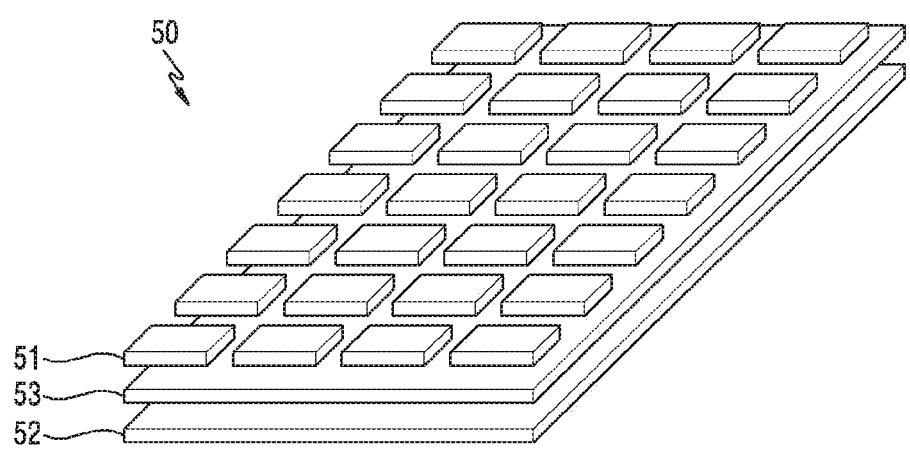
FIG. 5A and FIG. 5B are perspective views illustrating an electrode of a pressure sensor according to various embodiments.

Referring to FIG. 5A, a pressure sensor 50 according to various embodiments is a self-capacitance type, and may include a first electrode 51, a second electrode 52, and a dielectric layer 53 disposed between the first and second electrodes 51 and 52. The first electrode 51 may have conductive patterns disposed with an equal interval along a landscape direction and disposed with an equal interval along a portrait direction. The second electrode 52 may be disposed in a plate shape. Patterns of the first electrode 51 and the second electrode 52 may be changed to each other.

Figure 5B:
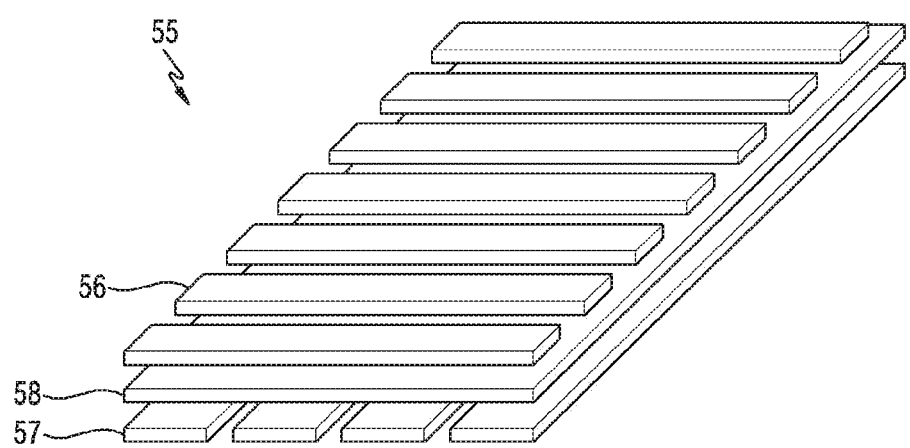

Referring to FIG. 5B, a pressure sensor 55 according to various embodiments is a mutual-capacitance type, and may include a first electrode 56, a second electrode 57, and a dielectric layer 58 disposed between the first and second electrodes 56 and 57. The first electrode 56 may have conductive patterns extended along the landscape direction and disposed with an equal interval. The second electrode 57 may be extended along the portrait direction and disposed with an equal interval. The first electrode 56 and the second electrode 57 may be disposed in directions crossing each other. Patterns of the first electrode 56 and the second electrode 57 may be changed to each other.

Figure 6:
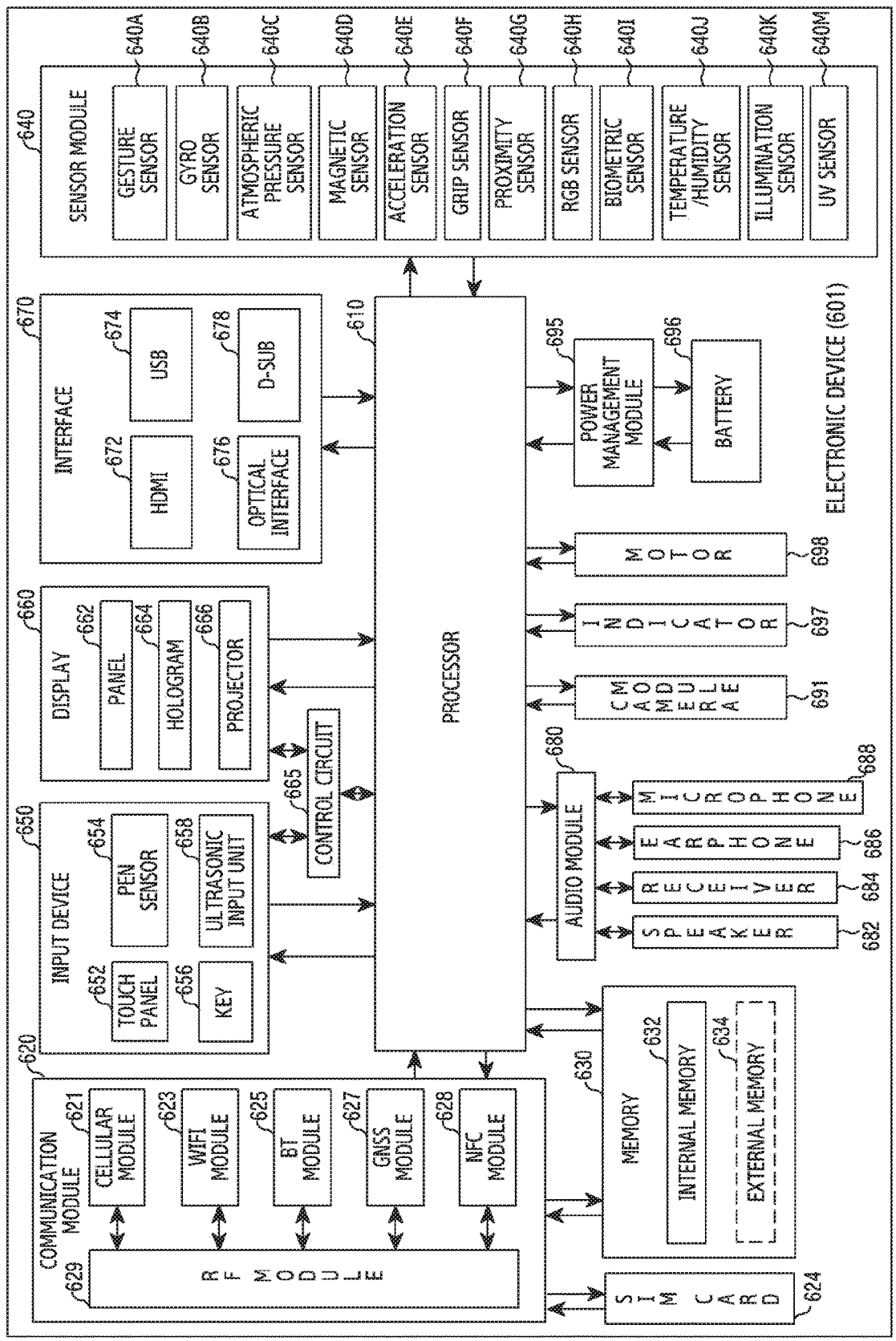
FIG. 6 is a block diagram illustrating a configuration of an electronic device according to various embodiments.

FIG. 6 is a block diagram of an electronic device 601 according to various embodiments.

Referring to FIG. 6, the electronic device 601 according to various embodiments may include, for example, all or part of the electronic device 10 of FIG. 1A to FIG. 1C.

The electronic device 601 according to various embodiments may include one or more processors (e.g., Application Processors (APs)) 610, a communication module 620, a subscriber identity module 624, a memory 630, a sensor module 640, an input unit 650, a display 660, an interface 670, an audio module 680, a camera unit 691, a power management module 695, a battery 696, an indicator 697, and a motor 698. The processor 610 may control a plurality of hardware or software components coupled with the processor 610 by driving, for example, an operating system or an application program, and may perform various data processing and computations. The processor 610 may be implemented, for example, with a System on Chip (SoC). According to an embodiment, the processor 610 may further include a Graphic Processing Unit (GPU) and/or an image signal processor. The processor 610 may include at least part (e.g., a cellular module 621) of the aforementioned components of FIG. 6. The processor 610 may process a command or data, which is received from at least one of different components (e.g., a non-volatile memory), by loading it to a volatile memory and may store a variety of data in the non-volatile memory.

The communication module 620 according to various embodiments may include, for example, the cellular module 621, a WiFi module 623, a BlueTooth (BT) module 625, a GNSS module 627, a Near Field Communication (NFC) module 628, and a Radio Frequency (RF) module 629. The cellular module 621 may provide a voice call, a video call, a text service, an Internet service, or the like, for example, through a communication network. According to an embodiment, the cellular module 621 may identify and authenticate the electronic device 601 in the communication network by using a subscriber identity module (e.g., a SIM card 624). According to an embodiment, the cellular module 621 may perform at least some functions that can be provided by the AP 610. According to an embodiment, the cellular module 621 may include a Communication Processor (CP). According to some embodiments, at least some (e.g., two or more) of the cellular module 621, the WiFi module 623, the BT module 625, the GPS module 627, and the NFC module 628 may be included in one Integrated Chip (IC) or IC package. The RF module 629 may transmit/receive, for example, a communication signal (e.g., a Radio Frequency (RF) signal). The RF module 629 may include, for example, a transceiver, a Power Amp Module (PAM), a frequency filter, a Low Noise Amplifier (LNA), an antenna, or the like. According to another embodiment, at least one of the cellular module 621, the WiFi module 623, the BT module 625, the GPS module 627, and the NFC module 628 may transmit/receive an RF signal via a separate RF module. The SIM card 624 may include, for example, a card including a SIM and/or an embedded SIM, and may include unique identification information (e.g., an Integrated Circuit Card IDentifier (ICCID)) or subscriber information (e.g., an International Mobile Subscriber Identity (IMSI)).

The memory 630 according to various embodiments may include, for example, an internal memory 632 or an external memory 634. The internal memory 632 may include, for example, at least one of a volatile memory (e.g., a Dynamic RAM (DRAM), a Static RAM (SRAM), a Synchronous Dynamic RAM (SDRAM), etc.) and a non-volatile memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory, a hard drive, or a Solid State Drive (SSD)). The external memory 634 may further include a flash drive, for example, Compact Flash (CF), Secure Digital (SD), Micro Secure Digital (Micro-SD), Mini Secure digital (Mini-SD), extreme Digital (xD), memory stick, or the like. The external memory 634 may be operatively and/or physically coupled with the electronic device 601 via various interfaces.

The sensor module 640 according to various embodiments may measure, for example, physical quantity or detect an operational status of the electronic device 601, and may convert the measured or detected information into an electric signal. The sensor module 640 may include, for example, at least one of a gesture sensor 640A, a gyro sensor 640B, a pressure sensor 640C, a magnetic sensor 640D, an acceleration sensor 640E, a grip sensor 640F, a proximity sensor 640G, a color sensor 640H (e.g., a Red, Green, Blue (RGB) sensor), a bio sensor 640I, a temperature/humidity sensor 640J, an illumination sensor 640K, and an Ultra Violet (UV) sensor 640M. Additionally or alternatively, the sensor module 640 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 640 may further include a control circuit for controlling at least one or more sensors included therein. In some embodiments, the electronic device 601 may further include a processor configured to control the sensor module 604 either separately or as a part of the AP 610, and may control the sensor module 640 while the AP 610 is in a sleep state.

The input device 650 according to various embodiments may include, for example, a touch sensor module panel 652, a pressure sensor (or a "force sensor" interchangeably used hereinafter) module 653, a (digital) pen sensor 654, a key 656, or an ultrasonic input unit 658. The touch sensor module 652 may detect a 2-dimensional coordinate. The touch sensor module 652 may detect a touch position (X, Y). The touch sensor module panel 652 may recognize a touch input, for example, by using at least one of an electrostatic type, a pressure-sensitive type, and an ultrasonic type. The touch sensor module panel 652 may further include a control circuit. The touch panel 652 may further include a tactile layer and thus may provide the user with a tactile reaction. The pressure sensor module 653 may detect strength of pressure for a user's touch. The pressure sensor module 653 may detect a pressure value Z at the touch position (X, Y). The pressure sensor module 653 may further include a control circuit. In various embodiments, at least any one of configurations of the touch sensor module 652 and the pressure sensor module 653 may be shared with each other. The (digital) pen sensor 654 may be, for example, part of the touch panel, or may include an additional sheet for recognition. The key 656 may be, for example, a physical button, an optical key, a keypad, or a touch key. The ultrasonic input unit 658 may use a microphone (e.g., the microphone 688) to sense an ultrasonic wave generated in an input means, and may identify data corresponding to the sensed ultrasonic wave.

The display 660 according to various embodiments may include a panel 662, a hologram 664, a projector 666, and/or a control circuit for controlling these elements. The panel 662 may be implemented, for example, in a flexible, transparent, or wearable manner. The panel 662 may be constructed as one module with the touch panel 652. The hologram 664 may use an interference of light and show a stereoscopic image in the air. The projector 666 may display an image by projecting a light beam onto a screen. The screen may be located, for example, inside or outside the electronic device 601. The interface 670 may include, for example, a High-Definition Multimedia Interface (HDMI) 672, a Universal Serial Bus (USB) 674, an optical communication interface 676, or a D-subminiature (D-sub) 678. Additionally or alternatively, the interface 670 may include, for example, a Mobile High-definition Link (MHL) interface, a Secure Digital (SD)/Multi-Media Card (MMC) interface, or an Infrared Data Association (IrDA) standard interface.

The control circuit 665 according to various embodiments may be electrically coupled to the input device 650 and/or the display 660. The control circuit 665 may drive the input device 650 and/or the display 660. For example, the control circuit 665 may apply a driving signal to the input device 650 and/or the display 660, or may receive the driving signal from the input device 650 and/or the display 660. For example, the control circuit 665 may apply the driving signal to at least any one of the touch sensor module 652, the pressure sensor module 653, and the display 660, or may receive the driving signal therefrom. Alternatively, the control circuit 665 may apply the driving signal to at least two or all of the touch sensor module 652, the pressure sensor module 653, and the display 660, or may receive the driving signal therefrom. For example, the control circuit 665 may apply the driving signal sequentially to the touch sensor module 652, the pressure sensor module 653, and the display 660.

Specifically, the control circuit 665 may apply a transmission signal to one electrode of the touch sensor module 652 and/or the pressure sensor module 653. Alternatively, the control circuit 665 may receive a reception signal from one electrode of the touch sensor module 652 and/or the pressure sensor module 653. Alternatively, the control circuit 665 may couple an electrode of the touch sensor module 652 and/or the pressure sensor module 653 to a ground. Alternatively, the control circuit 665 may control a gate of a sub-pixel (RGB) in the display 660, or may apply a video signal to the sub-pixel (RGB).

The audio module 680 according to various embodiments may bilaterally convert, for example, a sound and electric signal. The audio module 680 may convert sound information which is input or output, for example, through a speaker 682, a receiver 684, an earphone 686, the microphone 688, or the like. The camera module 691 is, for example, a device for image and video capturing, and according to an embodiment, may include one or more image sensors (e.g., a front sensor or a rear sensor), a lens, an Image Signal Processor (ISP), or a flash (e.g., LED or xenon lamp). The power management module 695 may manage, for example, power of the electronic device 601. According to an embodiment, the power management module 695 may include a Power Management Integrated Circuit (PMIC), a charger Integrated Circuit (IC), or a battery fuel gauge. The PMIC may have a wired and/or wireless charging type. The wireless charging type may include, for example, a magnetic resonance type, a magnetic induction type, an electromagnetic type, or the like, and may further include an additional circuit for wireless charging, for example, a coil loop, a resonant circuit, a rectifier, or the like. The battery gauge may measure, for example, residual quantity of the battery 696 and voltage, current, and temperature during charging. The battery 696 may include, for example, a rechargeable battery and/or a solar battery.

The indicator 697 according to various embodiments may indicate a specific state, for example, a booting state, a message state, a charging state, or the like, of the electronic device 601 or a part thereof. The motor 698 may convert an electric signal into a mechanical vibration, and may generate a vibration or haptic effect. For example, the motor 698 may be a haptic actuator. The electronic device 601 may include a mobile TV supporting device (e.g., GPU) capable of processing media data according to a protocol of, for example, Digital Multimedia Broadcasting (DMB), Digital Video Broadcasting (DVB), mediaFlo™, or the like. Each of the components described in the present document may consist of one or more components, and names thereof may vary depending on a type of electronic device. In various embodiments, some of components of the electronic device (e.g., the electronic device 601) may be omitted, or additional components may be further included. Alternatively, some of the components may be combined and constructed as one entity, so as to equally perform functions of corresponding components before combination.

Figure 7:
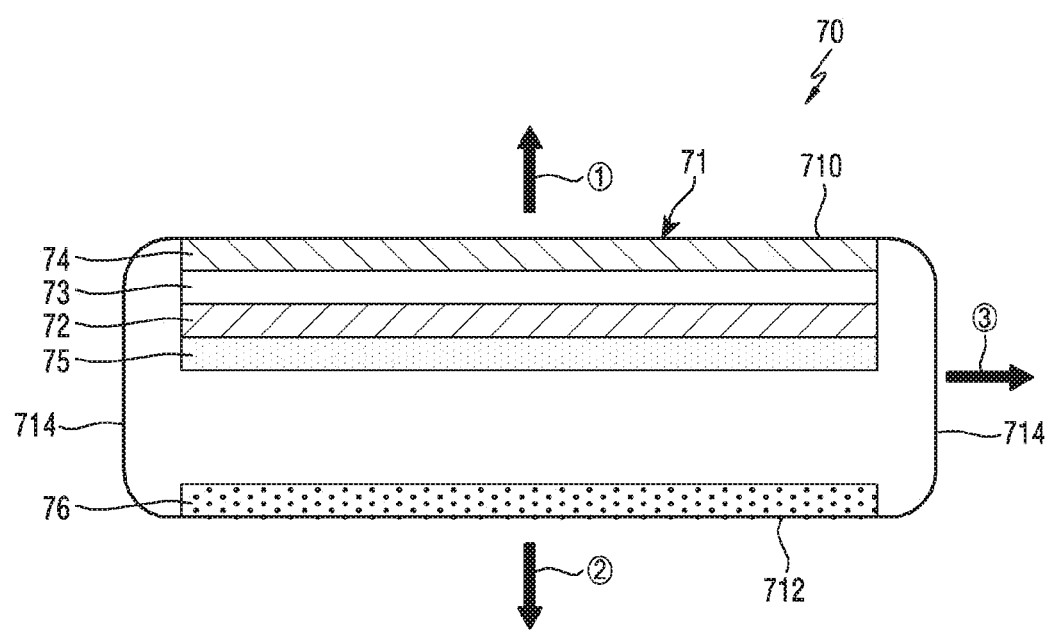
FIG. 7 is a cross-sectional view briefly illustrating a configuration of an electronic device equipped with a pressure sensor according to various embodiments of the present disclosure.

FIG. 7 is a cross-sectional view briefly illustrating a configuration of an electronic device equipped with a pressure sensor according to various embodiments of the present disclosure.

Referring to FIG. 7, an electronic device 70 according to various embodiments may include a housing 71 which accommodates various electronic components or the like. For example, the housing 71 may be constructed of a non-conductive material or a conductive material. In addition, the housing 71 may be at least partially constructed of the non-conductive material or may be at least partially constructed of the conductive material. For example, the non-conductive material may include synthetic resin or ceramic materials, and the conductive material may include metal, alloy, or the like.

The housing 71 according to various embodiments may include a first face 710 facing a first direction and a second face 712 facing a second direction opposite to the first direction. The housing 71 may include a third face 714 facing a third direction perpendicular to the first direction and facing the third direction perpendicular to the second direction. The third face 714 may exist between the first and second faces 710 and 712. The third face 714 may be configured to cover a space between the first and second faces 710 and 712. In FIG. 7, the first face 710 may be an upper face, the second face 712 may be a lower face, and the third face 714 may be a side face. The first direction may be an upward direction, the second direction may be a downward direction, and the third direction may be a side direction.

The housing 71 according to various embodiments may include a touch sensor 73 and display 72 which are disposed between the first face 710 and the second face 712 and which can be exposed to the outside through the first face 710. The touch sensor 73 and the display 72 may be together referred to as the touch screen displays 73 and 72. For example, the housing 71 may have a transparent plate 74, for example, a cover window, mounted to protect the touch screen displays 73 and 72 disposed to be exposed to the first face 710.

The housing 71 according to various embodiments may include a first pressure sensor 75 disposed between the touch screen displays 73 and 72 and the second face 712 to sense pressure of an external object with respect to the touch screen displays 73 and 72.

The housing 71 according to various embodiments may include a second pressure sensor 76 coupled to the second face 712 to sense pressure of an external object with respect to the second face 712. The first and second pressure sensors 75 and 76 may be spaced apart from each other, and may be disposed in parallel to face each other.

The first pressure sensor 75 according to various embodiments may be disposed to all or at least part of a face facing a second direction of the display 72. The second pressure sensor 76 according to various embodiments may be disposed to all or at least part of the second face 712 of the housing.

The electronic device 70 according to various embodiments may provide a structure capable of sensing pressure through the first face 710 or second face 712 of the electronic device 70 by disposing the first pressure sensor 75 to the first face 710 of the housing and by disposing the second pressure sensor 76 to the second face 712. Since the second pressure sensor 76 is disposed to the second face 712 of the electronic device, a variety of UI/UX can be utilized by using the rear face of the housing.

The processor according to various embodiments may allow to execute a first action, based at least in part on sensing the pressure of the external object by the first pressure sensor 75, and may allow to execute a second action, based at least in part on sensing the pressure of the external object by the second pressure sensor 76. Such instructions may be stored in a memory. In addition, the processor may allow to execute a third action, based at least in part on sensing the pressure of the external object at least temporarily simultaneously by the first pressure sensor 75 and the second pressure sensor 76. Such instructions may be stored in the memory.

Figure 8A:
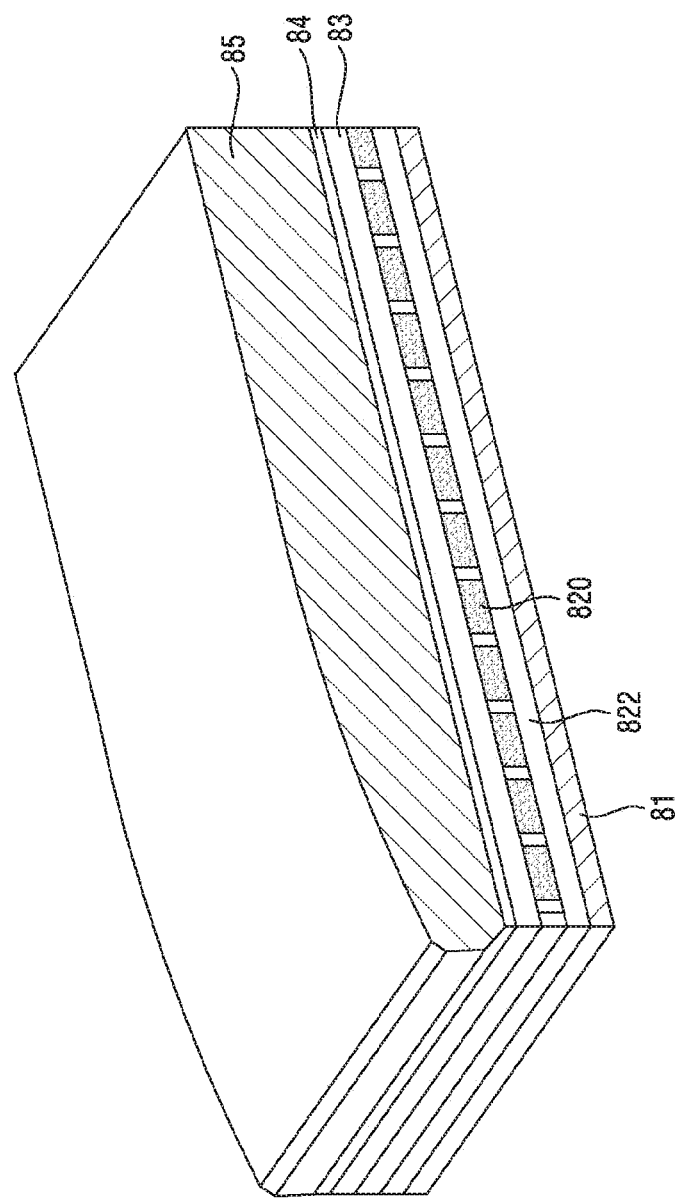
FIG. 8A is a perspective view illustrating a configuration of a pressure sensor according to various embodiments of the present disclosure.
Figure 8B:
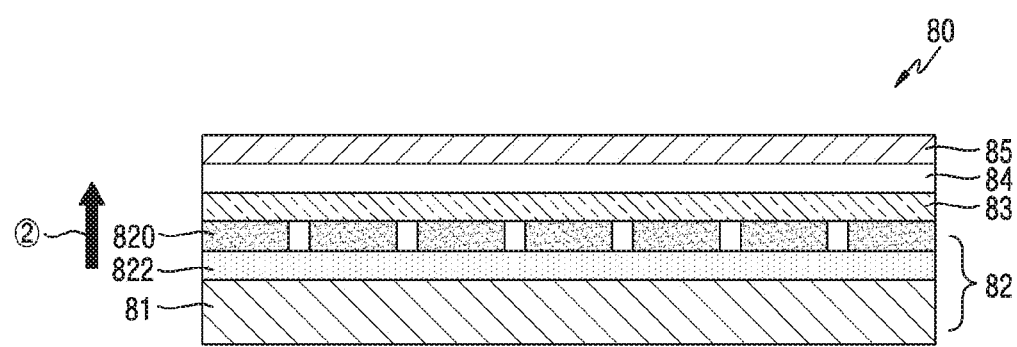
FIG. 8B is a cross-sectional view illustrating a configuration of a pressure sensor according to various embodiments of the present disclosure.

FIG. 8A is a partially cutaway perspective view illustrating a configuration of a pressure sensor according to various embodiments of the present disclosure. FIG. 8B is a cross-sectional view illustrating a configuration of a pressure sensor according to various embodiments of the present disclosure.

Referring to FIG. 8A and FIG. 8B, an electronic device 80 according to various embodiments may include a metal housing 81, a pressure sensor 82, a support member 83, a print layer 84, and a transparent plate 85.

The housing 81 according to various embodiments may at least partially include a conductive material. For example, the housing 81 may be referred to as a rear metal housing since at least part of a rear face is constructed of a metallic material. As will be described below, the rear metal housing may operate as one ground portion of the pressure sensor. In addition, the metal housing according to various embodiments is not necessarily limited to the rear metal housing, and may be equally applied to a side metal housing or an upper metal housing.

The pressure sensor 82 according to various embodiments may include a first electrode 820, the second electrode 81, and a dielectric layer 822 between the first and second electrodes 820 and 81. The first electrode 820 may have conductive patterns disposed by being patterned on one face of the support member 83. The second electrode 81 may be a ground electrode, and at least part of the rear metal housing may be utilized. The dielectric layer 822 may be disposed between the conductive pattern 820 and the rear metal housing 81.

At least part of the metal housing 81 according to various embodiments may be utilized as a ground electrode of the pressure sensor 82 as a protective case located in a rear face of the electronic device. The support member 83 according to various embodiments may have the plurality of conductive patterns 820 constructed in a film shape. For example, the support member 83 may include PET or the like. The support member 83 may be disposed to a place spaced apart from a second face of the metal housing 81 in a second direction. The conductive patterns 820 according to various embodiments may be disposed between the support member 83 and a conductive material of the housing 81, for example, a rear metal housing. The dielectric layer 822 according to various embodiments may be disposed between the metal housing 81 and the conductive patterns 820.

The electronic device 80 according to various embodiments may further include the transparent plate 85. The transparent plate 85 according to various embodiments may be spaced apart from the second face of the metal housing 81 in the second direction and may be extended substantially in parallel with the second face. The transparent plate 85 may be located at the outermost portion of the rear face of the electronic device 80, and may be responsible for at least part of an exterior of the electronic device 80. The support member 83 may be disposed between the transparent plate 85 and the second face of the metal housing 81. For example, the transparent plate 85 may be constructed of a transparent synthetic resin, glass material, or the like.

The electronic device 80 according to various embodiments may further include the print layer 84 to coat color on the exterior. The print layer 84 may be disposed to one face of the support member 83 to provide color to the exterior of the electronic device 80. The print layer 84 may be spaced apart from the second face of the metal housing 81 in the second direction, and may be extended substantially in parallel with the second face of the metal housing 81. The support member 83 may be disposed between the print layer 84 and the second face of the metal housing 81.

The aforementioned pressure sensor 82 of the electronic device 80 may be electrically coupled to at least one processor. The processor may be electrically coupled to a memory.

Figure 9:
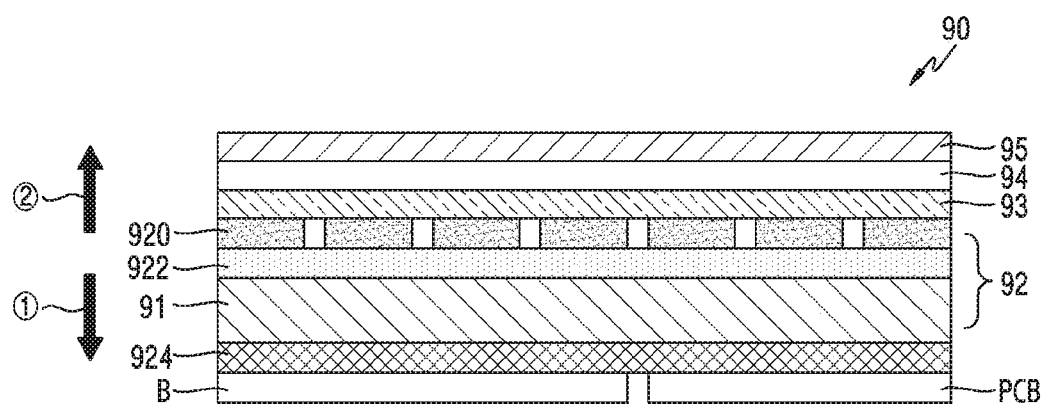
FIG. 9 is a cross-sectional view illustrating a configuration of a pressure sensor according to various embodiments of the present disclosure.

FIG. 9 is a cross-sectional view illustrating a configuration of a pressure sensor according to various embodiments of the present disclosure.

Referring to FIG. 9, an electronic device 90 according to various embodiments will be described only in terms of differences, compared to the electronic device 80 of FIG. 8. The pressure sensor 82 of FIG. 8 may utilize the rear metal housing 81 as a ground electrode (a second electrode), whereas a pressure sensor 92 of FIG. 9 may utilize an inner support structure 924, for example, a bracket, as a ground electrode. In addition thereto, since configurations of a dielectric layer 922, conductive patterns 920, a print layer 94, and a transparent plate 95 have been already described in detail, descriptions thereof will be omitted.

The inner support structure 924 according to various embodiments has been described in detail with reference to FIG. 2. The inner support structure 924 is a support member for fixing a Printed Circuit Board (PCB), a battery B, or the like in the housing, and may be constructed of a metal material, an alloy material, or synthetic resin. The inner support structure 924 according to various embodiments may be constructed of a conductive material.

The pressure sensor 92 according to various embodiments may include the conductive patterns 920, the inner support structures 924, and the dielectric layer 922 disposed between them. The rear housing 91 according to various embodiments may be constructed of a non-conductive member such as synthetic resin.

Figure 10A:
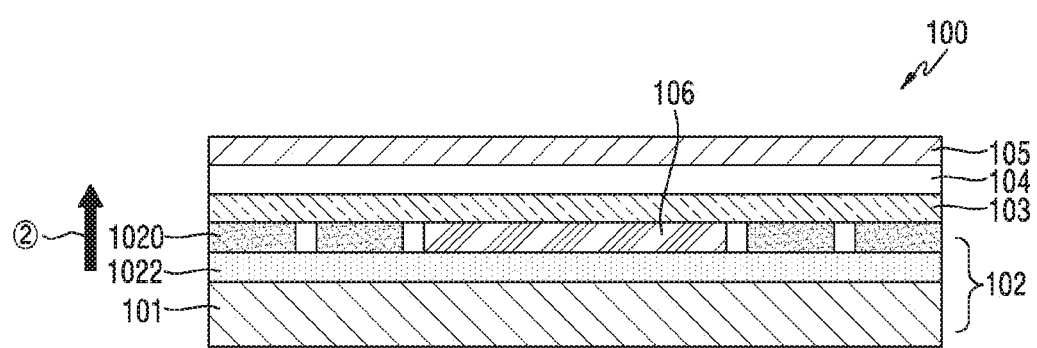
FIG. 10A is a cross-sectional view illustrating a configuration of a pressure sensor according to various embodiments of the present disclosure.
Figure 10B:
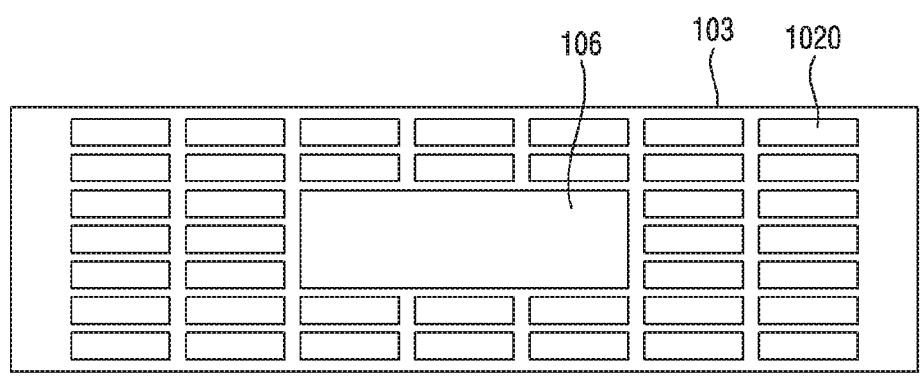
FIG. 10B is a plan view illustrating a configuration of a pressure sensor according to various embodiments of the present disclosure.

FIG. 10A is a cross-sectional view illustrating a configuration of a pressure sensor according to various embodiments of the present disclosure. FIG. 10B is a plan view illustrating a configuration of a pressure sensor according to various embodiments of the present disclosure.

Referring to FIG. 10A and FIG. 10B, an electronic device 100 according to various embodiments will be described only in terms of differences, compared to the electronic device 80 of FIG. 8. The electronic device 100 of FIG. 10A and FIG. 10B may have an antenna 106 disposed without overlapping with a conductive pattern 1020. In addition thereto, since configurations of a dielectric layer 1022, the conductive patterns 1020, a print layer 104, and a transparent plate 105 have been already described in detail, descriptions thereof will be omitted.

The antenna 106 according to various embodiments may be disposed adjacent to a second face of a rear metal housing 101. For example, the conductive patterns 1020 may be disposed in parallel without overlapping with the antenna 106. When viewed from above the second face of the rear metal housing 101, the at least one antenna 106 may be disposed to be surrounded by the conductive patterns 1020, while being disposed between the conductive patterns 1020, in a state of not overlapping with the conductive patterns 1020. For example, the antenna 106 may be disposed to a central region of the plurality of conductive patterns 1020.

The antenna 106 according to various embodiments may include any one of a Near Field Communication (NFC) antenna, an MST antenna, and a wireless charging antenna, or may include at least two antennas or three antennas.

A pressure sensor 102 according to various embodiments may include the conductive patterns 1020, the rear metal housing 101, and the dielectric layer 1022 disposed between the conductive patterns 1020 and the rear metal housing 101. The conductive patterns 1020 may be patterned with an equal interval on one face of a support member 103. The conductive patterns 1020 may be utilized as a first electrode of the pressure sensor 102, and the rear metal housing 101 may be utilized as a second electrode, e.g., a ground electrode, of the pressure sensor 102.

Figure 11:
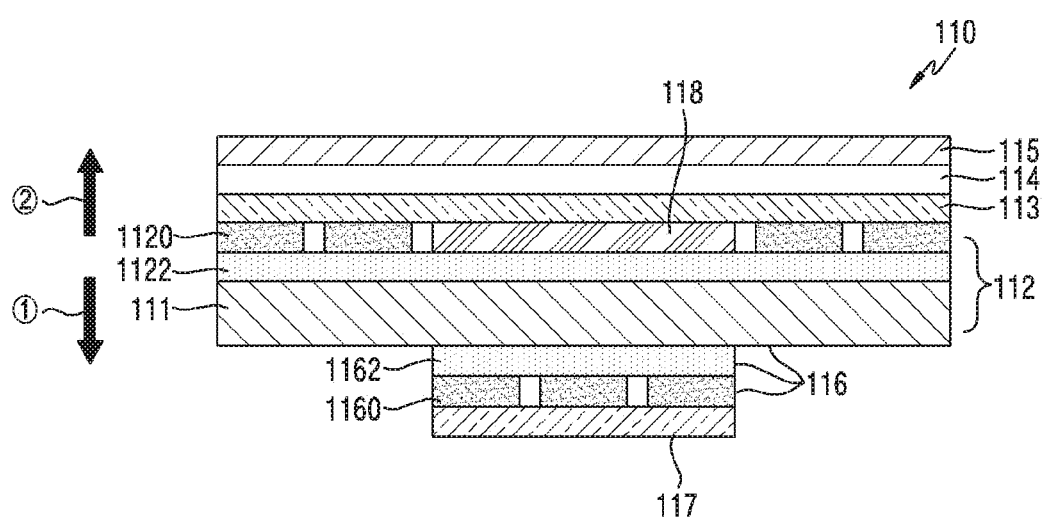
FIG. 11 is a cross-sectional view illustrating a configuration of a pressure sensor according to various embodiments of the present disclosure.

FIG. 11 is a cross-sectional view illustrating a configuration of a pressure sensor according to various embodiments of the present disclosure.

Referring to FIG. 11, an electronic device 110 according to various embodiments will be described only in terms of differences, compared to the electronic device 100 of FIG. 10. The electronic device 110 of FIG. 11 may have first and second pressure sensors 112 and 116 using a shared rear metal housing 111.

The first pressure sensor 112 according to various embodiments may be disposed in a second direction of the rear metal housing 111, and the second pressure sensor 116 may be disposed in a first direction of the rear metal housing 111.

The first pressure sensor 112 according to various embodiments may include a first support member 113, first conductive patterns 1120, a first dielectric layer 1122, and the shared rear metal housing 111. The first pressure sensor 112 according to various embodiments may include the rear metal housing 111, the first support member 113 spaced apart from the rear metal housing 111 in a first direction, the first conductive patterns 1120 disposed between the first support members 113, and the first dielectric layer 1122 disposed between the rear metal housing 111 and the first conductive patterns 1120. The first pressure sensor 112 may operate the first conductive patterns 1120 as a first electrode, and may utilize the rear metal housing 111 as a second electrode, i.e., a ground electrode.

The second pressure sensor 116 according to various embodiments may include a second support member 117, second conductive patterns 1160, a second dielectric layer 1162, and the shared rear metal housing 111. The second pressure sensor 116 according to various embodiments may include the shared rear metal housing 111, the second support member 117 spaced apart from the shared rear metal housing 111 in a second direction, the second conductive patterns 1160 disposed between the second support members 117, and the second dielectric layer 1162 disposed between the rear metal housing 111 and the second conductive patterns 1160. The second pressure sensor 116 may operate the second conductive patterns 1160 as a first electrode, and may utilize the shared rear metal housing 111 as a second electrode, i.e., a ground electrode. The rear metal housing 111 may be utilized as a ground electrode of each of the first and second sensors 112 and 116. The second pressure sensor 116 may be disposed in an inner direction of the electronic device about the rear metal housing 111, and the second pressure sensor 112 may be disposed in an outer direction of the electronic device to face the first pressure sensor 116. In addition thereto, since configurations of a print layer and a transparent plate have been already described in detail, descriptions thereof will be omitted.

Figure 12:
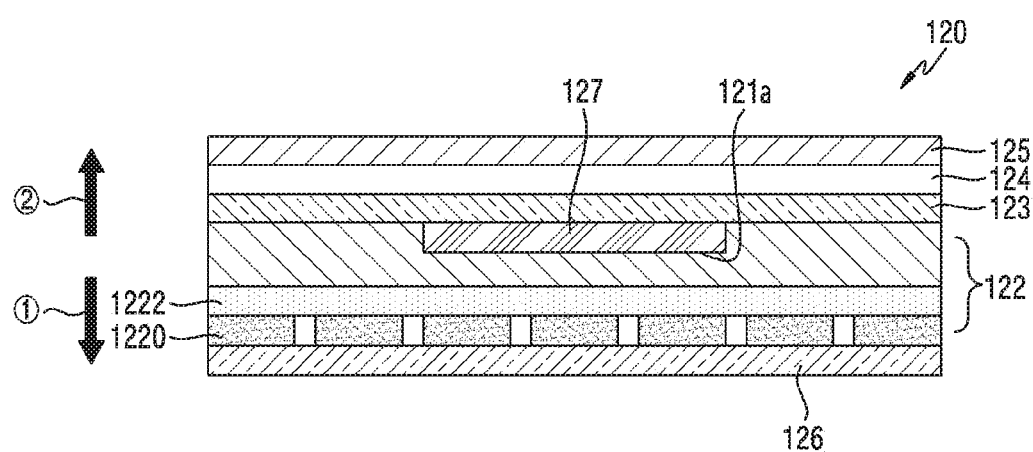
FIG. 12 is a cross-sectional illustrating a configuration of a pressure sensor according to various embodiments of the present disclosure.

FIG. 12 is a cross-sectional illustrating a configuration of a pressure sensor according to various embodiments of the present disclosure.

Referring to FIG. 12, an electronic device 120 according to various embodiments may have a pressure sensor 122 disposed inside, i.e., in a first direction, of a real metal housing 121, and may have an antenna 127 disposed outside, i.e., in a second direction, of the real metal housing 121.

The electronic device 120 according to various embodiments may include a first support member 126, conductive patterns 1220, and a dielectric layer 1222 in the first direction of the rear metal housing 121.

The first support member 126 according to various embodiments may be disposed to a place spaced apart from the rear metal housing 121 in the first direction, and at least one conductive pattern 1220 may be disposed to a face facing the second direction. The dielectric layer 1222 may be disposed between the rear metal housing 121 and the at least one conductive pattern 1220 to operate as a pressure sensor. The pressure sensor 122 may operate the conductive patterns 1220 as a first electrode, and may operate the rear metal housing 121 as a second electrode, i.e., a ground electrode.

The rear metal housing 121 according to various embodiments may have a recess 121a disposed to a face facing the second direction, and may have the antenna 127 disposed to the recess 121a. The recess 121a may have a volume sufficient to accommodate the antenna 127. A second support member 123 may be disposed to a face of the rear metal housing 121. A print layer 124 may be disposed to a face facing the second direction of the second support member 123. A transparent plate 125 may be disposed to one face of the print layer 124. Since the second support member 123, the print layer 124, and the transparent plate 125 have already been described in detail with reference to FIG. 10A and FIG. 10B, descriptions thereof will be omitted.

The antenna 127 according to various embodiments may include any one of a Near Field Communication (NFC) antenna, an MST antenna, and a wireless charging antenna, or may include at least two antennas or three antennas.

Figure 13:
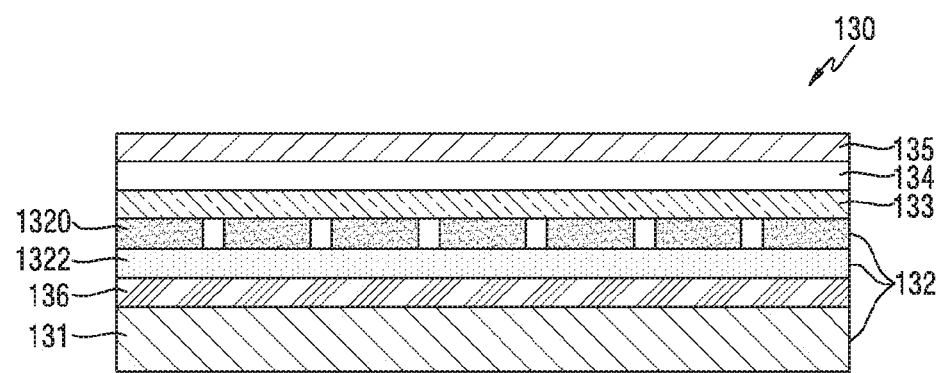
FIG. 13 is a cross-sectional view illustrating a configuration of a pressure sensor according to various embodiments of the present disclosure.

FIG. 13 is a cross-sectional view illustrating a configuration of a pressure sensor according to various embodiments of the present disclosure.

Referring to FIG. 13, an electronic device 130 according to various embodiments may include a rear metal housing 131, a support member 133, conductive patterns 1320, a dielectric layer 1322, and an antenna 136. The electronic device 130 according to various embodiments may include the rear metal housing 131, the support member 133 spaced apart from the rear metal housing 131 in a second direction, the conductive patterns 1320 disposed to one face of the support member 133, and the dielectric layer 1322 disposed between the rear metal housing 131 and the conductive patterns 1320.

The antenna 136 according to various embodiments may be disposed between the dielectric layer 1322 and a face facing the second direction of the rear metal housing 131. The antenna 136 may be disposed to face the rear metal housing 131 in a face-to-face manner, and may be disposed to overlap with each other. The antenna 136 according to various embodiments may be constructed as an antenna which operates as an antenna radiator through a resonance scheme without a coil. The dielectric layer 1322 may be disposed between the at least one conductive pattern 1320 and the rear metal housing 131. A pressure sensor 132 may operate the conductive patterns 1320 as a first electrode, and may operate the rear metal housing 131 as a second electrode, i.e., a ground electrode.

In addition thereto, since configurations of a print layer 134 and a transparent plate 135 have been already described in detail, descriptions thereof will be omitted.

Figure 14:
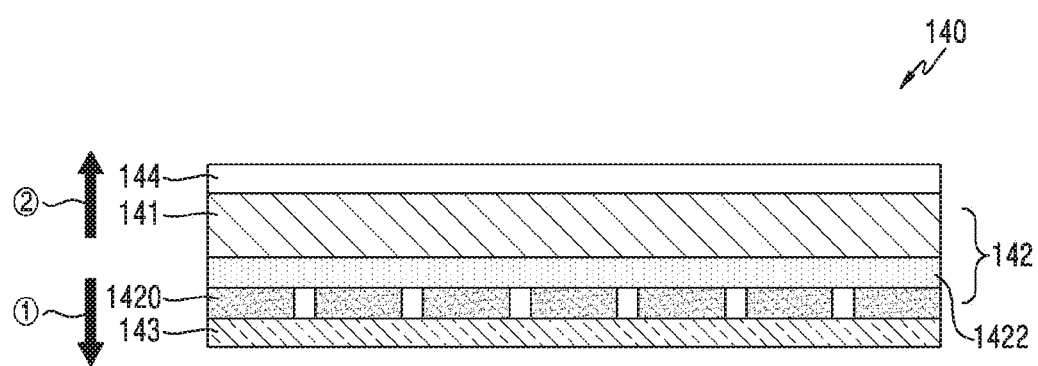
FIG. 14 is a cross-sectional view illustrating a configuration of a pressure sensor according to various embodiments of the present disclosure.

FIG. 14 is a cross-sectional view illustrating a configuration of a pressure sensor according to various embodiments of the present disclosure.

Referring to FIG. 14, an electronic device 140 according to various embodiments may include a pressure sensor 142. The pressure sensor 142 may be disposed to face a first direction of a rear metal housing 141, and a transparent plate may not be provided.

The electronic device 140 according to various embodiments may include the rear metal housing 141, a support member 143 spaced apart in a first direction of the rear metal housing 141, at least one or more conductive patterns 1420 disposed to a face facing a second direction of the support member 143, and a dielectric layer 1422 disposed between the rear metal housing 141 and the conductive patterns 1420. The pressure sensor 142 according to various embodiments may utilize the conductive patterns 1420 as a first electrode, and may utilize the rear metal housing 141 as a second electrode, i.e., a ground electrode.

The real metal housing 141 according to various embodiments may have a print layer 144 disposed to an outer face facing a second direction of the rear metal housing 141 to provide a variety of housing exterior color.

Figure 15A:
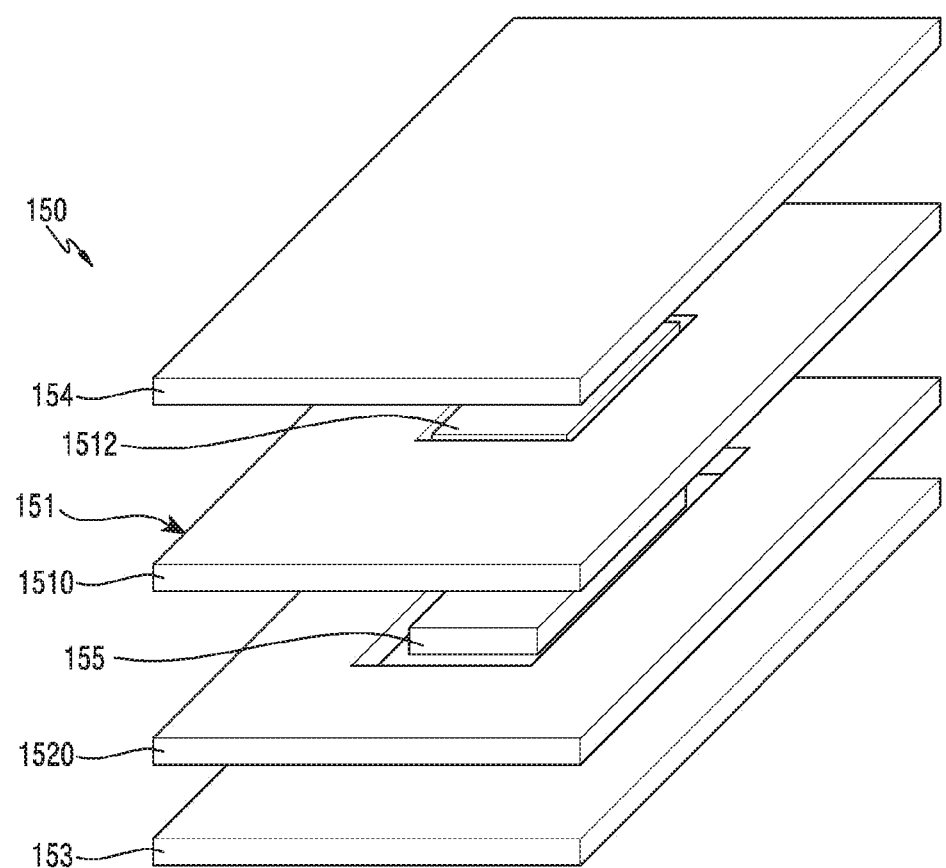
FIG. 15A is a perspective view illustrating a configuration of a pressure sensor according to various embodiments of the present disclosure.
Figure 15B:
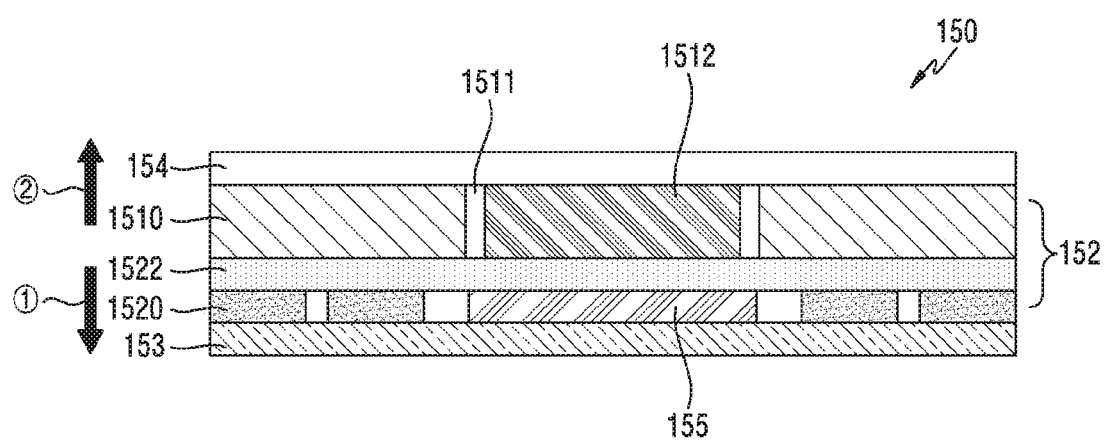
FIG. 15B is a cross-sectional view illustrating a configuration of a pressure sensor according to various embodiments of the present disclosure.

FIG. 15A is a perspective view illustrating a configuration of a pressure sensor according to various embodiments of the present disclosure. FIG. 15B is a cross-sectional view illustrating a configuration of a pressure sensor according to various embodiments of the present disclosure.

Referring to FIG. 15A and FIG. 15B, an electronic device 150 according to various embodiments may have a pressure sensor 152 disposed in a first direction of a metal housing 151 in such a manner that an antenna 155 is mounted to the pressure sensor 152, and the metal housing 151 can be segmented for a radiation operation of the antenna 155.

The electronic device 150 according to various embodiments may include segmented first and second metal housings 1510 and 1512. The first metal housing 1510 may be disposed spaced apart from the second metal housing 1512 by means of an opening 1511 (gap). As will be described below, the first metal housing 1510 may be utilized as a ground electrode of the pressure sensor 152, and the second metal housing 1512 may be disposed spaced apart from the first metal housing 1510 to operate as an antenna radiator. The first and second metal housings 1510 and 1512 may be together referred to as the metal housing 151. In addition, the metal housing 151 may be referred to as a rear metal housing when it is disposed to a rear face of the electronic device 150, and may be referred to as a side metal housing when it is disposed to a side face of the electronic device.

According to various embodiments, the opening 1511 disposed between the first metal housing 1510 and the second metal housing 1512 may be filled with an insulation material. The radiation operation of the antenna 155 may be improved by a segmental structure between the first and second housings 1510 and 1512. The second metal housing 1512 may substantially face a portion overlapping with the antenna 155, and may be disposed to be floated from the first metal housing 1510. The opening 1511 may be referred to as an insulation portion, an insulation slit, or an insulation segment portion.

The electronic device 150 according to various embodiments may include a support member 153 spaced apart from the metal housing 151 in a first direction, at least one or more conductive patterns 1520 disposed to a face facing a second direction of the support member 153, and the dielectric layer 1522 disposed between the metal housing 151 and the conductive patterns 1520. The pressure sensor 152 may operate the conductive patterns 1520 as a first electrode, and may operate the first metal housing 1510 as a second electrode, i.e., a ground electrode.

The metal housing 151 according to various embodiments may have a print layer 154 disposed to a face facing the second direction. The print layer 154 may be disposed on the first and second metal housings 1510 and 1512 and the opening 1511.

Although not shown, a transparent plate may be further provided on a face facing a second direction of the print layer 154. For example, the transparent plate may include a synthetic resin material, a glass material, or the like.

The antenna 155 according to various embodiments may be disposed without overlapping with the conductive patterns 1520. For example, the antenna 155 may be disposed to a central region of the conductive patterns 1520 (see FIG.

10B), and may be disposed to be surrounded by the conductive patterns 1520. The antenna 155 may be disposed substantially in the same layer as the conductive patterns 1520. The antenna 155 may be disposed spaced apart from the second metal housing 1512 in a first direction, and may be disposed in parallel with the conductive patterns 1520. For example, the antenna 155 may include any one of a Near Field Communication (NFC) antenna, an MST antenna, and a wireless charging antenna, or may include at least two antennas or three antennas.

Figure 16:
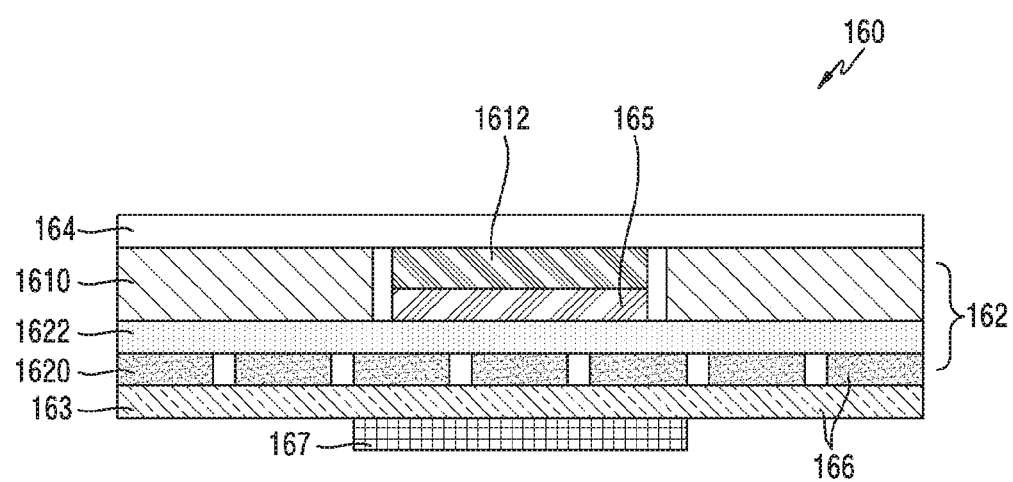
FIG. 16 is a cross-sectional view illustrating a configuration of a pressure sensor according to various embodiments of the present disclosure.

FIG. 16 is a cross-sectional view illustrating a configuration of a pressure sensor according to various embodiments of the present disclosure.

Referring to FIG. 16, an electronic device 160 according to various embodiments may have first and second pressure sensors 162 and 166 disposed to be laminated in a first direction of a metal housing 161 in such a manner that an antenna 165 is mounted to the pressure sensor 162, and the metal housing 161 can be segmented for a radiation operation of the antenna 165.

The electronic device 160 according to various embodiments may include segmented first and second metal housings 1610 and 1612. The first metal housing 1610 may be disposed spaced apart from the second metal housing 1612 by means of an opening 1611. As will be described below, the first metal housing 1610 may be utilized as a ground electrode of the pressure sensor 162, and the second metal housing 1612 may be disposed spaced apart from the first metal housing 1610 to serve as a floating metal housing. The first and second metal housings 1610 and 1612 may be together referred to as the metal housing 161. In addition, the metal housing 161 may be referred to as a rear metal housing when it is disposed to at least part of a rear face of the electronic device 160, and may be referred to as a side metal housing when it is disposed to at least part of a side face of the electronic device.

According to various embodiments, the opening 1611 disposed between the first metal housing 1610 and the second metal housing 1612 may be filled with an insulation material. The radiation operation of the antenna 165 may be improved by a segmental structure between the first and second housings 1610 and 1612. The second metal housing 1612 may substantially face a portion overlapping with the antenna 165, and may be disposed to be floated from the first metal housing 1610. The opening may be filled with an insulation material.

The electronic device 160 according to various embodiments may include a support member 163 spaced apart from the metal housing 161 in a first direction, at least one or more conductive patterns 1620 disposed to a face facing a second direction of the support member 163, and a dielectric layer 1622 disposed between the metal housing 161 and the conductive patterns 1620. In addition, the support member 163 according to various embodiments may have a ground electrode 167 disposed to at least part of a face facing the first direction.

The pressure sensor according to various embodiments may include the first metal housing 1610, the first pressure sensor 162 including the conductive patterns 1620 and the dielectric layer 1622 between the first metal housing 1610 and the conductive patterns 1620, and the second pressure sensor 166 including the conductive patterns 1620, the ground electrode 167, and the support member 163 disposed between the ground electrode 167 and the conductive patterns 1620. The first pressure sensor 162 may operate the conductive patterns 1620 as a first electrode, and may operate the first metal housing 1610 as a second electrode.

The second pressure sensor 166 may operate the conductive patterns 1620 as the first electrode, and may operate the ground electrode 167 as the second electrode.

The metal housing 161 according to various embodiments may have a print layer 164 disposed to a face facing the second direction. The print layer 164 may be disposed on the first and second metal housings 1620 and 1612 and the opening 1611. Although not shown, a transparent plate may be further provided on a face facing a second direction of the print layer 164. For example, the transparent plate may include a synthetic resin material, a glass material, or the like.

The antenna 165 according to various embodiments may be disposed to be laminated with the second metal housing 1612, and may be disposed without overlapping with the first metal housing 1610. For example, the antenna 165 may be disposed to a face facing the first direction of the second metal housing 1612, and may be laminated with the second metal housing 1612. In addition, the antenna 165 may be disposed substantially adjacent to the first metal housing 1610 in parallel without overlapping.

The antenna 165 according to various embodiments may be disposed to face at least part of a face facing the second direction of the dielectric layer 1622, and may be disposed in parallel with each of the support member 163 and the ground electrode 167. For example, the antenna 165 may include any one of a Near Field Communication (NFC) antenna, an MST antenna, and a wireless charging antenna, or may include at least two antennas or three antennas.

Figure 17:
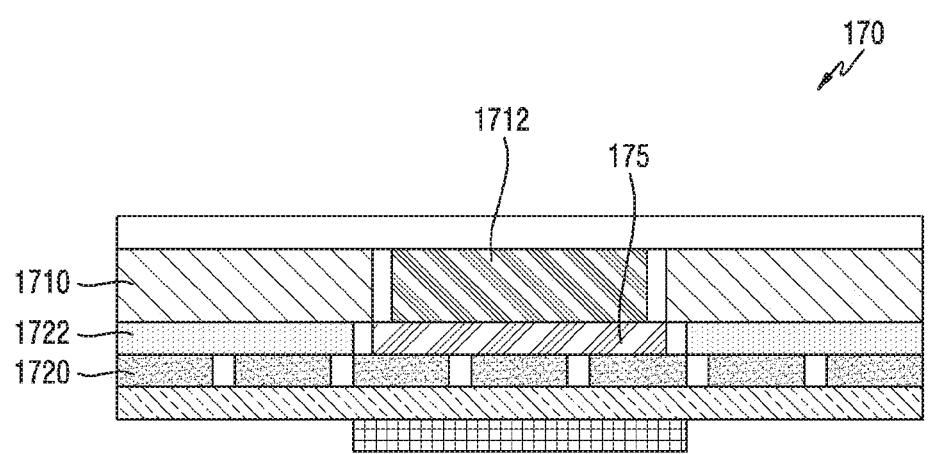
FIG. 17 is a cross-sectional view illustrating a configuration of a pressure sensor according to various embodiments of the present disclosure.

FIG. 17 is a cross-sectional view illustrating a configuration of a pressure sensor according to various embodiments of the present disclosure.

Referring to FIG. 17, an electronic device 170 according to various embodiments differs from the electronic device 160 of FIG. 16 only in terms of a location where an antenna 175 is disposed, and thus descriptions on the same remaining configurations will be omitted. The antenna 165 of FIG. 16 is disposed to the first metal housing 1610 in the same layer and is disposed to the second metal housing 1612 in a vertically overlapping manner, whereas the antenna 175 of FIG. 17 may be disposed in the same layer without overlapping with a dielectric layer 1722. That is, the electronic device 170 according to various embodiments may be disposed in such a manner that the antenna 175 is parallel with the dielectric layer 1722 without overlapping. The antenna 175 may be laminated to face a second metal housing 1712.

Although not shown, a transparent plate may be further provided on a face facing a second direction of a print layer 174. For example, the transparent plate may include a synthetic resin material, a glass material, or the like.

Figure 18A:
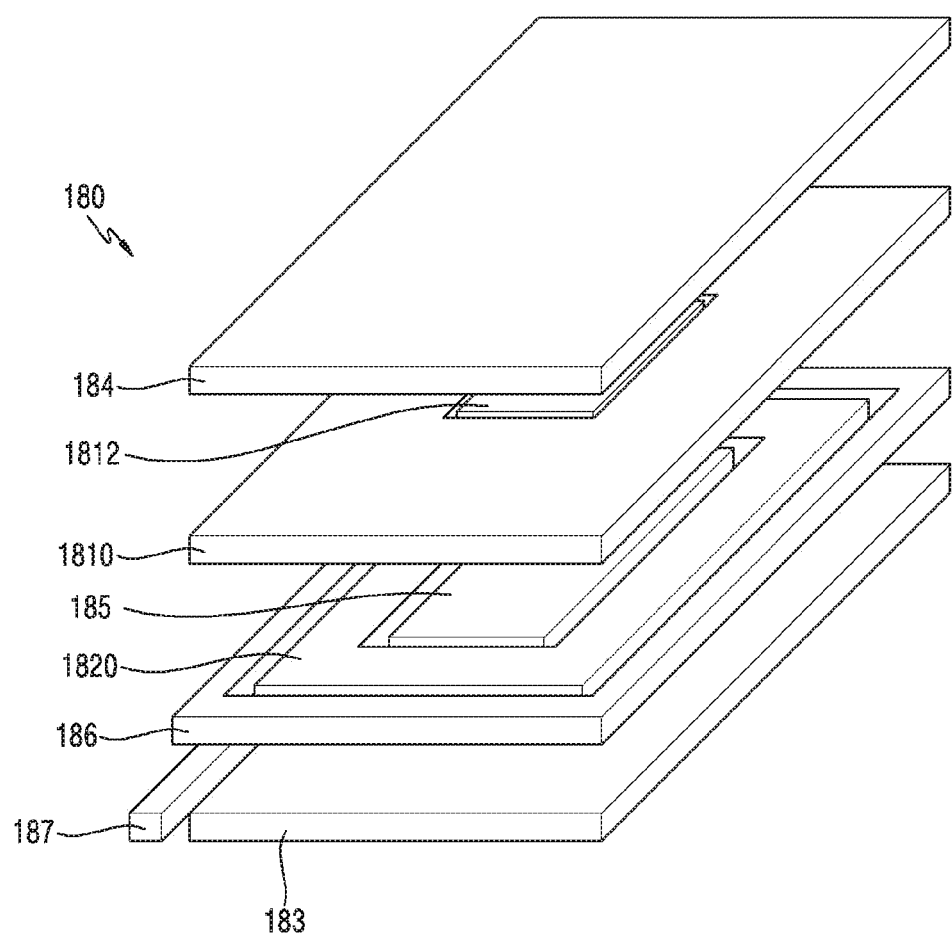
FIG. 18A is a perspective view illustrating a configuration of a pressure sensor according to various embodiments of the present disclosure.
Figure 18B:
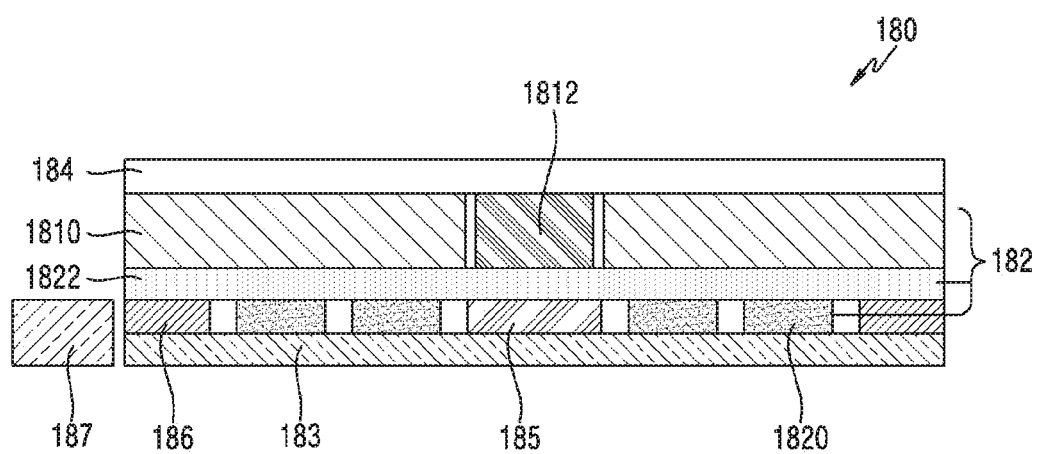
FIG. 18B is a cross-sectional view illustrating a configuration of a pressure sensor according to various embodiments of the present disclosure.

FIG. 18A is a perspective view illustrating a configuration of a pressure sensor according to various embodiments of the present disclosure. FIG. 18B is a cross-sectional view illustrating a configuration of a pressure sensor according to various embodiments of the present disclosure.

Referring to FIG. 18A and FIG. 18B, an electronic device 180 according to various embodiments differs from the electronic device 150 of FIG. 15A and FIG. 15B only in terms of a location where an antenna is disposed, and thus descriptions on the same remaining configurations will be omitted.

Unlike in the structure in which the antenna 155 of FIG. 15A and FIG. 15B is disposed to the same layer without overlapping with the conductive patterns 1520 as a first electrode, a first antenna 185 of FIG. 18A and FIG. 18B may be disposed to a central region while being disposed to the same layer without overlapping with a conductive patterns 1820, a second antenna 186 may be disposed to a neighboring region of the conductive patterns 1820 while being disposed to the same layer without overlapping with the conductive patterns 1820, and a third antenna 187 may be disposed adjacent to the second antenna 186 or a support film 183 while being disposed in a side direction of a pressure sensor 182.

The first antenna 185 according to various embodiments may be a wireless charging antenna using an MST or a resonance scheme.

The second antenna 186 according to various embodiments may have a loop shape and may be disposed to the same layer without overlapping with the conductive patterns 1820. The second antenna 186 may be disposed to surround an outer boundary of the conductive patterns 1820 and may be disposed spaced apart by a specific gap from the first antenna 185. For example, the second antenna 186 may be a wireless charging antenna using an induction scheme. The second antenna 186 may be coupled to a side metal housing (not shown, see FIG. 20A) due to an insulator. A gap may be filled with the insulator.

The third antenna 187 according to various embodiments may include an NFC antenna, as an antenna disposed in a side direction of the support member 183.

The support member 183 according to various embodiments is a film type and may include a Flexible Printed Circuit Board (FPCB). For example, the first antenna 185 and the second antenna 186 may be disposed to a face facing a second direction of the support member 183.

Although not shown, a transparent plate may be further provided on a face facing a second direction of a print layer 184. For example, the transparent plate may include a synthetic resin material, a glass material, or the like.

Figure 19:
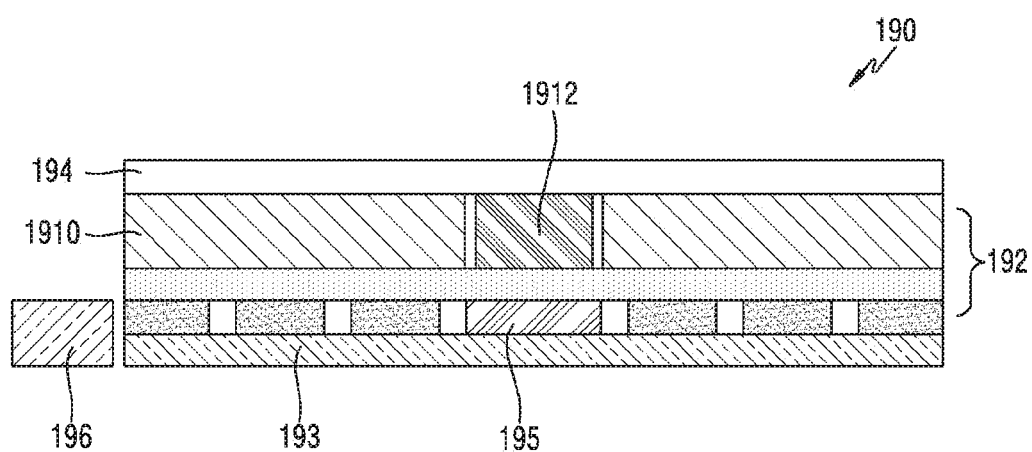
FIG. 19 is a cross-sectional view illustrating a configuration of a pressure sensor according to various embodiments of the present disclosure.

FIG. 19 is a cross-sectional view illustrating a configuration of a pressure sensor according to various embodiments of the present disclosure.

Referring to FIG. 19, an electronic device 190 according to various embodiments differs from the electronic device 180 of FIG. 18A and FIG. 18B only in terms of a location where an antenna is disposed, and thus descriptions on the same remaining configurations will be omitted.

Unlike in the structure of the electronic device 180 of FIG. 18A and FIG. 18B in which the first and second antennas 185 and 186 are disposed to the same layer without overlapping with the conductive patterns 1820 as a first electrode, the electronic device 190 of FIG. 19 may have a first antenna 195 which is disposed to the same layer without overlapping with conductive patterns 1920 and which uses an MST scheme. The first antenna 195 may be disposed to a central region of the conductive patterns 1920, and a second antenna 196 may be disposed adjacent to a support member 193 while being disposed in a side direction of a pressure sensor 192 without overlapping with the conductive patterns 1920. For example, the first antenna 195 may be a wireless charging antenna using an MST or resonance scheme, and the second antenna 196 may be an NFC antenna.

Although not shown, a transparent plate may be further provided on a face facing a second direction of a print layer 194. For example, the transparent plate may include a synthetic resin material, a glass material, or the like.

Figure 20A:
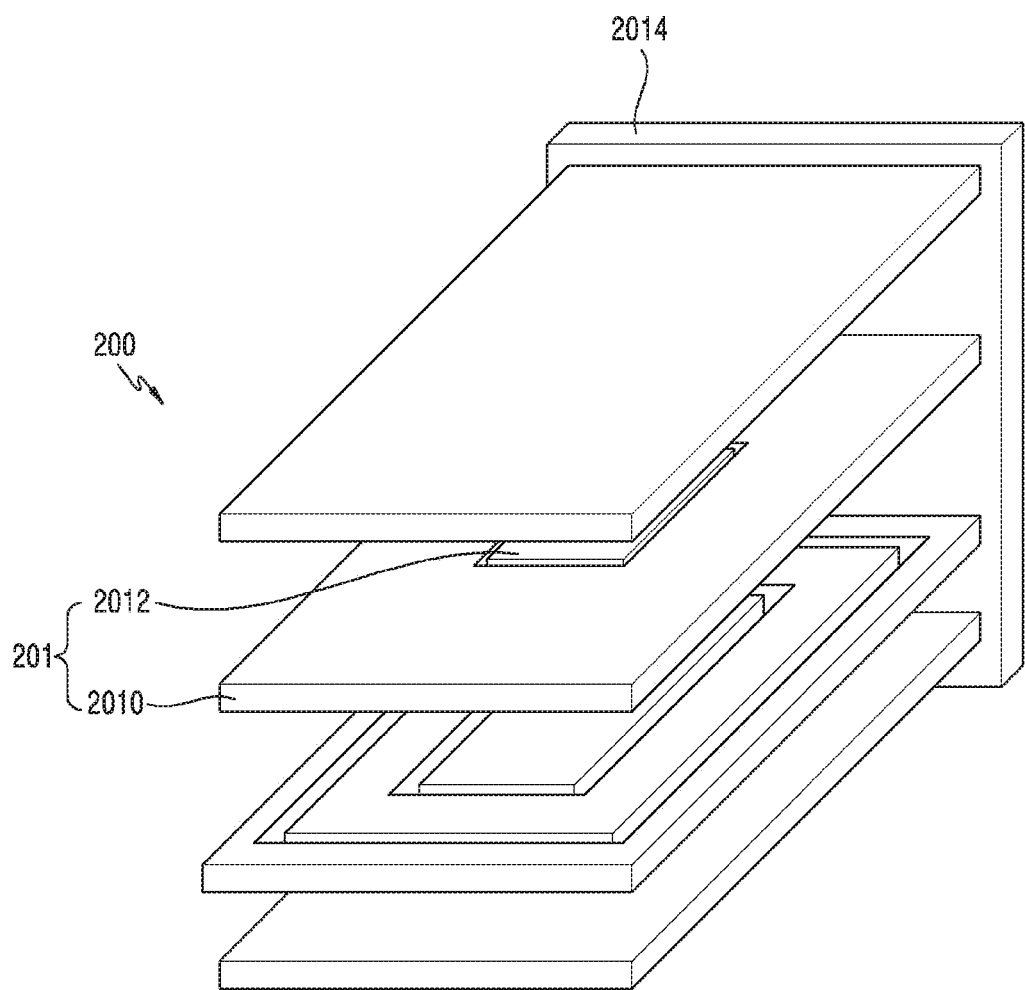
FIG. 20A is a perspective view illustrating a configuration of a pressure sensor according to various embodiments of the present disclosure.
Figure 20B:
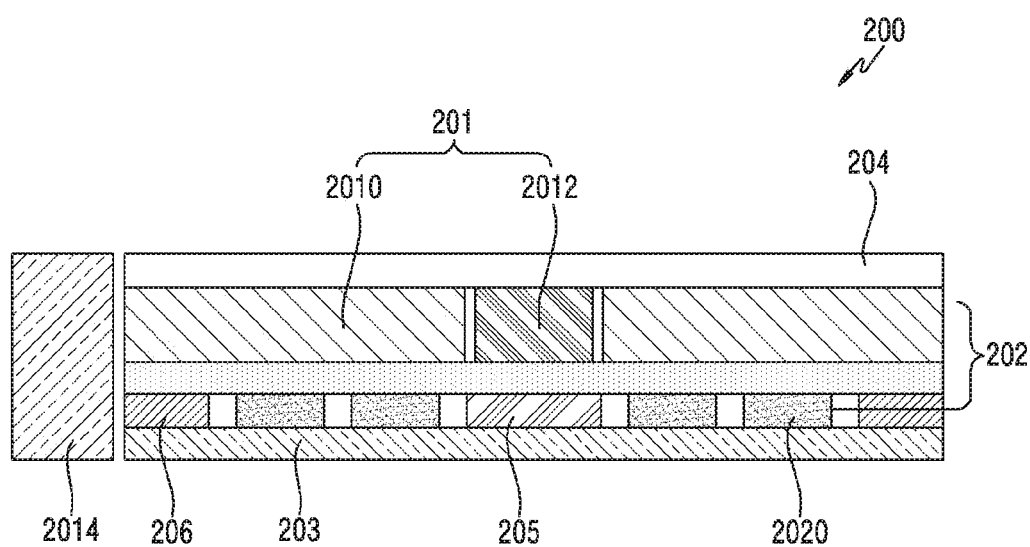
FIG. 20B is a cross-sectional view illustrating a configuration of a pressure sensor according to various embodiments of the present disclosure.

FIG. 20A is a perspective view illustrating a configuration of a pressure sensor according to various embodiments of the present disclosure. FIG. 20B is a cross-sectional view illustrating a configuration of a pressure sensor according to various embodiments of the present disclosure.

Referring to FIG. 20A and FIG. 20B, an electronic device 200 according to various embodiments differs from the electronic device 180 of FIG. 18A and FIG. 18B only in that a side metal housing 2014 served as an antenna radiator is additionally constructed, and thus descriptions on the same remaining configurations will be omitted.

The electronic device 200 according to various embodiments may include a rear metal housing 201 and the side metal housing 2014. The rear metal housing 201 may be a metal case disposed to a rear face of a housing of the electronic device, and the side metal housing 2014 may be a metal frame disposed to a side face of the electronic device. Since the rear metal housing 201 according to various embodiments has already been described in detail, descriptions thereof will be omitted, and only a configuration of the side metal housing 2014 will be described.

The side metal housing 2014 according to various embodiments may have the same frame as the metal frame of FIG. 1A and FIG. 1B, or may be constructed at least partially to be identical thereto.

The side metal housing 2014 according to various embodiments may be at least partially constructed of a conductive material, and may operate as an antenna radiator by being constructed in a segment type due to a non-conductive material. The side metal housing 2014 may be disposed to be segmented due to the rear metal housing 201 and a gap 'g', and the gap 'g' may be filled with an insulation material. For example, the side metal housing 2014 may operate as an antenna radiator and thus may be utilized as an NFC antenna. Although not shown, a slot may be constructed between at least part of the side metal housing 2014 and a substrate (not shown), and thus may be utilized as a slot antenna.

At least part of the rear metal housing 201 has a plate shape, and may be constructed to have an area. At least part of the side metal housing 201 may be disposed to a side boundary of the electronic device 200 and thus may be constructed to have an electrical length for an operation of an antenna radiator. Although not shown, a transparent plate may be further provided on a face facing a second direction of a print layer 204. For example, the transparent plate may include a synthetic resin material, a glass material, or the like.

Figure 21:
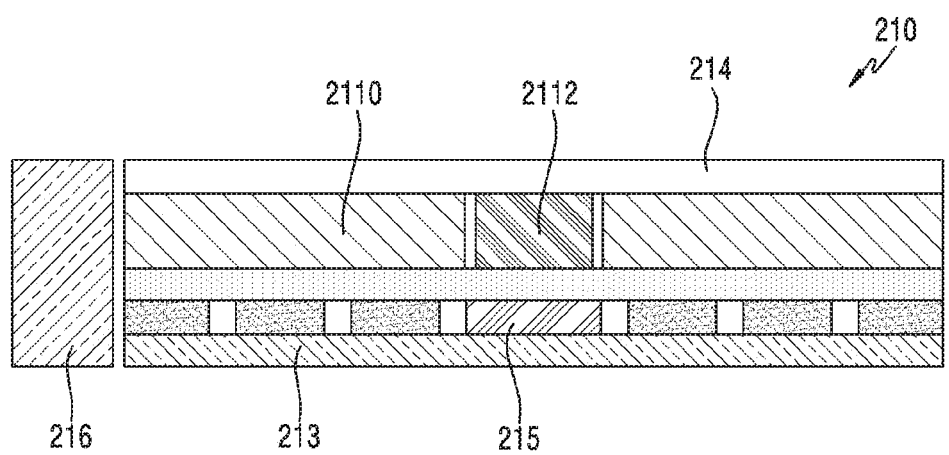
FIG. 21 is a cross-sectional view illustrating a configuration of a pressure sensor according to various embodiments of the present disclosure.

FIG. 21 is a cross-sectional view illustrating a configuration of a pressure sensor according to various embodiments of the present disclosure.

Referring to FIG. 21, an electronic device 210 according to various embodiments differs from the electronic device 200 of FIG. 20A and FIG. 20B only in terms of a location where an antenna is disposed, and thus descriptions on the same remaining configurations will be omitted.

Unlike in the structure of the electronic device 200 of FIG. 20A and FIG. 20B in which the first and second antennas 205 and 206 are disposed to the same layer without overlapping with the conductive patterns 2020 as a first electrode, the electronic device 210 of FIG. 21 may have an antenna 215 which is disposed to the same layer without overlapping with conductive patterns 2120 and which uses an MST scheme. For example, the antenna 215 may be disposed to a central region of the conductive patterns 2120, and thus may be disposed to be surrounded by the plurality of conductive patterns 2120.

Hereinafter, various electronic devices to which a pressure sensor is disposed will be described according to various embodiments.

Figure 22A:
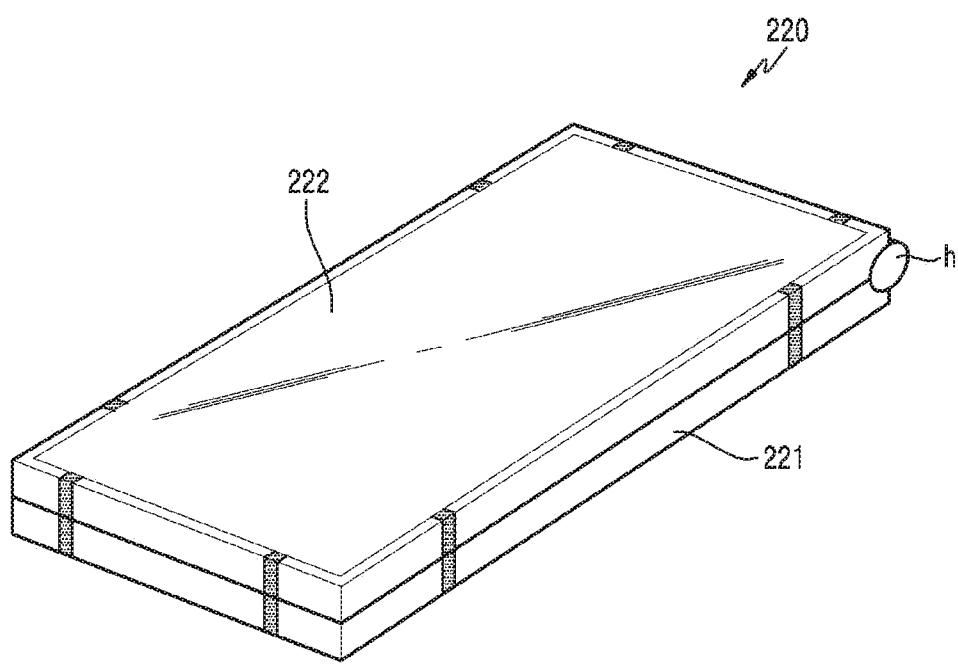
FIG. 22A is a perspective view illustrating a folding-type electronic device in a folding state and equipped with a pressure sensor according to various embodiments of the present disclosure.
Figure 22B:
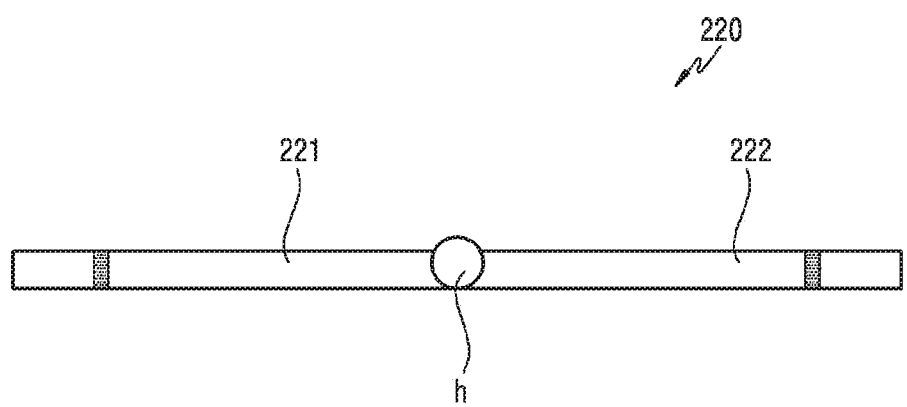
FIG. 22B is a side view illustrating a folding-type electronic device in an unfolding state and equipped with a pressure sensor according to various embodiments of the present disclosure.

FIG. 22A is a perspective view illustrating a folding-type electronic device in a folding state and equipped with a pressure sensor according to various embodiments of the present disclosure. FIG. 22B is a side view illustrating a folding-type electronic device in an unfolding state and equipped with a pressure sensor according to various embodiments of the present disclosure.

Referring to FIG. 22A and FIG. 22B, an electronic device 220 according to various embodiments may be constructed in a folding type. The electronic device 220 according to various embodiments may include a first electronic device 221, a second electronic device 222, and a hinge portion 'h' for electrically and physically coupling them. The first electronic device 221 may be a main body, and the second electronic device 222 may be a folder. The first electronic device 221 may perform an opening/closing operation by which the second electronic device 222 is folded or unfolded.

The first electronic device 221 according to various embodiments may be the same electronic device as the respective electronic devices equipped with the pressure sensor as shown in FIG. 7 to FIG. 21, or may be constructed at least partially to be identical thereto. The second electronic device 222 according to various embodiments may be the same electronic device as the respective electronic devices equipped with the pressure sensor as shown in FIG. 7 to FIG. 21, or may be constructed at least partially to be identical thereto. The first electronic device 221 according to various embodiments may be constructed to be identical to or different from the second electronic device 222.

Figure 22C:
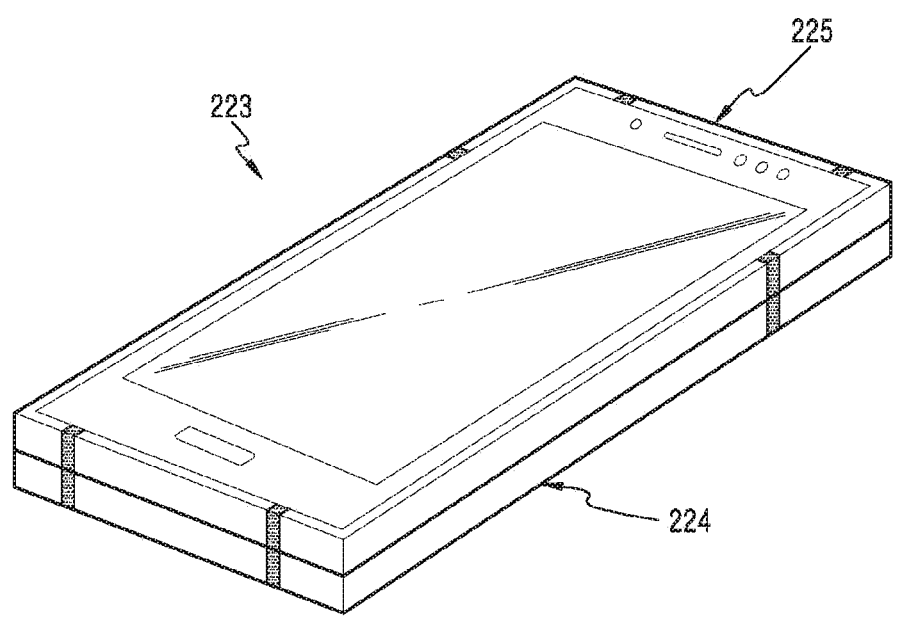
FIG. 22C is a perspective view illustrating a sliding-type electronic device equipped with a pressure sensor according to various embodiments of the present disclosure.
Figure 22D:
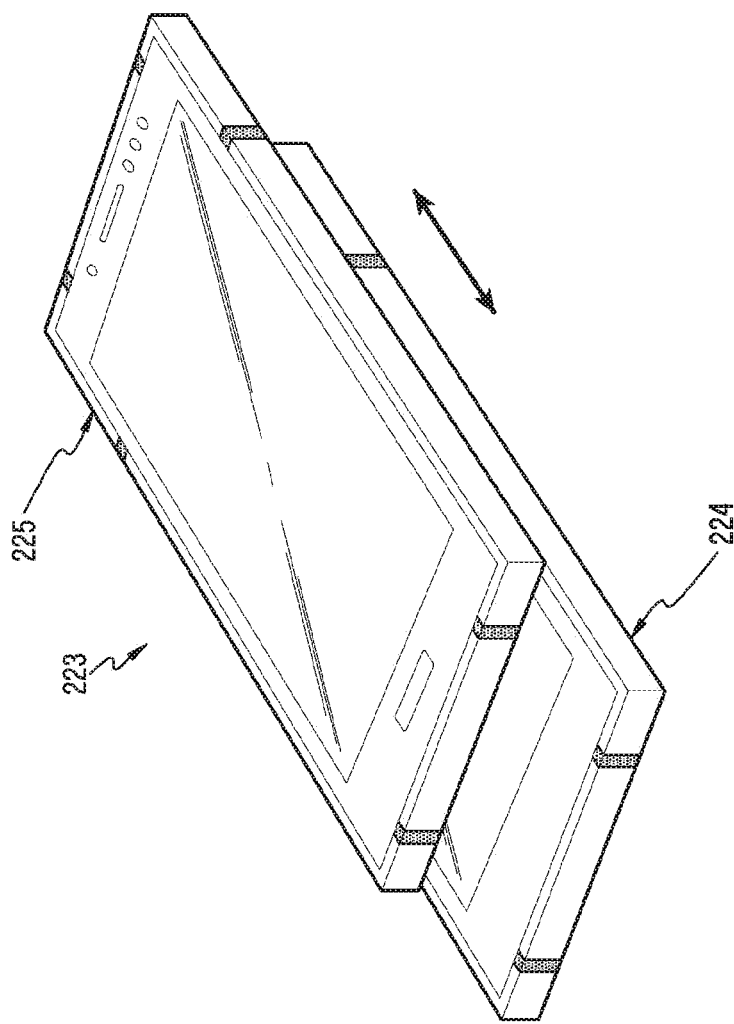
FIG. 22D is a perspective view illustrating a state where a sliding-type electronic device equipped with a pressure sensor is slid in a portrait direction according to various embodiments of the present disclosure.
Figure 22E:
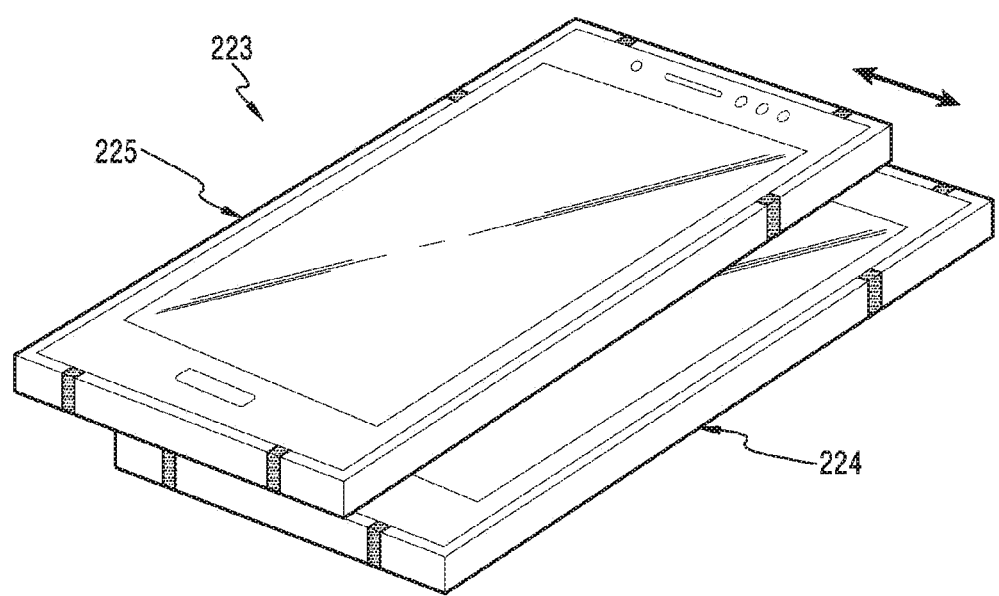
FIG. 22E is a perspective view illustrating a state where a sliding-type electronic device equipped with a pressure sensor is slid in a landscape direction according to various embodiments of the present disclosure.

FIG. 22C is a perspective view illustrating a sliding-type electronic device equipped with a pressure sensor according to various embodiments of the present disclosure. FIG. 22D is a perspective view illustrating a state where a sliding-type electronic device equipped with a pressure sensor is slid in a portrait direction according to various embodiments of the present disclosure. FIG. 22E is a perspective view illustrating a state where a sliding-type electronic device equipped with a pressure sensor is slid in a landscape direction according to various embodiments of the present disclosure.

Referring to FIG. 22C to FIG. 22E, an electronic device 223 according to various embodiments may be constructed in a sliding type. The electronic device 223 according to various embodiments may include a first electronic device 224, a second electronic device 225, and a sliding module (not shown) for coupling them. The first electronic device 224 may be a main body, and the second electronic device 225 may be a slider. The second electronic device 225 may be constructed in a sliding manner in a landscape direction on the first electronic device 224, and may be constructed in a sliding manner in a portrait direction.

The first electronic device 224 according to various embodiments may be the same electronic device as the respective electronic devices equipped with the pressure sensor as shown in FIG. 7 to FIG. 21, or may be constructed at least partially to be identical thereto. The first electronic device 225 according to various embodiments may be the same electronic device as the respective electronic devices equipped with the pressure sensor as shown in FIG. 7 to FIG. 21, or may be constructed at least partially to be identical thereto. The first electronic device 224 according to various embodiments may be constructed to be identical to or different from the second electronic device 225.

Figure 22F:
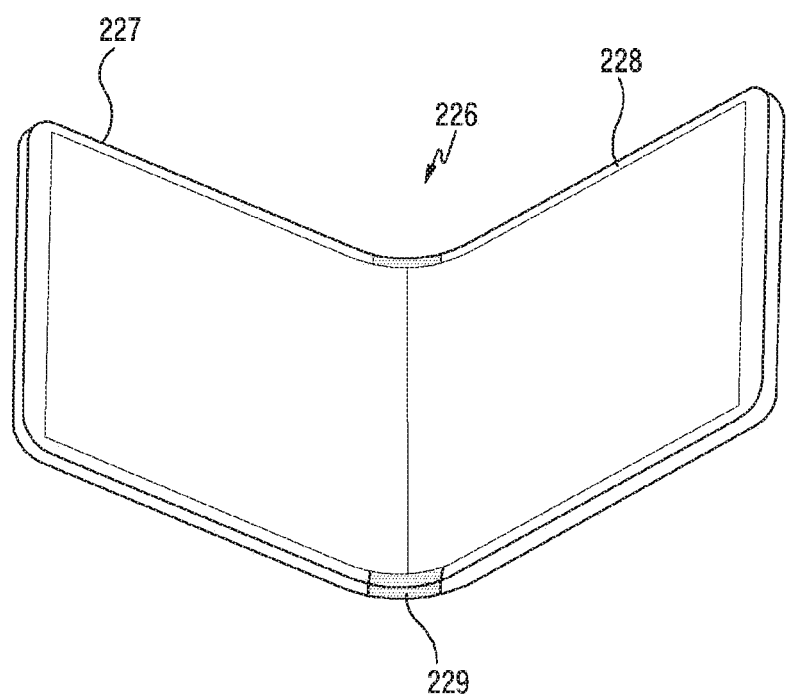
FIG. 22F is a perspective view illustrating a flexible-type electronic device equipped with a pressure sensor according to various embodiments of the present disclosure.
Figure 22G:
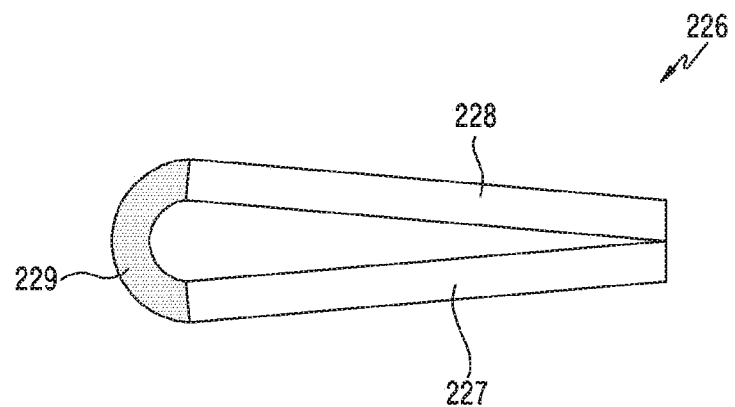
FIG. 22G is a side view illustrating a flexible-type electronic device equipped with a pressure sensor according to various embodiments of the present disclosure.

FIG. 22F is a perspective view illustrating a flexible-type electronic device equipped with a pressure sensor according to various embodiments of the present disclosure. FIG. 22G is a side view illustrating a flexible-type electronic device equipped with a pressure sensor according to various embodiments of the present disclosure.

Referring to FIG. 22F and FIG. 22G, an electronic device 226 according to various embodiments may be constructed in a flexible type. The electronic device 226 according to various embodiments may include a first electronic device 227, a second electronic device 228, and a folding device 229 for coupling them. The second electronic device 228 may be folded or unfolded on the first electronic device 227 by means on the folding device 229. The first and second electronic devices 227 and 228 are divided by the folding device 229. The first and second devices 227 and 228 may be segmented when the electronic device 226 constructed of one housing is folded.

The first electronic device 227 according to various embodiments may be the same electronic device as the respective electronic devices equipped with the pressure sensor as shown in FIG. 7 to FIG. 21, or may be constructed at least partially to be identical thereto. The second electronic device 228 according to various embodiments may be the same electronic device as the respective electronic devices equipped with the pressure sensor as shown in FIG. 7 to FIG. 21, or may be constructed at least partially to be identical thereto.

Figure 22H:
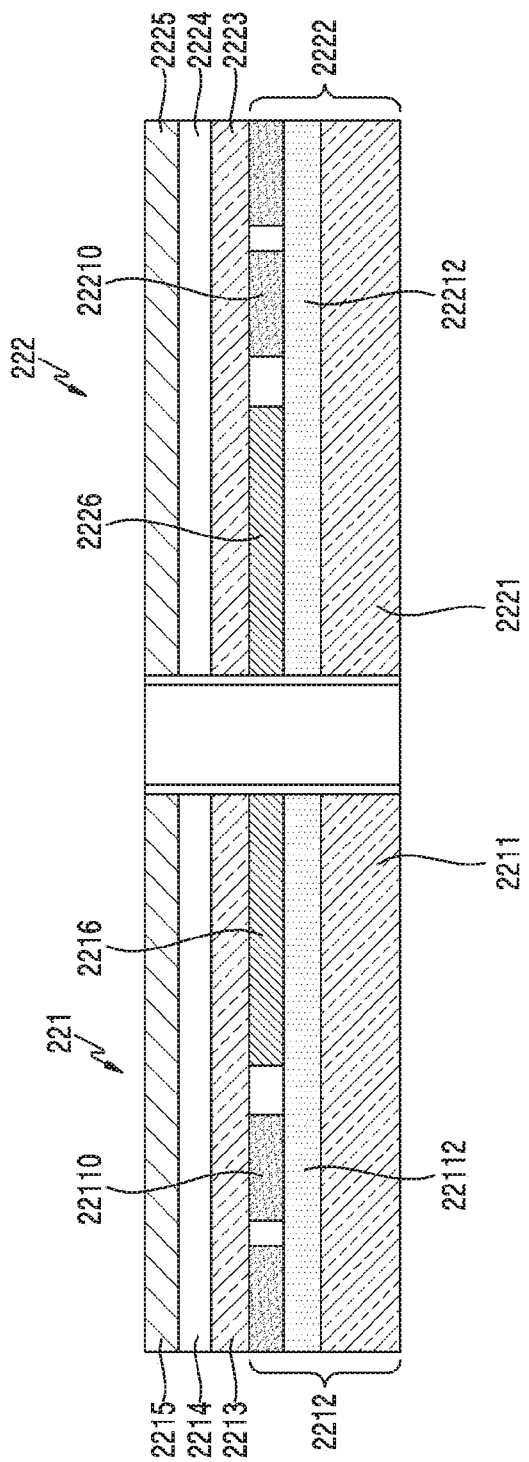
FIG. 22H is a cross-sectional view illustrating a folding-type electronic device in an unfolding state according to various embodiments of the present disclosure.

FIG. 22H is a cross-sectional view illustrating a folding-type electronic device in an unfolding state according to various embodiments of the present disclosure.

A configuration of the first electronic device 221 and second electronic device 222 of FIG. 22A and FIG. 22B will be described below in detail with reference to FIG. 22H.

The first electronic device 221 according to various embodiments will be described only in terms of differences, compared to the electronic device 80 of FIG. 8. The first electronic device 221 of FIG. 22H may have an antenna 2216 disposed without overlapping with a conductive pattern 22110. In addition thereto, since configurations of a dielectric layer 22112, the conductive patterns 22110, a print layer 22114, and a transparent plate 2214 have been already described in detail, descriptions thereof will be omitted.

The antenna 2216 according to various embodiments may be disposed adjacent to a second face of a rear metal housing 2211. For example, the conductive patterns 22110 may be disposed in parallel without overlapping with the antenna 2216. When viewed from above the second face of the rear metal housing 2211, the at least one antenna 2216 may be disposed to be surrounded by the conductive patterns 22110, while being disposed between the conductive patterns 22110, in a state of not overlapping with the conductive patterns 22110. For example, the antenna 2216 may be disposed to a central region or in the vicinity of the plurality of conductive patterns 22110.

The antenna 2216 according to various embodiments may include any one of a Near Field Communication (NFC) antenna, an MST antenna, and a wireless charging antenna, or may include at least two antennas or three antennas.

A pressure sensor 2212 according to various embodiments may include the conductive patterns 22110, the rear metal housing 2211, and the dielectric layer 22112 disposed between the conductive patterns 22110 and the rear metal housing 2211. The conductive patterns 22110 may be patterned with an equal interval on one face of a support member 2213. The conductive patterns 22110 may be utilized as a first electrode of the pressure sensor 2212, and the rear metal housing 2211 may be utilized as a second electrode, e.g., a ground electrode, of the pressure sensor 2212.

The second electronic device 222 according to various embodiments will be described only in terms of differences, compared to the electronic device 80 of FIG. 8. The second electronic device 222 of FIG. 22H may have an antenna 2226 disposed without overlapping with a conductive pattern 22210. In addition thereto, since configurations of a dielectric layer 22212, the conductive patterns 22210, a print layer 2224, and a transparent plate 2225 have been already described in detail, descriptions thereof will be omitted.

The antenna 2226 according to various embodiments may be disposed adjacent to a second face of a rear metal housing 2221. For example, the conductive patterns 22210 may be disposed in parallel without overlapping with the antenna 2226. When viewed from above the second face of the rear metal housing 2221, the at least one antenna 2226 may be disposed to be surrounded by the conductive patterns 22210, while being disposed between the conductive patterns 22210, in a state of not overlapping with the conductive patterns 22210. For example, the antenna 2226 may be disposed to a central region or in the vicinity of the plurality of conductive patterns 22210.

The antenna 2226 according to various embodiments may include any one of a Near Field Communication (NFC) antenna, an MST antenna, and a wireless charging antenna, or may include at least two antennas or three antennas.

The pressure sensor 2222 according to various embodiments may include the conductive patterns 22210, the rear metal housing 2221, and the dielectric layer 22212 disposed between the conductive patterns 22210 and the rear metal housing 2221. The conductive patterns 22210 may be patterned with an equal interval on one face of a support member 2223. The conductive patterns 22210 may be utilized as a first electrode of the pressure sensor 2222, and the rear metal housing 2221 may be utilized as a second electrode, e.g., a ground electrode, of the pressure sensor 2222.

Figure 23A:
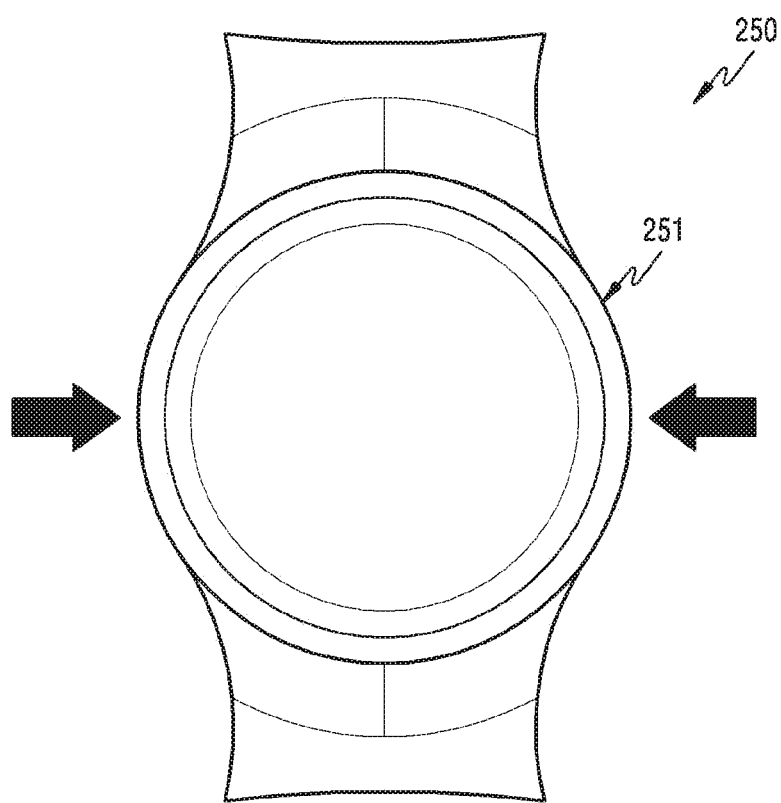
FIG. 23A is a plan view illustrating a wearable device equipped with a pressure sensor according to various embodiments of the present disclosure.
Figure 23B:
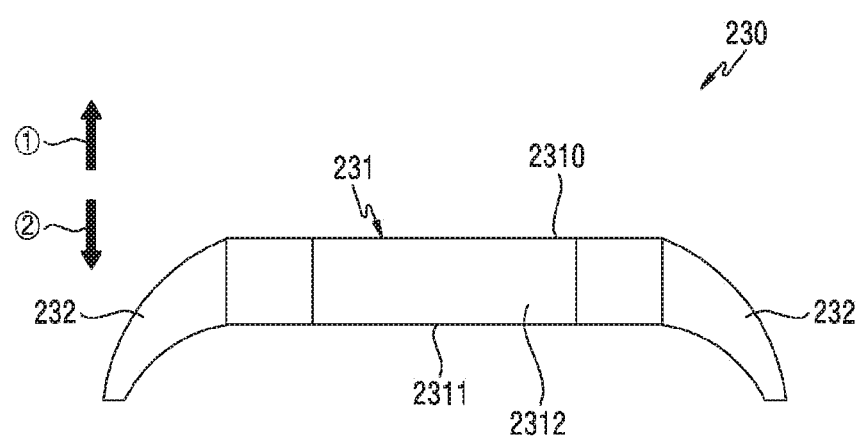
FIG. 23B is a side view illustrating a wearable device equipped with a pressure sensor according to various embodiments of the present disclosure.

FIG. 23A is a plan view illustrating a wearable device equipped with a pressure sensor according to various embodiments of the present disclosure. FIG. 23B is a side view illustrating a wearable device equipped with a pressure sensor according to various embodiments of the present disclosure.

Referring to FIG. 23A and FIG. 23B, an electronic device 230 according to various embodiments may include a wearable device. The electronic device 230 may be worn on a specific position of a user's body, for example, on a wrist. Hereinafter, the electronic device 230 will be referred to as a wearable device.

The wearable device 230 according to various embodiments may include a housing 231 and a coupling portion 232 (e.g., a strap or a band) mounted to the housing 231. The wearable device 230 according to various embodiments may be worn on the wrist in such a manner that the coupling portion 232 is wound around the wrist in a state where the housing 231 is placed on the wrist. The coupling portion 232 may include a plurality of wrist adjusting openings (not shown) with a specific interval to adjust a wearing position according to the user's wrist. According to various embodiments, the coupling portion 232 may be constructed of at least one material among metal, leather, rubber, silicone, and urethane.

The housing 231 according to various embodiments may be constructed in various shapes. For example, a main body, i.e., the housing 231, may be constructed in any one of a circular shape, an elliptical shape, and a polygonal shape such as a square or a rectangle when viewed in a vertical direction.

The wearable device 230 according to various embodiments may include a display 233 on an upper face 2310 of the housing 231. The display 233 may be applied in a touch screen manner. Accordingly, the display 233 may be referred to as a touch screen display. For example, the touch screen display 233 may include a flat display module or a curved display module.

The wearable device 230 according to various embodiments may have a pressure sensor disposed to at least some portions, e.g., the upper face 2310, a lower face 2311, or a side face 2312, of the housing 231, as an information input device. A configuration of disposing the pressure sensor will be described below.

The wearable device 230 according to various embodiments may include the circular housing 231 when viewed from above the touch screen display 233. The housing 231 according to various embodiments may include the first face 2310 facing a first direction ①, the second face 2311 facing a second direction ② opposite to the first direction ①, and the third face 2312 disposed between the first and second faces 2310 and 2311 facing a third direction ③ perpendicular to each of the first and second directions ① and ②. For example, the first face 2310 may be disposed such that a touch screen display is exposed, and the rear face 2311 may include a rear housing. The side face 2312 according to various embodiments is an outer circumferential face having a diameter, and one pair of first and second outer circumferential faces may be exposed. The first and second outer circumferential faces may face each other.

The wearable device 230 according to various embodiments may operate as part of a pressure sensor when the first outer circumferential face or the second outer circumferential face or both the first and second outer circumferential faces is constructed of a conductive material. An arrow direction indicates that desired information can be input by moving a user's finger in the arrow direction, that is, by using an input operation of a pressure sensor based on pressure sensing. A thick arrow direction indicates that an input operation based on a pressure change can be performed through touch sliding from an upward direction to a downward direction or from the downward direction to the upward direction.

Figure 24A:
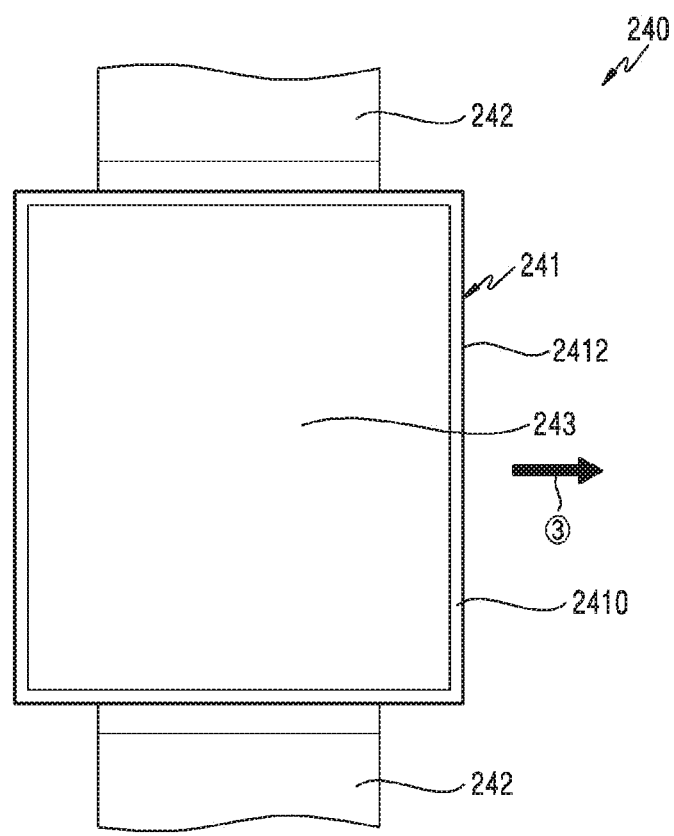
FIG. 24A is a plan view illustrating a wearable device equipped with a pressure sensor according to various embodiments of the present disclosure.
Figure 24B:
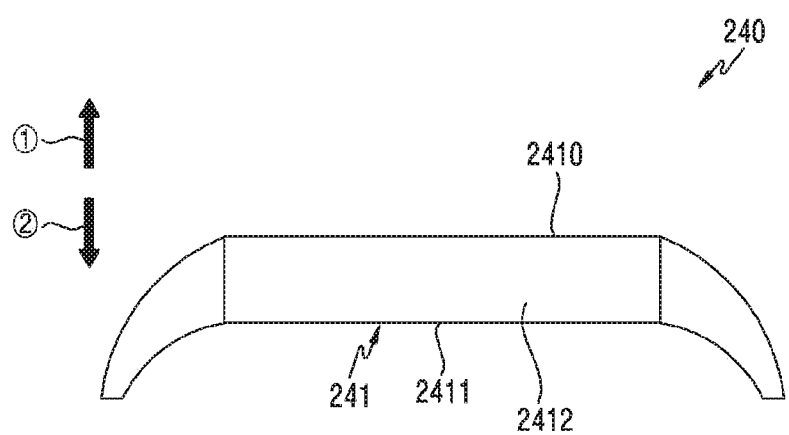
FIG. 24B is a side view illustrating a wearable device equipped with a pressure sensor according to various embodiments of the present disclosure.

FIG. 24A is a plan view illustrating a wearable device equipped with a pressure sensor according to various embodiments of the present disclosure. FIG. 24B is a side view illustrating a wearable device equipped with a pressure sensor according to various embodiments of the present disclosure.

Referring to FIG. 24A and FIG. 24B, a wearable device 240 according to various embodiments may include a substantially rectangular housing when viewed from above a touch screen display 243. A housing 241 according to various embodiments may include a first face 2410 facing a first direction ①, a second face 2411 facing a second direction ② opposite to the first direction ①, and a third face 2412 disposed between the first and second faces 2410 and 2411 facing a third direction ③ perpendicular to each of the first and second directions ① and ②. For example, the first face 2410 may be disposed such that a touch screen display is exposed, and the rear face 2411 may include a rear housing. The side face 2412 according to various embodiments includes first and second side faces. The first and second outer circumferential faces may face each other.

As will be described below, it is possible to operate as part of a pressure sensor when the first side face 2412 or the second side face 2412 or both the first and second side faces is constructed of a conductive material. A thick arrow direction indicates that desired information can be input by moving a user's finger in the arrow direction, that is, by using an input operation of a pressure sensor based on pressure sensing. The thick arrow direction indicates that an input operation based on a pressure change can be performed through touch sliding from an upward direction to a downward direction or from the downward direction to the upward direction.

Figure 25A:
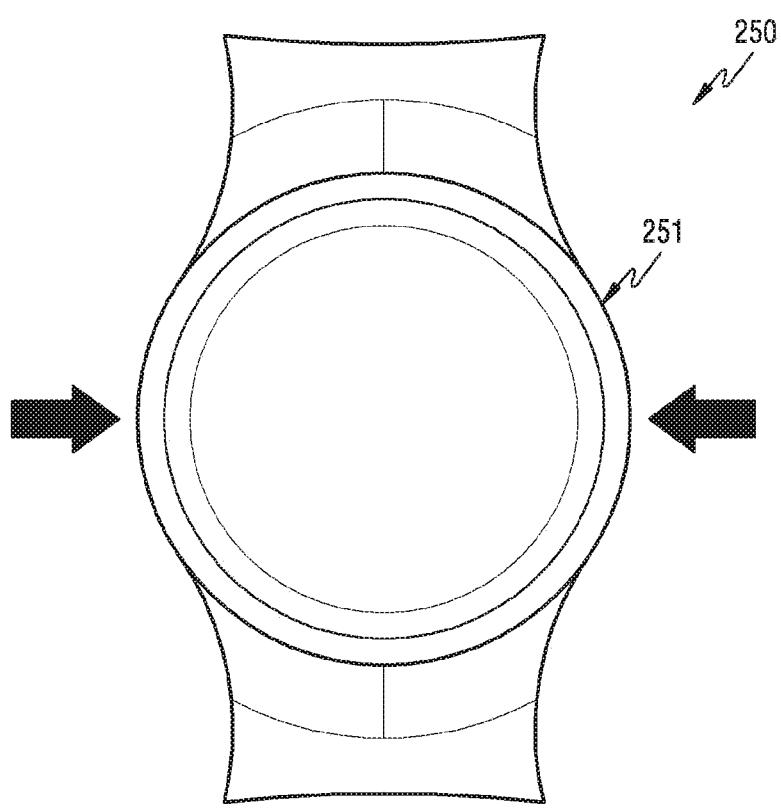
FIG. 25A and FIG. 25B are exemplary diagrams illustrating an operation of pressing a pressure sensor according to various embodiments of the present disclosure.

FIG. 25A is an exemplary diagram illustrating an operation of pressing a pressure sensor according to various embodiments of the present disclosure.

Referring to FIG. 25A, a wearable device 250 according to various embodiments may be the same as the wearable device 230 of FIG. 23A and FIG. 23B. When the wearable device 250 according to various embodiments is touched or pressed in a direction indicated by a thick arrow, the pressure sensor senses this, and thus a desired input operation can be performed.

The electronic device 250 according to various embodiments may operate as part of the pressure sensor when a first outer circumferential face or a second outer circumferential face or both the first and second outer circumferential faces of a housing 251 is constructed of a conductive material. A thick arrow direction indicates that desired information can be input by moving a user's finger in the arrow direction, that is, by using an input operation of a pressure sensor based on pressure sensing. The thick arrow direction indicates that a user can perform an input operation according to an operation of a pressure sensor based on a pressure change when pressed in an arrow direction from the left to the right or in an arrow direction from the right to the left. When the pressure sensor is disposed in this manner, a side key or the like disposed to a side face of the housing of the existing electronic device can be deleted, thereby advantageously simplifying an exterior of the electronic device.

Figure 25B:
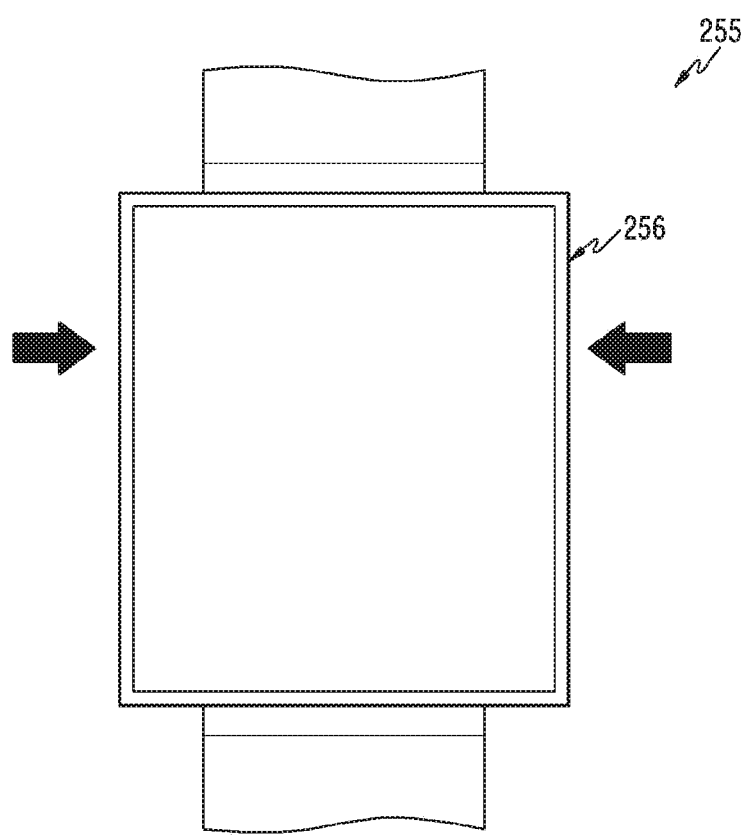

FIG. 25B is an exemplary diagram illustrating an operation of pressing a pressure sensor according to various embodiments of the present disclosure.

Referring to FIG. 25B, a wearable device 255 according to various embodiments may be the same as the wearable device 240 of FIG. 24A and FIG. 24B. When the wearable device 255 according to various embodiments is touched or pressed in a direction indicated by a thick arrow, the pressure sensor senses this, and thus a desired input operation can be performed.

A housing 256 of the wearable device according to various embodiments may operate as part of a pressure sensor when a first side face or a second side face or both the first and second side faces is constructed of a conductive material. A thick arrow direction indicates that desired information can be input by moving a user's finger in the arrow direction, that is, by using an input operation of a pressure sensor based on pressure sensing. The thick arrow direction indicates that a user can perform an input operation according to an operation of a pressure sensor based on a pressure change when pressed in an arrow direction from the left to the right or in an arrow direction from the right to the left. When the pressure sensor is disposed in this manner, a side key or the like disposed to the existing electronic device can be deleted, thereby advantageously simplifying an exterior of the electronic device.

Hereinafter, a configuration of disposing a pressure sensor mounted to a wearable device will be described.

Figure 26A:
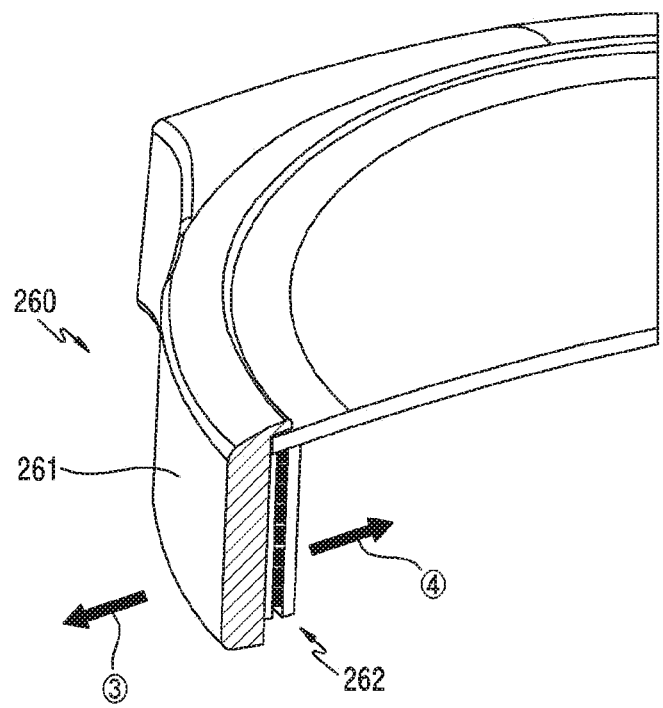
FIG. 26A and FIG. 26B are partially cutaway perspective views illustrating a state where a pressure sensor equipped in a wearable device is mounted to a housing according to various embodiments of the present disclosure.
Figure 26B:
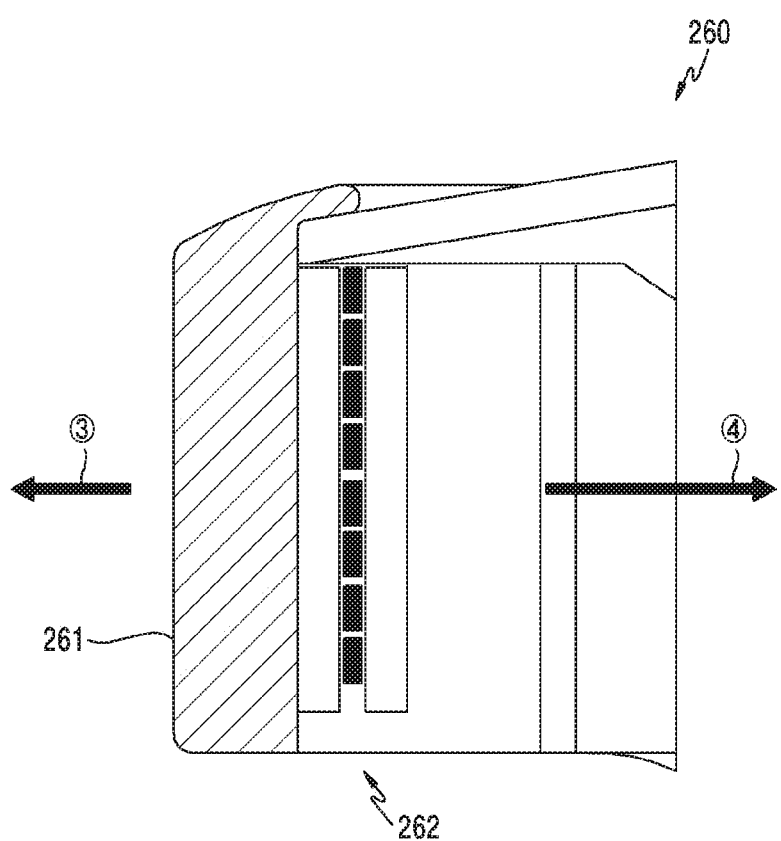
Figure 26C:
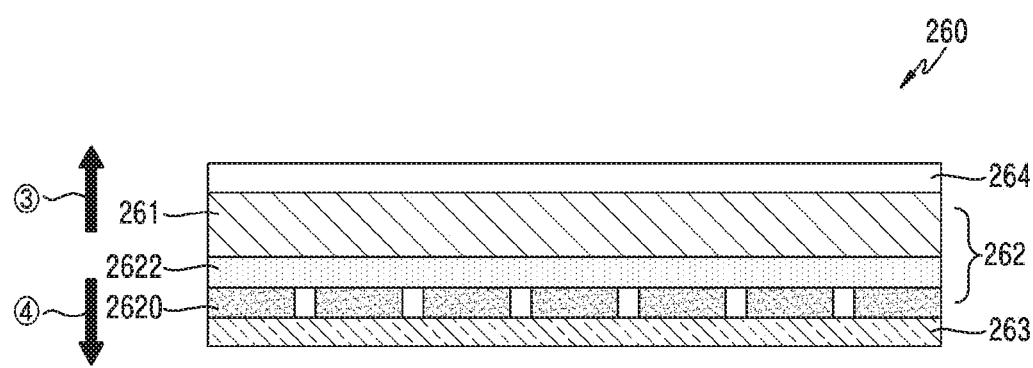
FIG. 26C is a cross-sectional view illustrating a configuration of a pressure sensor equipped in a wearable device according to various embodiments of the present disclosure.

FIG. 26A and FIG. 26B are partially cutaway perspective views illustrating a state where a pressure sensor equipped in a wearable device is mounted to a housing according to various embodiments of the present disclosure. FIG. 26C is a cross-sectional view illustrating a configuration of a pressure sensor equipped in a wearable device according to various embodiments of the present disclosure.

Referring to FIG. 26A to FIG. 26C, a wearable device 260 according to various embodiments may include a side metal housing 261, a support member 263, conductive patterns 2620, and a dielectric layer 2622. Third and fourth directions ③ and ④ in the figure indicate a side direction of the housing 261. The third direction ③ may indicate an outer direction of a side face of the housing 261. The fourth direction ④ may indicate an inner direction of the side face of the housing 261. The side face may refer to the first outer circumferential face or second outer circumferential face mentioned in FIG. 23A and FIG. 23B. That is, the side metal housing 261 may be a curved face. In addition, the side metal housing 261 may be constructed to have a curvature or not to have the curvature.

A pressure sensor 262 mounted to the wearable device 260 according to various embodiments may include the conductive patterns 2620 operating as a first electrode, the side metal housing 261 operating as a second electrode, i.e., a ground electrode, and the dielectric layer 2622 disposed between the conductive patterns 2620 and the side metal housing 261. The support member 263 may be disposed to a place spaced apart from the side metal housing 261, and the plurality of conductive patterns 2620 may be disposed to a face facing the third direction ③.

The side metal housing 261 according to various embodiments may have a print layer 264 disposed to the face facing the third direction ③ to provide a variety of color of the housing 261.

The pressure sensor 262 according to various embodiments may be mounted to all or at least part of an inner face, i.e., a face facing the fourth direction ④ of the side metal housing 261. In addition, the pressure sensor 262 may be disposed to some portions along an inner face of the side metal housing 261, or may be mounted in a continuously extended shape. The plurality of pressure sensors 262 may be mounted with an equal interval along the inner face of the side metal housing 261. The pressure sensor 262 may be substantially perpendicular to a touch screen display.

Figure 27:
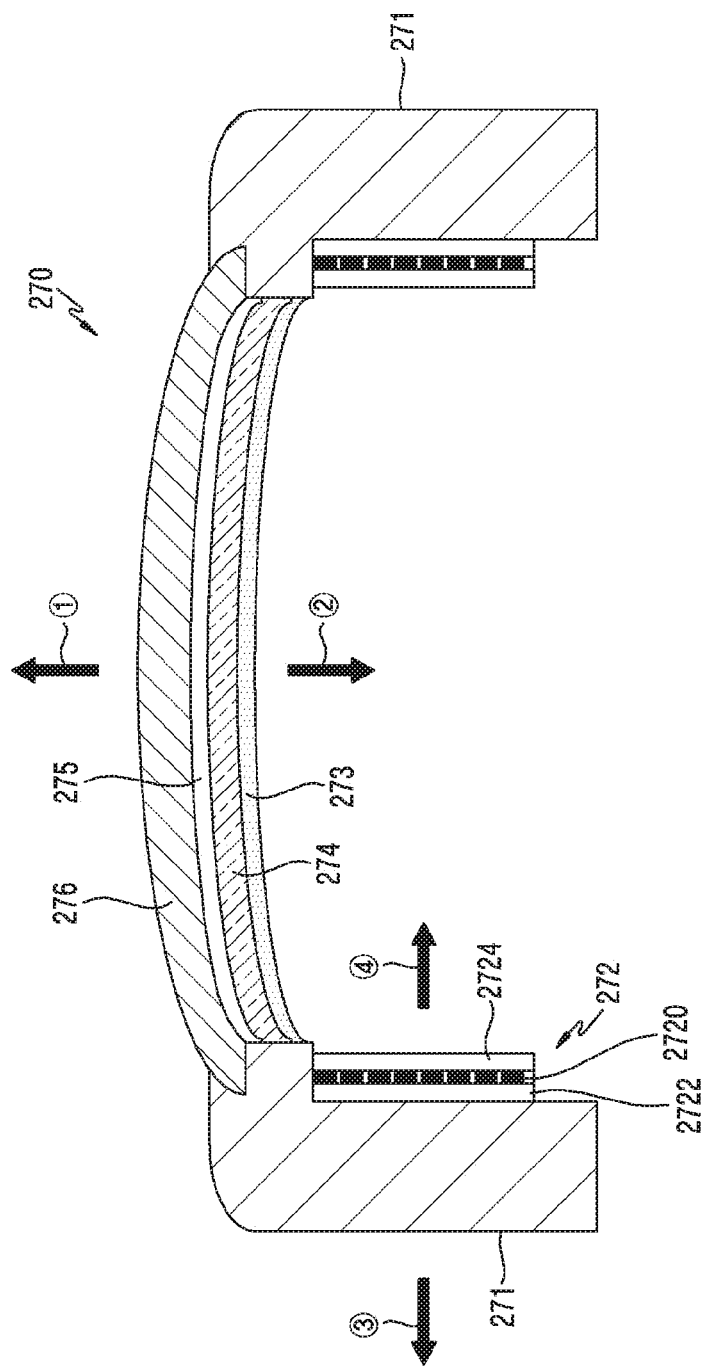
FIG. 27 is a cross-sectional view illustrating a configuration of a pressure sensor according to various embodiments of the present disclosure.

FIG. 27 is a cross-sectional view illustrating a configuration of a pressure sensor according to various embodiments of the present disclosure.

Referring to FIG. 27, a wearable device 270 according to various embodiments may include a first face facing a first direction ① of a housing 271, a second face facing a second direction ② opposite to the first direction ①, and a third face facing a third direction ③ perpendicular to each of the first and second directions ① and ②. The third direction ③ may face an outer direction of the housing 271. A direction opposite to the third direction ③ of the housing 271, i.e., an inner direction of the housing, may be referred to as a fourth direction ④. Since the first to fourth directions ① to ④ or the first to third faces have already been described in detail, descriptions thereof will be omitted.

The wearable device 270 according to various embodiments may include a touch sensor 275 and display 274 disposed to a first face of the housing 271 (these two elements are referred to as a touch screen display), a first pressure sensor 273, a second pressure sensor 272, and the side metal housing 271 disposed to a side face facing a third direction.

A first face of the housing 271 according to various embodiments may include the display 274, the touch sensor 275 disposed on a face facing the first direction ① of the display 274, and the first pressure sensor 273 disposed to a face facing the second direction ② of the display 274.

The wearable device 270 according to various embodiments may include the housing 271, a support member 2724 spaced apart from a face facing the fourth direction ④ of the housing 271, a plurality of conductive patterns 2720 disposed to a face facing a third direction of the support member 2724, and a dielectric layer 2722 disposed between the conductive patterns 2720 and the housing 271. For example, the second pressure sensor 272 may include the conductive patterns 2720 operating as a first electrode, the housing 271 operating as a second electrode (a ground electrode), and the dielectric layer 2722 disposed between the conductive patterns 2720 and the housing 271.

A transparent substrate 276 may be disposed on a face facing the first direction ① of the touch sensor 275. The transparent substrate 276 may include a transparent cover window. In addition, a print layer (not shown) may be disposed to the face facing the third direction ③ of the housing 271 to provide a variety of color for an exterior of the housing.

The first pressure sensor 273 according to various embodiments may be disposed to a first face, i.e., a front face, of the housing 271 and thus may be referred to as a front pressure sensor. The second pressure sensor 272 may be disposed to a third face, i.e., a side face, of the housing 271, and thus may be referred to as a side pressure sensor. Each of the first pressure sensor 273 and the second pressure sensor 272 may be structurally separated and thus operate independently.

Figure 28:
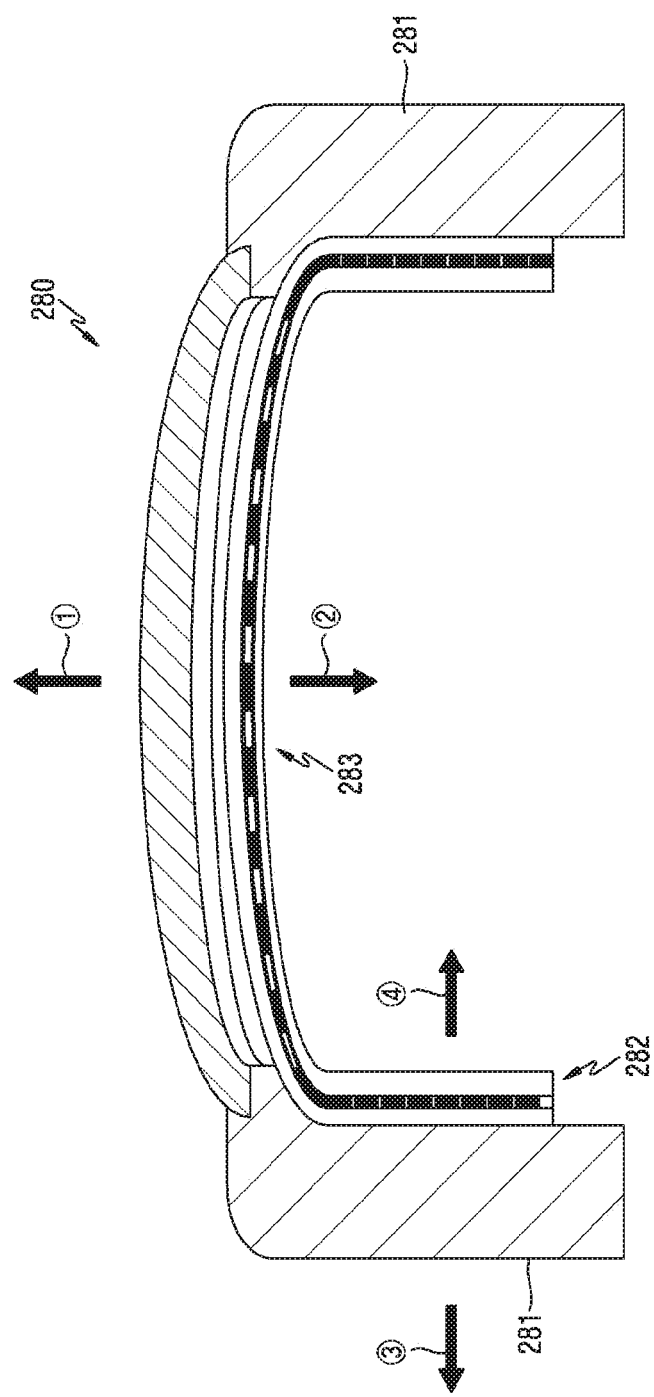
FIG. 28 is a cross-sectional view illustrating a configuration of a pressure sensor according to various embodiments of the present disclosure.

FIG. 28 is a cross-sectional view illustrating a configuration of a pressure sensor according to various embodiments of the present disclosure.

Referring to FIG. 28, a wearable device 280 according to various embodiments will be described only in terms of differences, compared with the wearable device 270 of FIG. 27, and the same descriptions will be omitted. While the wearable device 270 of FIG. 27 has the first and second pressure sensors 273 and 272 constructed to be separated from each other, the wearable device 280 of FIG. 28 has first and second pressure sensors 283 and 282 constructed in an integral manner. The pressure sensor according to various embodiments may include the first pressure sensor 283 disposed to a first side, i.e., a front face, of the housing 281 and the second pressure sensor 282 disposed in a vertical direction from the first pressure sensor 283 in an integral manner, i.e., disposed to a third side of the housing 281. The other configurations are the same as described before, and thus descriptions thereof will be omitted.

Figure 29A:
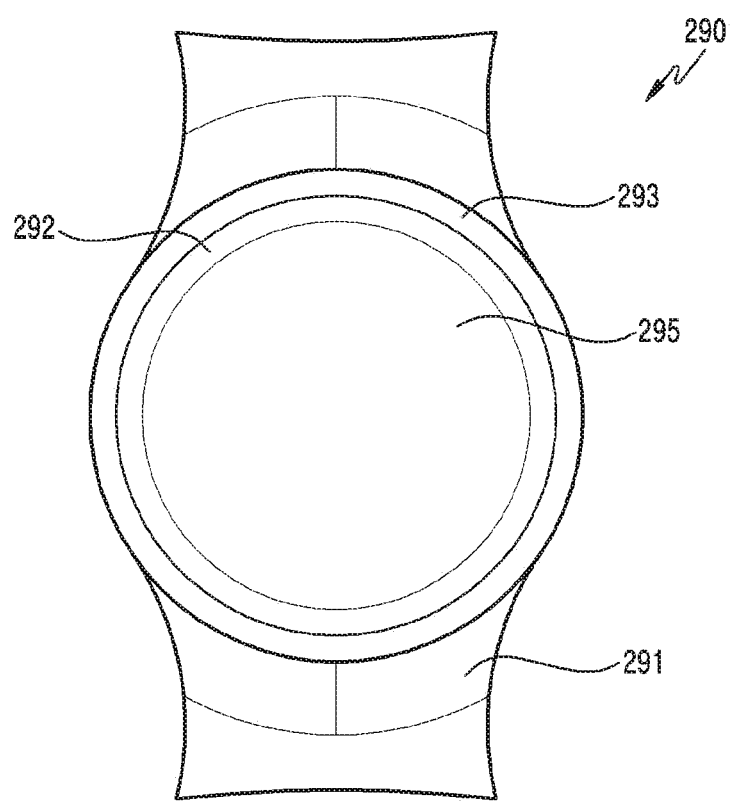
FIG. 29A is a plan view illustrating a wearable device equipped with a pressure sensor according to various embodiments of the present disclosure.

FIG. 29A is a plan view illustrating a wearable device equipped with a pressure sensor according to various embodiments of the present disclosure. FIG. 29B is a side cross-sectional view illustrating a wearable device equipped with a pressure sensor according to various embodiments of the present disclosure.

Referring to FIG. 29A and FIG. 29B, a wearable device 290 according to various embodiments may include a rotation body 293 disposed to a first side, e.g., a front face, of a housing in a rotatable manner. The rotation body 293 may rotate to perform various input operations. The rotation body 293 has a substantially ring shape, and may be disposed to surround an outer circumference of a touch screen display 294. For example, a wheel may be disposed as the rotation body 293.

The rotation body 293 according to various embodiments may rotate in a clockwise or counter clockwise direction with respect to a vertical axis as a rotation axis, and may be limited to have a rotation amount of up to 360 degrees or may be constructed to rotate infinitely.

The wearable device 290 according to various embodiments may recognize a rotation direction, rotation speed, rotation amount, rotation position, or the like of the rotation body 293. The wearable device 290 may include a plurality of sensors (not shown). For example, the sensor may include an optical sensor and at least one magnetic sensor or biosensor.

A housing according to various embodiments may include first and second support structures 291 and 292. The rotation body 293 may be mounted to the first and second support structures 291 and 292 in a rotatable manner, and thus may manipulate the wearable device 290 according to whether the rotation body 293 rotates. That is, as an input device, the operation of the rotation body 293 may be set to various modes according to a rotation amount or a rotation direction.

The first and second support structures 291 and 292 according to various embodiments are structures constructed of an injection material or an alloy material or a combination of these materials for protecting or supporting all components used in the wearable device. The first support structure 291 is located outside and thus may be referred to as an exterior structure, and the second support structure 292 is located inside and thus may be referred to as an internal structure. The first and second support structures 291 and 292 according to various embodiments may be coupled to each other to support components mounted to the housing. The second support structure 292 may be coupled on the first support structure 291, and the first support structure 291 may support the rotation body 293 in a rotatable manner by using a coupling member. The second support structure 292 may support a touch screen display 295. The rotation body 293 may be disposed to have a gap in a state of facing a front portion, and may maintain a state of being spaced apart.

The wearable device 290 equipped with the rotation body 293 such as a wheel according to various embodiment may be equipped with the pressure sensor 294. The pressure sensor 294 according to various embodiments may be disposed to a front portion of the first support structure 291 disposed to a place spaced apart from the rotation body 293. The pressure sensor 294 may face the front portion, and may be constructed in a ring shape similar to the rotation body 293. One face of the front portion may face the rotation body 293, and the pressure sensor 294 may be located on the other face. The pressure sensor 294 operates by pressing at least part of the rotation body 293, and may be utilized as an input device.

Figure 30:
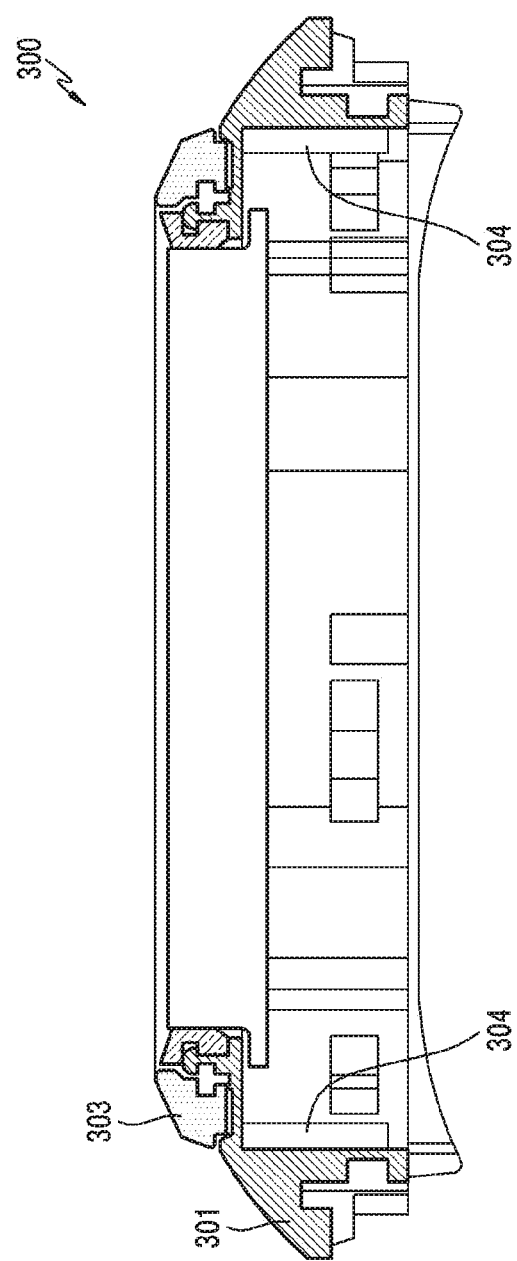
FIG. 30 is a side cross-sectional view illustrating a wearable device equipped with a pressure sensor according to various embodiments of the present disclosure.

FIG. 30 is a side cross-sectional view illustrating a wearable device equipped with a pressure sensor according to various embodiments of the present disclosure.

Referring to FIG. 30, a wearable device 300 according to various embodiments differs from the wearable device 290 of FIG. 29A and FIG. 29B only in terms of a location where the pressure sensor is disposed, and the remaining configurations may be the same. Therefore, descriptions on the remaining configurations will be omitted.

The wearable device 300 equipped with a rotation body 303 such as a wheel according to various embodiments may be equipped with a pressure sensor 304. The pressure sensor 304 according to various embodiments may be disposed to a side portion of a first support structure 301 disposed to a place spaced apart from the rotation body 303. The pressure sensor 304 may face the side portion, and may be constructed in a ring shape similar to the rotation body 303. The pressure sensor 304 operates by touching or pressing at least part of the side portion, and may be utilized as an input device.

Figure 31:
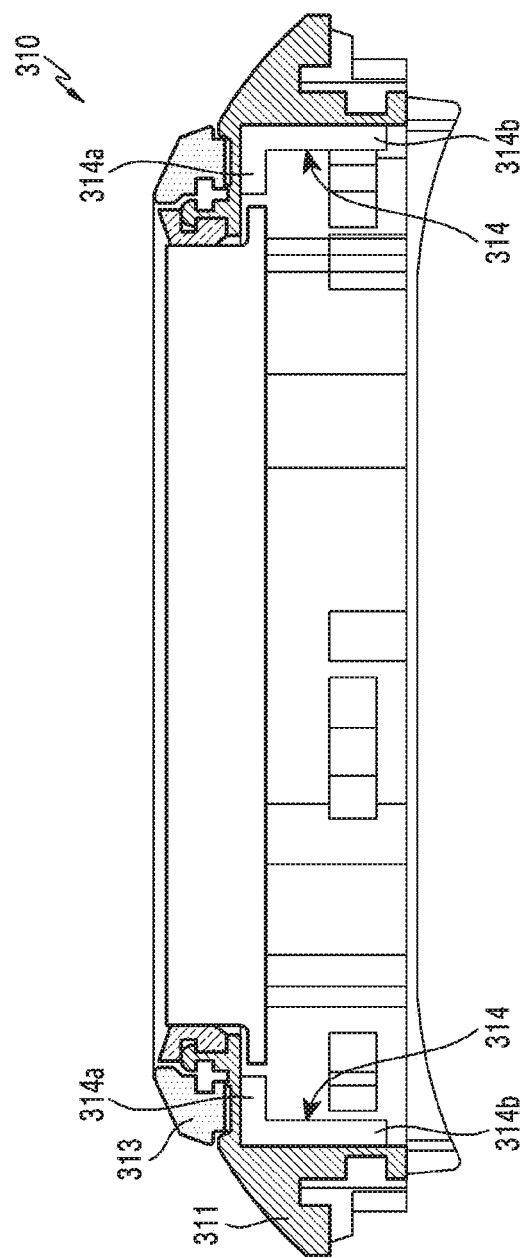
FIG. 31 is a side cross-sectional view illustrating a wearable device equipped with a pressure sensor according to various embodiments of the present disclosure.

FIG. 31 is a side cross-sectional view illustrating a wearable device equipped with a pressure sensor according to various embodiments of the present disclosure.

Referring to FIG. 31, a wearable device 310 according to various embodiments differs from the wearable device 300 of FIG. 30 only in terms of a location where the pressure sensor is disposed, and the remaining configurations may be the same. Therefore, descriptions on the remaining configurations will be omitted.

The wearable device 310 equipped with a rotation body 313 such as a wheel according to various embodiments may be equipped with a pressure sensor 314. The pressure sensor 314 according to various embodiments may be disposed to front and side portions of a first support structure 311 disposed to a place spaced apart from the rotation body 313. The pressure sensor 314 may face the front and side portions, and may be constructed in a ring shape similar to the rotation body 313. The pressure sensor 314 operates by touching or pressing at least part of the front or side portion, and may be utilized as an input device. For example, in the pressure sensor 314, a first portion 314a facing a front portion and a second portion 314b facing a side portion may be constructed integrally or independently, and may be controlled integrally or independently.

Hereinafter, a region in which a pressure sensor is disposed will be described with reference to the accompanying drawings.

Figure 32A:
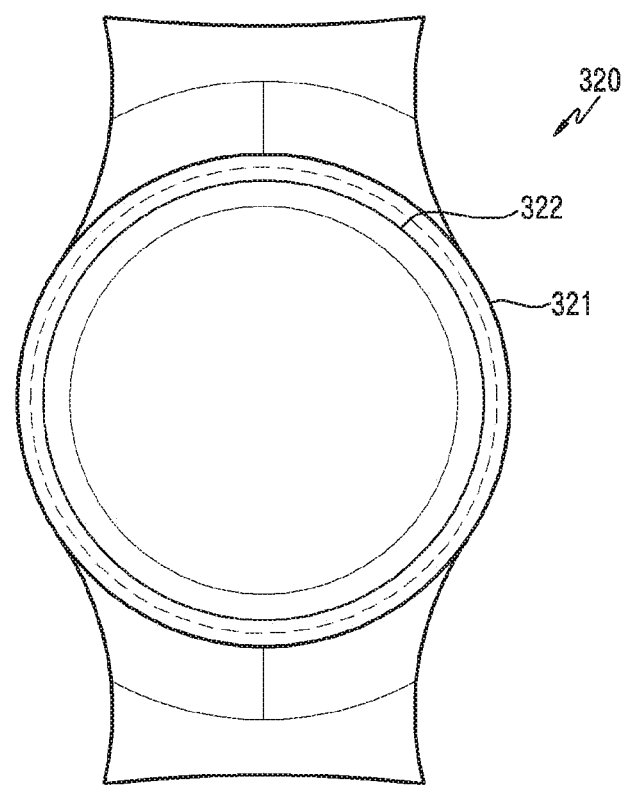
FIG. 32A and FIG. 32B are plan views briefly illustrating a state where a pressure sensor is disposed to a wearable device according to various embodiments of the present disclosure.
Figure 32B:
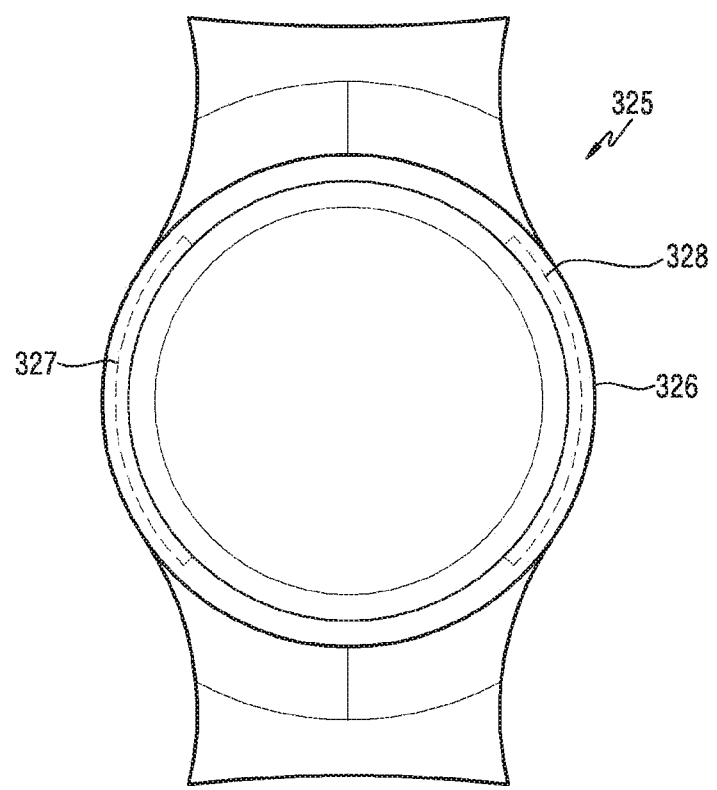

FIG. 32A and FIG. 32B are plan views briefly illustrating a state where a pressure sensor is disposed to a wearable device according to various embodiments of the present disclosure.

Referring to FIG. 32A, a wearable device 320 according to various embodiments may be the same device as the wearable device 230 of FIG. 23A and FIG. 23C. At least one pressure sensor 322 may be disposed to the wearable device 320 according to various embodiments.

The pressure sensor 322 according to various embodiments may be mounted to a side metal housing 321 of a housing. A structure in which the pressure sensor 322 is disposed to the side metal housing 321 has already been described above with reference to FIG. 23A to FIG. 23C.

The pressure sensor 322 according to various embodiments may be disposed in a 360-degree continuous structure along an inner face existing in a fourth direction of the rear metal housing 321. For example, the pressure sensor 322 may be disposed in a ring shape when viewed from above a touch screen display.

Referring to FIG. 32B, a wearable device 325 according to various embodiments may be the same device as the wearable device 230 of FIG. 23A to FIG. 23C. The wearable device 325 according to various embodiments may have at least one or more pressure sensors 327 and 328 disposed thereon.

The pressure sensors 327 and 328 according to various embodiments may be mounted to a side metal housing 326 of the housing. A structure in which the pressure sensors 327 and 328 are disposed to the side metal housing 326 has already been described above with reference to FIG. 23A and FIG. 23C.

The pressure sensor according to various embodiments may have the first and second pressure sensors 327 and 328 disposed along an inner face in the fourth direction of the rear metal housing 326. For example, when the wearable device 320 is viewed from above the touch screen display, the first and second pressure sensors 327 and 328 may be disposed symmetrically to face each other. The first and second pressure sensors 327 and 328 may be constructed to have a curvature or not to have the curvature.

Figure 33A:
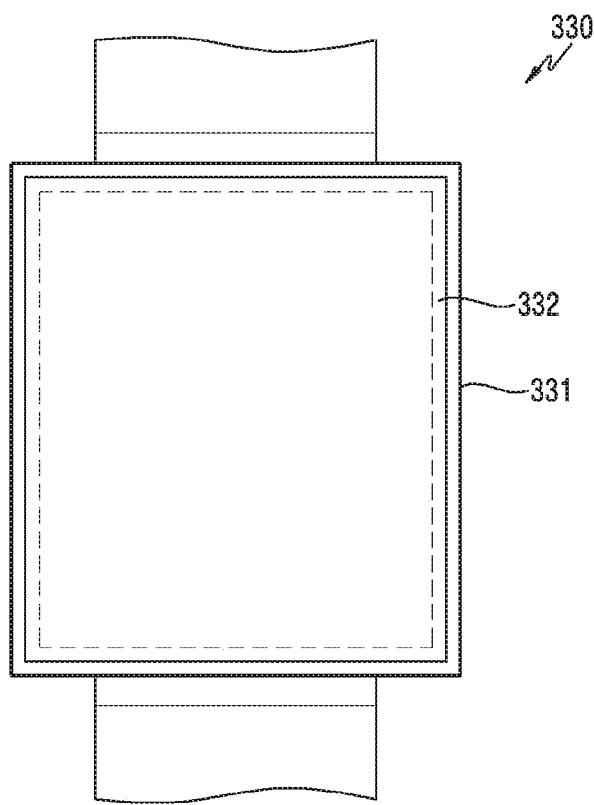
FIG. 33A and FIG. 33B are plan views briefly illustrating a state where a pressure sensor is disposed to a wearable device according to various embodiments of the present disclosure.
Figure 33B:
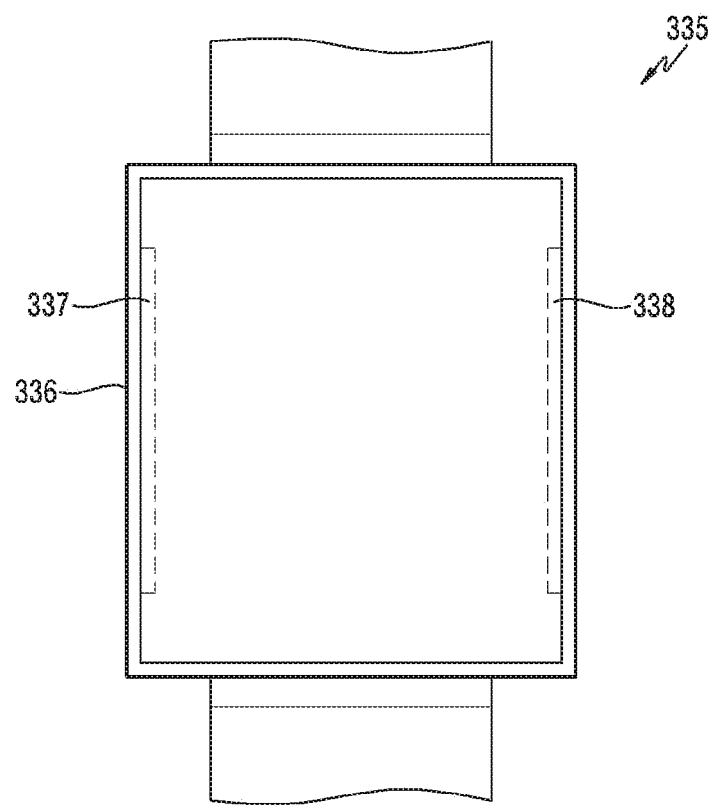

FIG. 33A and FIG. 33B are plan views briefly illustrating a state where a pressure sensor is disposed to a wearable device according to various embodiments of the present disclosure.

Referring to FIG. 33A, a wearable device 330 according to various embodiments may be the same device as the wearable device 240 of FIG. 24A and FIG. 24B. At least one pressure sensor 332 may be disposed to the wearable device 330 according to various embodiments.

The pressure sensor 332 according to various embodiments may be mounted to a side metal housing 331 of a housing. A structure in which the pressure sensor 332 is disposed to the side metal housing 331 has already been described above with reference to FIG. 23A to FIG. 23C.

The pressure sensor 332 according to various embodiments may be disposed in a loop-type continuous structure along an inner face existing in a fourth direction of the rear metal housing 331. For example, when the wearable device 330 is viewed from above the touch screen display, the pressure sensor 332 may be disposed in various shapes substantially along a periphery of a boundary of the housing. According to a shape of the housing, the pressure sensor 332 disposed to an outer boundary of the housing may also be variously disposed.

Referring to FIG. 33B, a wearable device 335 according to various embodiments may be the same device as the wearable device 240 of FIG. 24A and FIG. 24B. At least one or more pressure sensors 337 and 338 may be disposed to the wearable device 335 according to various embodiments The pressure sensors 337 and 338 according to various embodiments may be mounted to a side metal housing 336 of a housing. A structure in which the pressure sensors 337 and 338 are disposed to the side metal housing 336 has already been described above with reference to FIG. 23A to FIG. 23C.

The pressure sensor according to various embodiments may have the first and second pressure sensors 337 and 338 disposed along an inner face existing in a fourth direction of the rear metal housing 336. For example, when the wearable device 335 is viewed from above the touch screen display, the first and second pressure sensors 337 and 338 may be disposed symmetrically to face each other. Each of the first and second pressure sensors 337 and 338 may be constructed in a linear shape.

Figure 34A:
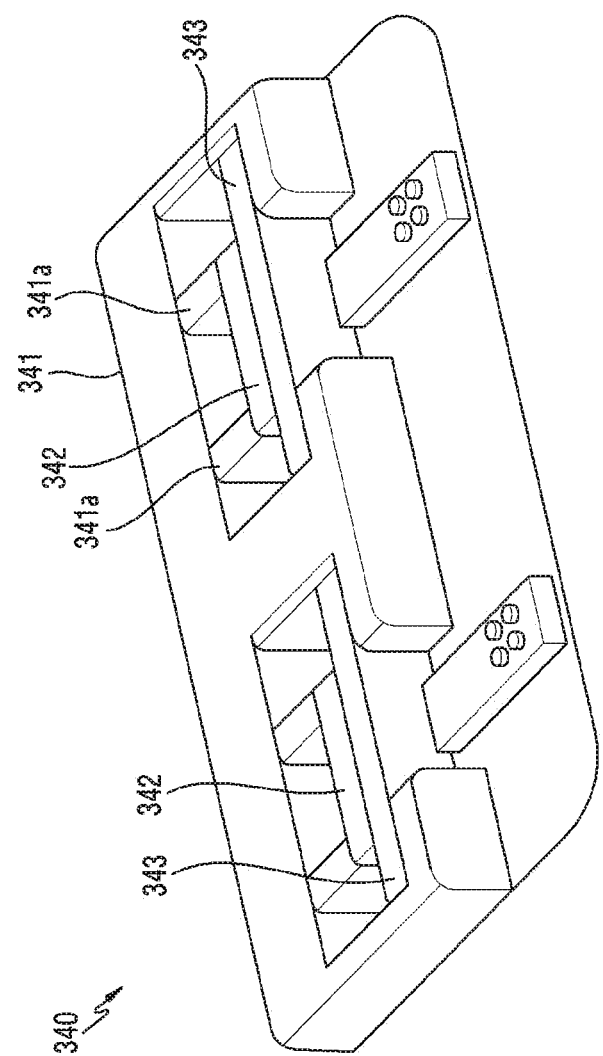
FIG. 34A is a perspective view illustrating a state where a pressure sensor is mounted to a housing of a wearable device according to various embodiments of the present disclosure.
Figure 34B:
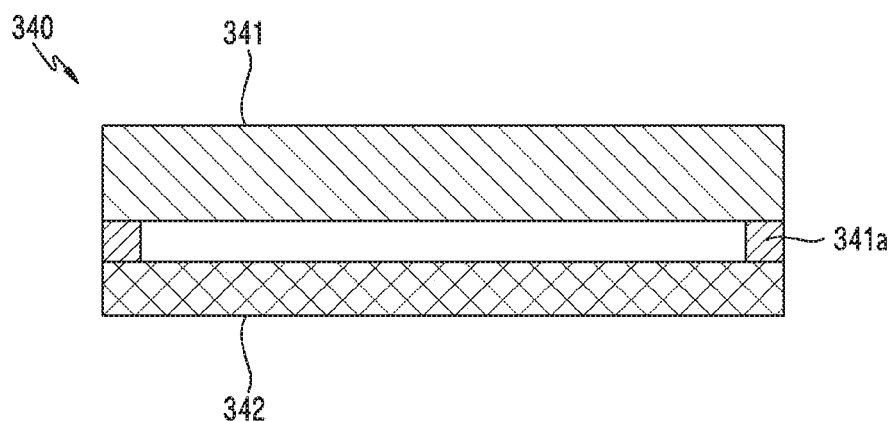
FIG. 34B is a cross-sectional view briefly illustrating a state where a pressure sensor is placed to a housing of a wearable device according to various embodiments of the present disclosure.

FIG. 34A is a perspective view illustrating a state where a pressure sensor is mounted to a housing of a wearable device according to various embodiments of the present disclosure. FIG. 34B is a cross-sectional view briefly illustrating a state where a pressure sensor is placed to a housing of a wearable device according to various embodiments of the present disclosure.

Referring to FIG. 34A and FIG. 34B, a wearable device 340 according to various embodiments may have a coil-winding type pressure sensor 342 disposed to a face facing an inner direction of a side metal housing 341. Pressure may be sensed by using induction current that flows to a coil (inductor) of the pressure sensor 342. For example, at least one pressure sensor 342 may be disposed along an inner face of the side metal housing 341, or a plurality of pressure sensors 3420 may be disposed with an equal interval.

A protrusion-shaped spacer 341a may be disposed between the side metal housing 341 and the pressure sensor 342 according to various embodiments. The spacers 341a is responsible for a function of constantly maintaining a gap between the side metal housing 341 and the pressure sensor 342, and may operate as a pressing protrusion. When part of the side metal frame 341 is pressed by a user, the pressure sensor 342 may be pressed by the spacer 341a. A space may be provided between the side metal frame 341 and the pressure sensor 342.

The spacers 341a according to various embodiments may be symmetrically constructed in at least one pair, and may protrude in a fourth direction integrally from the side metal housing 341.

The pressure sensor 342 disposed to the side metal housing 341 according to various embodiments may be stably supported in the side metal housing 341 by means of a supporter 343. The supporter 343 may be disposed closely to each pressure sensor 342 to support each pressure sensor 342. For example, the supporter 343 may include a stiffener. The supporter 343 may be disposed to a mounting space constructed in the side metal housing 341 to support the pressure sensor 342. In addition, if at least one pressure sensor 342 is disposed to a printed circuit board or a flexible printed circuit board, the supporter 343 may be a support member which supports the printed circuit board or flexible printed circuit board on which at least one pressure sensor 342 is mounted.

Figure 35A:
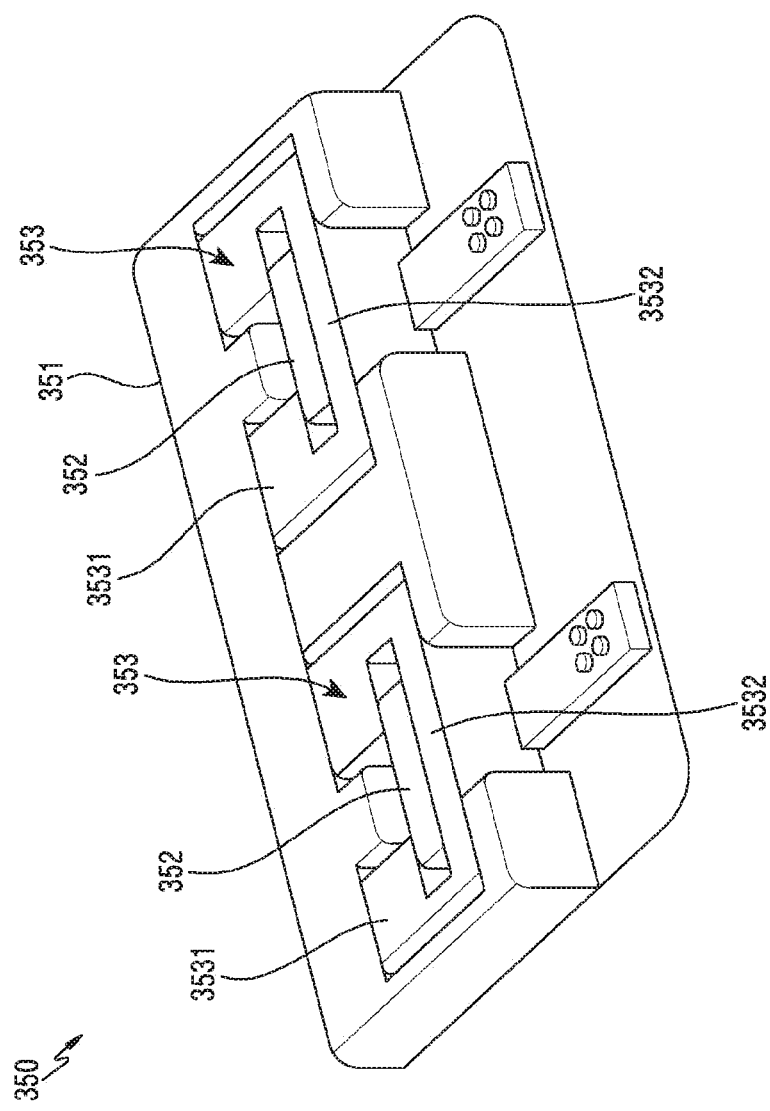
FIG. 35A is a perspective view illustrating a state where a pressure sensor is mounted to a housing of a wearable device according to various embodiments of the present disclosure.
Figure 35B:
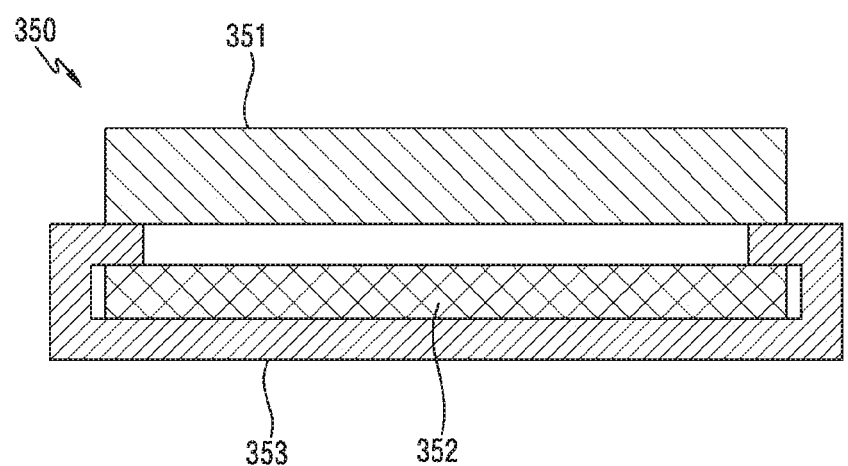
FIG. 35B is a cross-sectional view briefly illustrating a state where a pressure sensor is placed to a housing of a wearable device according to various embodiments of the present disclosure.

FIG. 35A is a perspective view illustrating a state where a pressure sensor is mounted to a housing of a wearable device according to various embodiments of the present disclosure. FIG. 35B is a cross-sectional view briefly illustrating a state where a pressure sensor is placed to a housing of a wearable device according to various embodiments of the present disclosure.

Referring to FIG. 35A and FIG. 35B, a wearable device 350 according to various embodiments may have a coil-winding type pressure sensor 352 disposed to a face facing an inner direction of a side metal housing 351. Pressure may be sensed by using induction current that flows to a coil (inductor) of the pressure sensor 352. For example, at least one pressure sensor 352 may be disposed along an inner face of the side metal housing 351, or a plurality of pressure sensors 352 may be disposed with an equal interval.

Between the side metal housing 351 and the pressure sensor 352 according to various embodiments, a spacer-combined supporter 353 may be disposed to each pressure sensor 352. The spacer-combined supporter 353 may be disposed to the side metal housing 351 to support the pressure sensor 352. The spacer-combined supporter 353 may include a first portion 3531 serving as a spacer and a second portion 3532 serving as a supporter. The first and second portions 3531 and 3532 may be constructed integrally.

When the side metal frame 351 is pressed by the user, the pressure sensor 352 may be pressed by the spacer and the supporter 353. A space may be disposed between the side metal frame 351 and the pressure sensor 352.

The first portion 3531 according to various embodiments may be constructed symmetrically, and may be disposed to a recess constructed in the side metal housing 351 to support each pressure sensor 352.

The spacer-combined supporter 353 may be disposed closely to each pressure sensor 352 to support each pressure sensor 352. In addition, if at least one pressure sensor 352 is disposed to a printed circuit board or a flexible printed circuit board, the support may be a support member which supports the printed circuit board or flexible printed circuit board on which at least one pressure sensor is mounted.

The wearable device having the aforementioned pressure sensor may be utilized as a variety of UX or UI when pressure is applied to a side portion or front edge of the housing. For example, it may be utilized as an operation of turning on or off a home screen when the side portion of the housing is pressed. In addition, it may be utilized as an operation for zooming in or zooming out a touch screen display screen when the side portion of the housing is directionally scrolled.

In addition, at least one or more pressure sensors mounted to the electronic device may be used to implement a variety of UI/UX of the electronic device. For example, when a front face of the electronic device is used as a full display and when it is not desired to cover a screen, it may be used in a holding state in video calling or may be utilized in video player controlling or in camera focusing and shooting.

In addition, a specific function of the electronic device may be mapped to a rear face and thus may be utilized to execute various functions.

In addition, a side region in a side face of the electronic device may be utilized as a function button in a game mode.

In addition, it may be utilized to control a drop-in type VR in an electronic device of which a front face cannot be touched.

In addition, it may be utilized to provide an additional UX in a situation where front and rear faces of the electronic device are simultaneously pressed.

In addition, a user grip of the electronic device may be accurately determined to provide a function thereof. For example, it is possible to arrange icons according to a grip operation, it is possible to return to a home screen in a squeeze operation, and it is possible to be utilized for selfie shooting in the squeeze operation.

In addition, an interaction may be provided in a flexible device. For example, it may be utilized to provide a music control (previous/next/stop) when a rear face is pressed in a folding state and to control a display when the rear face is pressed in an unfolding state.

The term "module," as used herein may represent, for example, a unit including a combination of one or two or more of hardware, software, or firmware. The "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, Field-Programmable Gate Arrays (FPGAs) and a programmable-logic device performing some operations known to the art or to be developed in the future.

At least a part of an apparatus (e.g., modules or functions thereof) or method (e.g., operations) according to the present invention may be, for example, implemented as instructions stored in a computer-readable storage medium in a form of a programming module. In case that the instruction is executed by a processor (e.g., processor 120), and the processor may perform functions corresponding to the instructions. The computer-readable storage media may be the memory 130, for instance.

The computer-readable recording medium may include a hard disk, a floppy disk, and a magnetic medium (e.g., a magnetic tape), an optical medium (e.g., a Compact Disc-Read Only Memory (CD-ROM) and a Digital Versatile Disc (DVD)), a Magneto-Optical Medium (e.g., a floptical disk), and a hardware device (e.g., a Read Only Memory (ROM), a Random Access Memory (RAM), a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of the present invention, and vice versa.

The module or programming module according to the present invention may include at least one or more of the aforementioned constituent elements, or omit some of the aforementioned constituent elements, or further include additional other constituent elements. Operations carried out by the module, the programming module or the other constituent elements according to the present invention may be executed in a sequential, parallel, repeated or heuristic method. Also, some operations may be executed in different order or may be omitted, or other operations may be added.

Meanwhile, the exemplary embodiments disclosed in the specification and drawings are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. An electronic device comprising:
a housing comprising a first face facing a first direction and a second face facing a second direction opposite to the first direction, and comprising a conductive material provided on at least a portion of the second face;
a touch screen display disposed between the first face and second face of the housing and exposed through the first face;
a first pressure sensor disposed between the touch screen display and the second face of the housing and configured to sense pressure of an external object for the touch screen display;
a second pressure sensor coupled to the second face of the housing and configured to sense pressure of an external object for the second face of the housing; and
a support member spaced apart from the second face of the housing in the second direction,
wherein the second pressure sensor comprises:
a conductive pattern disposed between the support member and the conductive material; and
a dielectric layer disposed between the conductive pattern and the conductive material, and
wherein the second pressure sensor is configured to generate an output on the basis of a change in capacitance associated with the conductive pattern, the conductive material, and the dielectric layer.

2. The electronic device of claim 1, further comprising at least one antenna disposed adjacent to the second face of the housing, wherein the conductive pattern does not overlap with the at least one antenna when viewed from above the second face of the housing.

3. The electronic device of claim 1, further comprising a transparent plate spaced apart from the second face of the housing in the second direction and extended substantially in parallel on the second face of the housing, wherein the support member is disposed between the transparent plate and the second face of the housing.

4. The electronic device of claim 1, further comprising a print layer spaced apart from the second face of the housing in the second direction and extended substantially in parallel on the second face of the housing, wherein the support member is disposed between the print layer and the second face of the housing.

5. The electronic device of claim 1, further comprising:
at least one processor electrically coupled to the touch screen display, the first pressure sensor, and the second pressure sensor; and
at least one memory electrically coupled to the at least one processor,
wherein the memory stores instructions for allowing the processor to:
execute a first action, based at least in part on sensing the pressure of the external object by means of the first pressure sensor; and
execute a second action, based at least in part on sensing the pressure of the external object by means of the second pressure sensor, and
wherein the instructions allow the processor to execute a third action, based at least in part on at least temporarily sensing the pressure of the external object simultaneously by means of the first pressure sensor and the second pressure sensor.

6. An electronic device comprising:
a housing comprising a first face facing a first direction and a second face facing a second direction opposite to the first direction, and comprising a conductive material on at least a portion of the second face;
a support member spaced apart from the second face of the housing in the second direction; and
a pressure sensor coupled to the second face of the housing and configured to sense pressure of an external object for the second face of the housing,
wherein the pressure sensor comprises:
conductive patterns disposed on the support member; and
a dielectric layer disposed between the conductive patterns and the conductive material,
wherein the pressure sensor is configured to generate an output on the basis of a change in capacitance associated with a change in a distance between the conductive pattern and the conductive material,
wherein the electronic device comprising at least one first antenna disposed adjacent to the second face of the housing, and
wherein the first antenna is disposed in parallel without overlapping with the conductive patterns, and is disposed to a central region or peripheral boundary of the conductive patterns.

7. The electronic device of claim 6, wherein the conductive material is constructed of at least a portion of a rear metal housing of the electronic device.

8. The electronic device of claim 6, wherein the pressure sensor has the conductive patterns operating as a first electrode and the conductive material operating as a second electrode which is a ground electrode.

9. The electronic device of claim 6, wherein the housing comprises:
a metal housing; and
a floating metal housing which is insulated by being disposed with a gap with respect to the metal housing to improve a radiation operation of the first antenna.

10. The electronic device of claim 6, further comprising at least one second antenna disposed adjacent to the second face of the housing, wherein the second antenna spaced apart from the first antenna is disposed to a place spaced apart from the pressure sensor.

11. An electronic device comprising:
a housing comprising a first face facing a first direction and a second face facing a second direction opposite to the first direction, and comprising a conductive material on at least a portion of the second face;

a support member spaced apart from the second face of the housing in the first direction; and a pressure sensor coupled to the second face of the housing and configured to sense pressure of an external object for the second face of the housing, wherein the pressure sensor comprises:
a conductive pattern disposed between the support member and the conductive material; and
a dielectric layer disposed between the conductive pattern and the conductive material, and wherein the pressure sensor is configured to generate an output on the basis of a change in capacitance associated with a change in a distance between the conductive pattern and the conductive material, wherein the electronic device comprising at least one first antenna disposed adjacent to the second face of the housing, and wherein the first antenna is disposed in parallel without overlapping with the conductive patterns, and is disposed to a central region or peripheral boundary of the conductive patterns.

12. An electronic device comprising:
a housing comprising a first face facing a first direction, a second face facing a second direction opposite to the first direction, and a third face facing a third direction perpendicular to the first and second directions and covering a space between the first and second faces, and comprising a conductive material provided on at least a portion of the third face;

a support member spaced apart from the third face of the housing in a fourth direction opposite to the third direction; and a first pressure sensor coupled to the third face of the housing and configured to sense pressure of an external object for the third face of the housing, wherein the first pressure sensor comprises:
a conductive pattern disposed between the support member and the conductive material; and
a dielectric layer disposed between the conductive pattern and the conductive material, wherein the first pressure sensor is configured to generate an output on the basis of a change in capacitance associated with the conductive pattern, the conductive material, and the dielectric layer, and wherein the housing comprises a second pressure sensor disposed to the first face.

13. The electronic device of claim 12, wherein a wheel operates as an input device by being disposed to the first face of the housing, and the first pressure sensor is disposed below the wheel in an overlapping manner.

* * * * *